United States Patent [19]

Mihara

[11] Patent Number: 4,818,083
[45] Date of Patent: Apr. 4, 1989

[54] VARI-FOCAL LENS SYSTEM
[75] Inventor: Shin-ichi Mihara, Tokyo, Japan
[73] Assignee: Olympus Optical Co., Ltd., Tokyo, Japan
[21] Appl. No.: 119,899
[22] Filed: Nov. 12, 1987
[30] Foreign Application Priority Data
  Nov. 13, 1986 [JP] Japan ................. 61-268538
[51] Int. Cl.$^4$ ............................. G02B 15/14
[52] U.S. Cl. ................... 350/427; 350/423
[58] Field of Search ............... 350/427, 423
[56] References Cited U.S. PATENT DOCUMENTS
2,741,947  4/1956  Back ....................... 350/423
4,634,236  1/1987  Masumoto ............... 350/427

FOREIGN PATENT DOCUMENTS
59-28119   8/1984  Japan.
62-24213   1/1987  Japan.

Primary Examiner—John K. Corbin
Assistant Examiner—Rebecca D. Gass
Attorney, Agent, or Firm—Cushman, Darby & Cushman

[57] ABSTRACT

A vari-focal lens system comprising a first lens group having a positive focal length, a second lens group having a negative focal length, a third lens group having a positive focal length, and a fourth lens group having a positive focal length in the order from the object side and arranged that the first and third lens groups are always kept fixed, the second lens group is arranged to be movable when varying the focal length of the lens system as a whole and to be kept fixed at the time of focusing, the fourth lens group is arranged to be movable for the purpose of compensating the displacement of the focal point which occurs when varying the focal length of the lens system as a whole and to be movable also for the purpose of focusing, and the rays coming out from the third lens group becomes approximately afocal, the vari-focal lens system being further arranged that the lens group to be moved for focusing is light in weight and, moreover, arranged to have a large aperture ratio, high vari-focal ratio and high performance.

15 Claims, 25 Drawing Sheets

FIG. 1
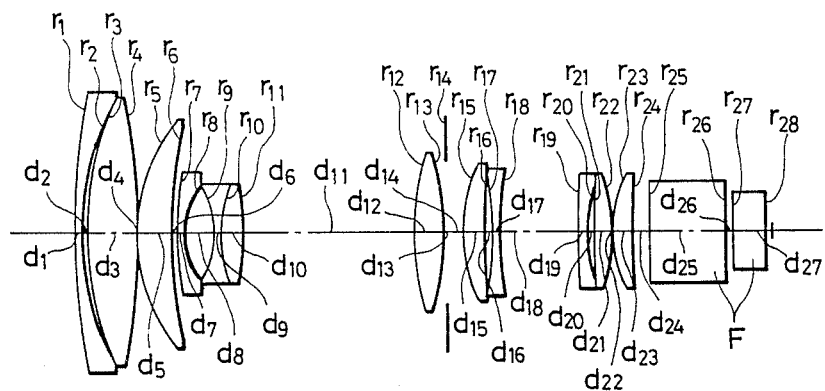
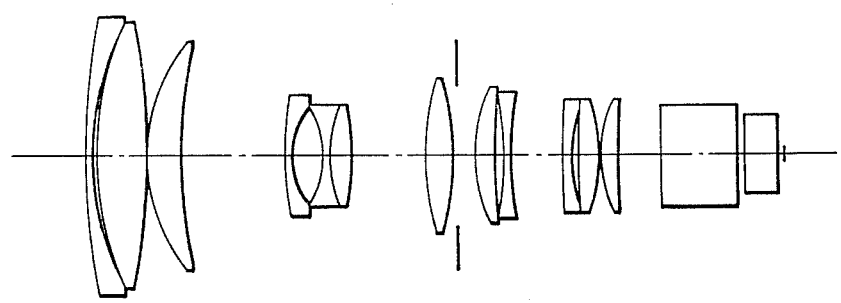
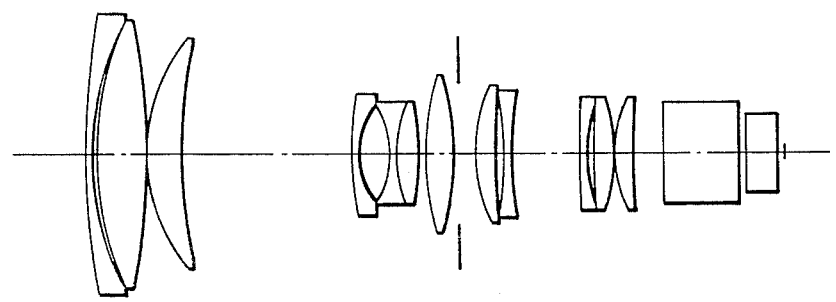

FIG. 2
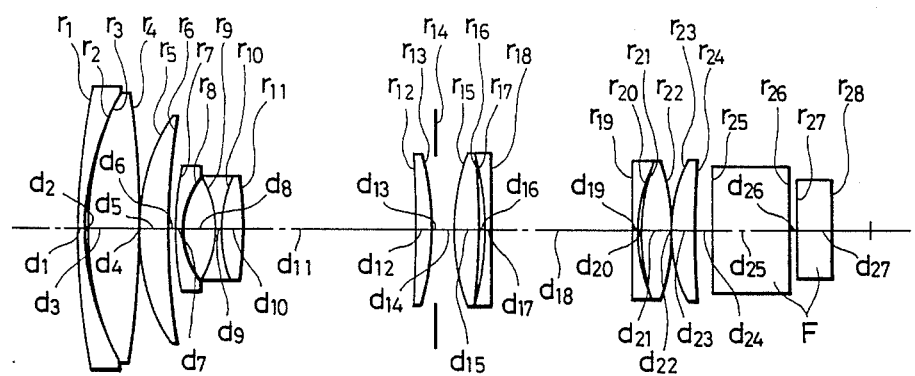
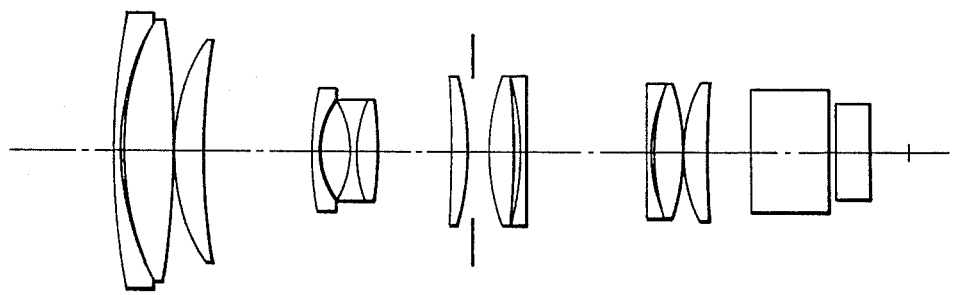
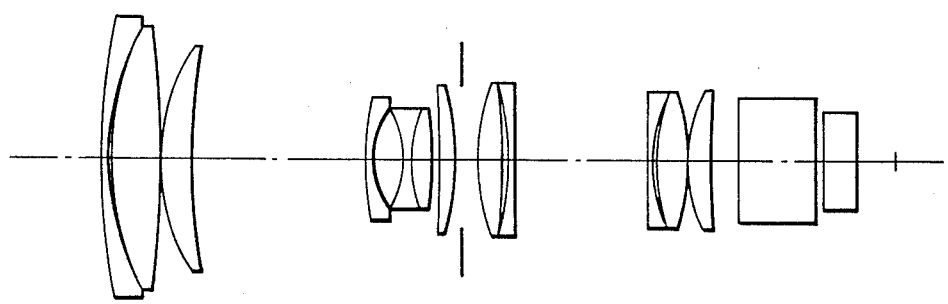

FIG. 3
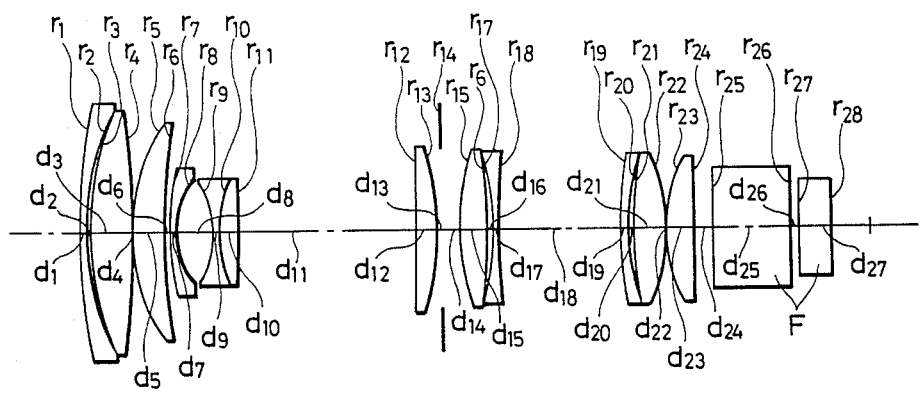
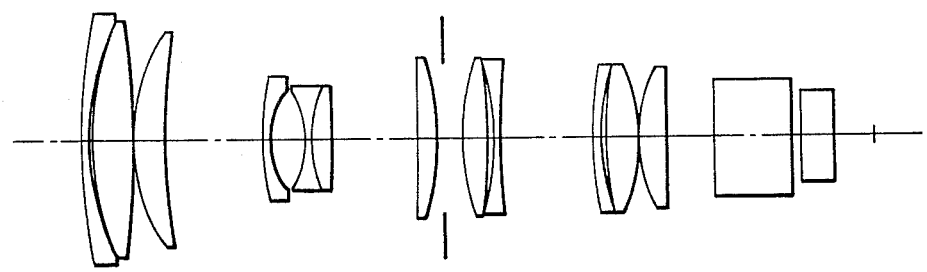
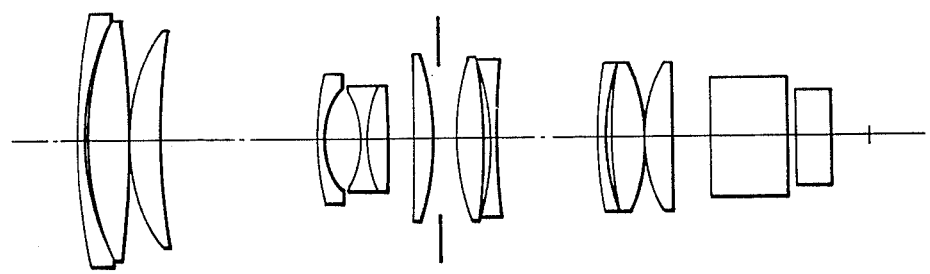

FIG. 4
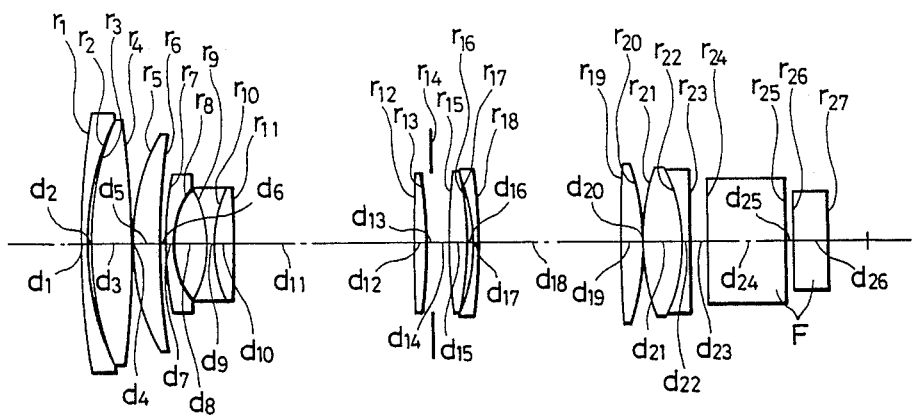
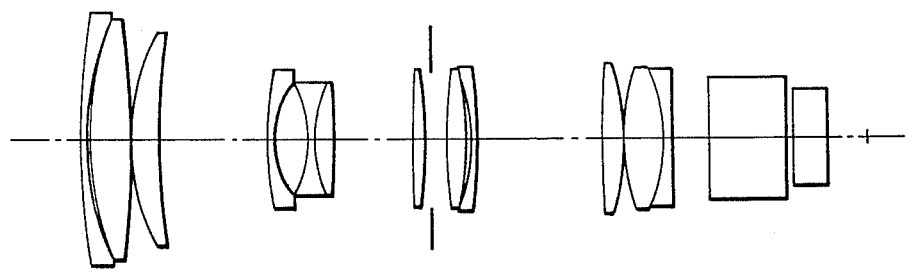
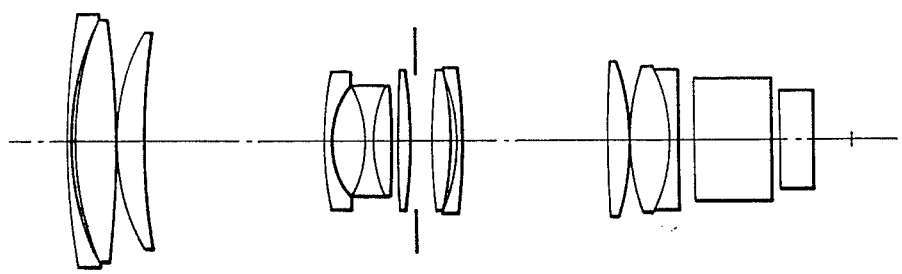

FIG. 5
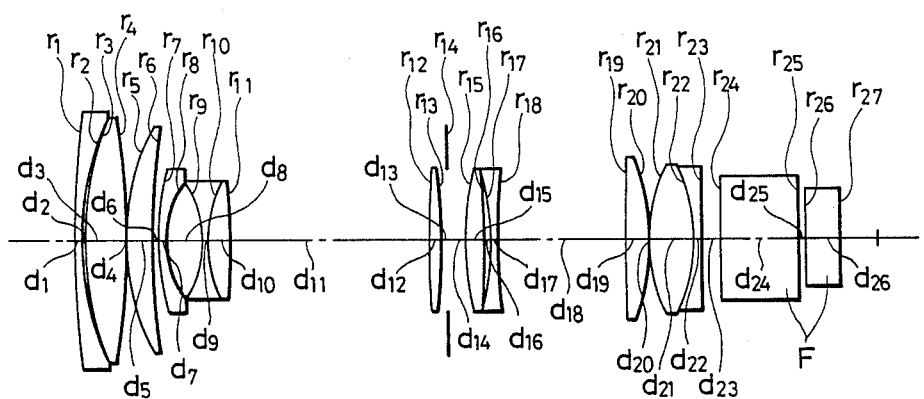
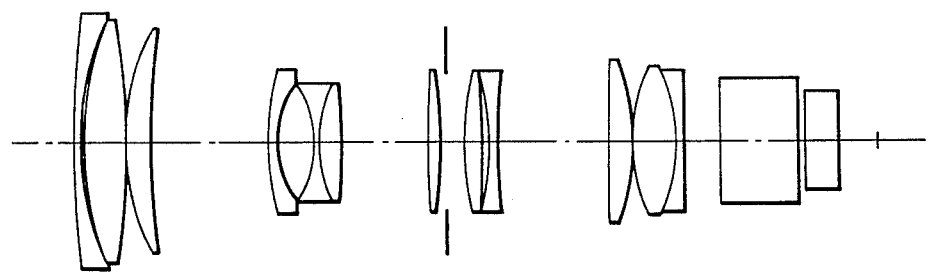
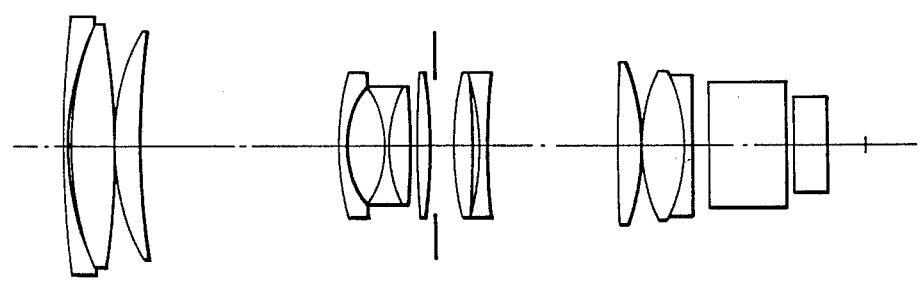

FIG. 6
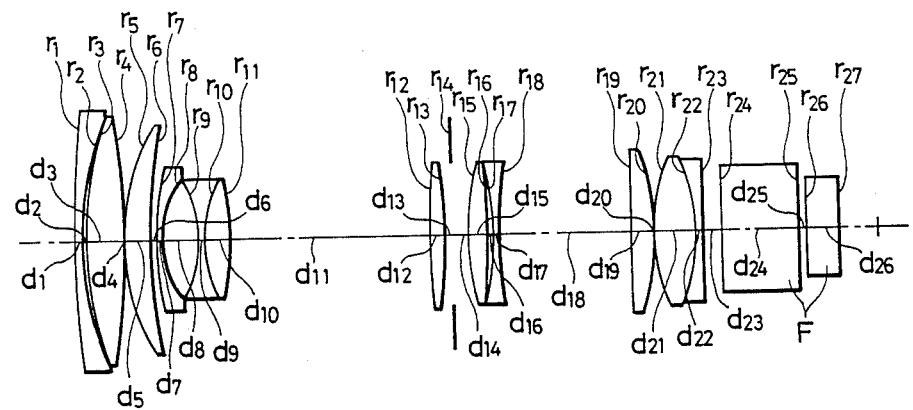
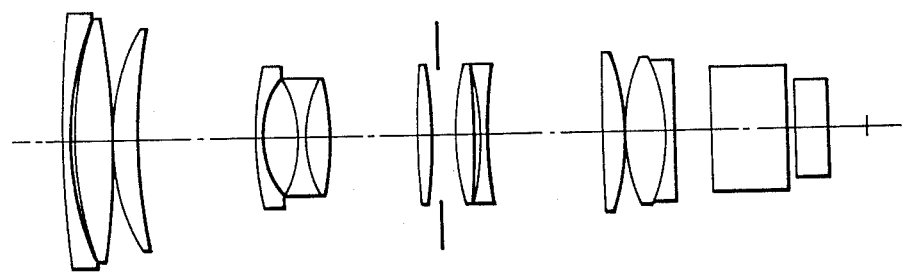
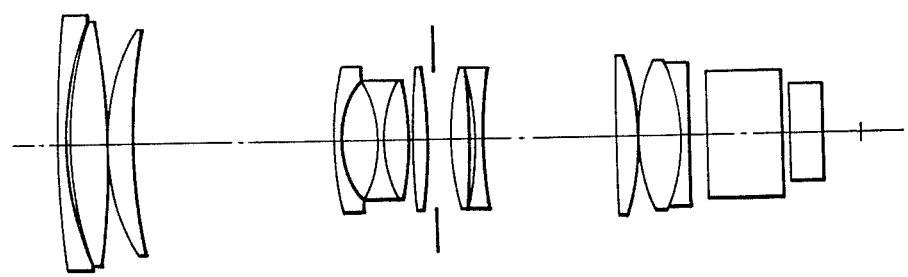

FIG. 7
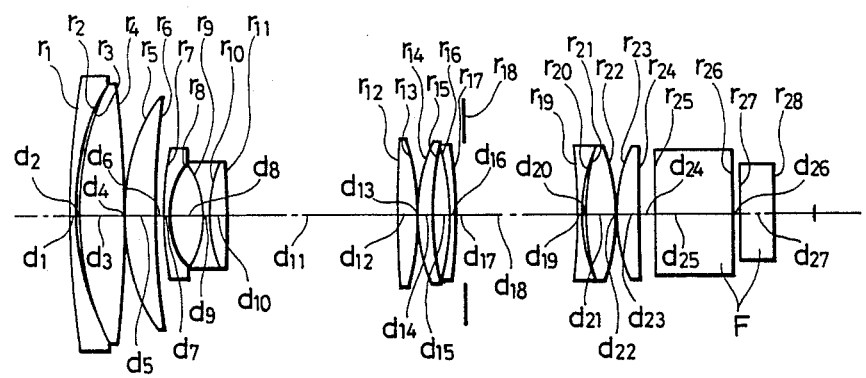
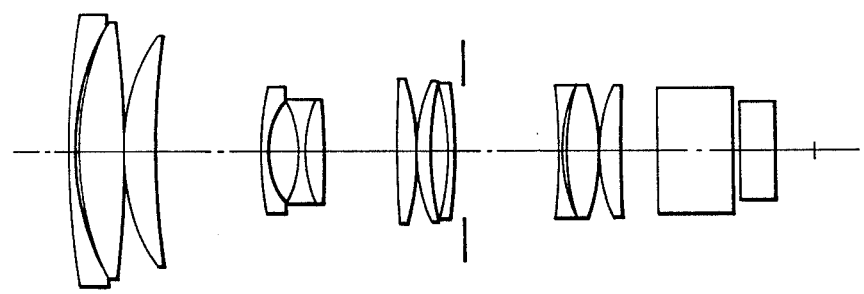
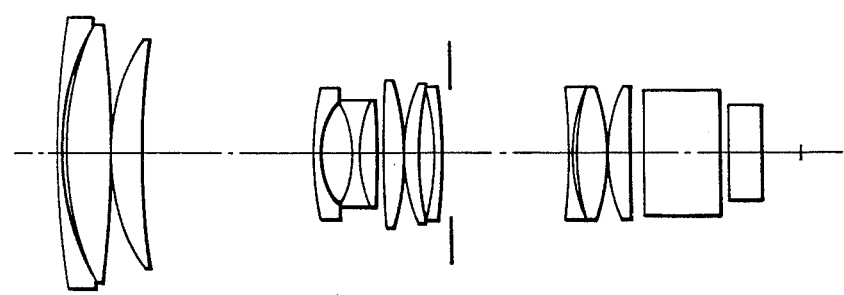

FIG. 8
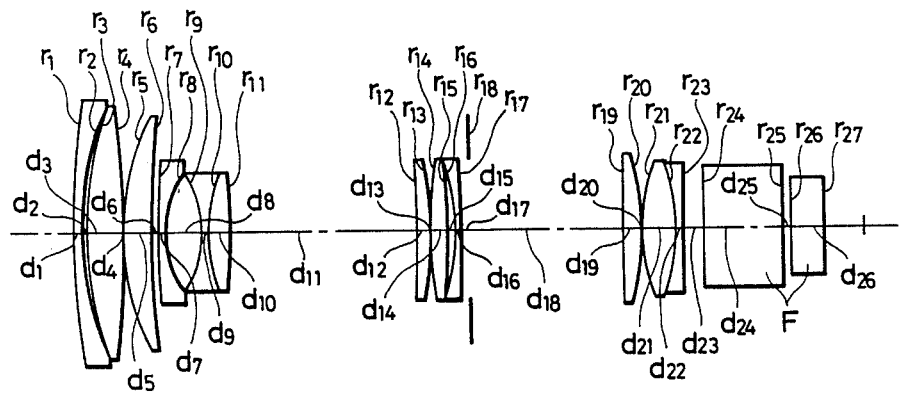
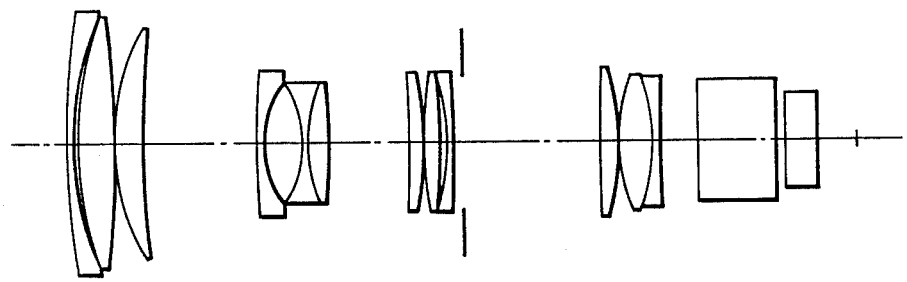
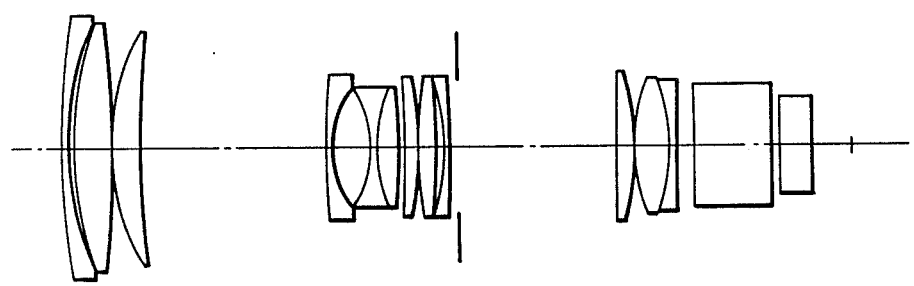

FIG. 9
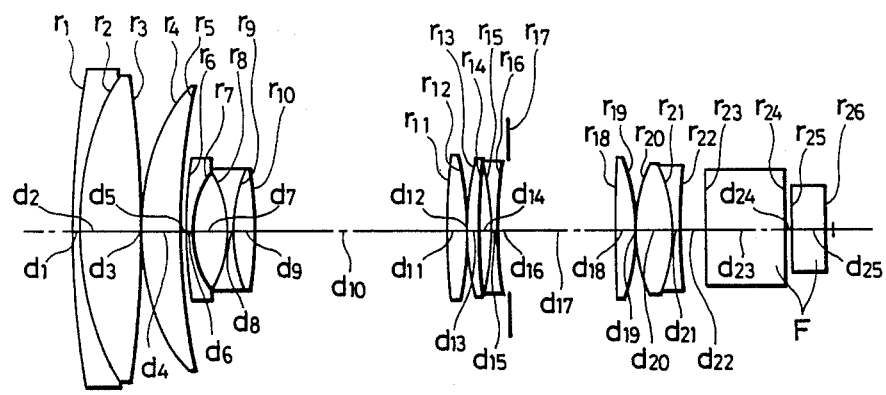
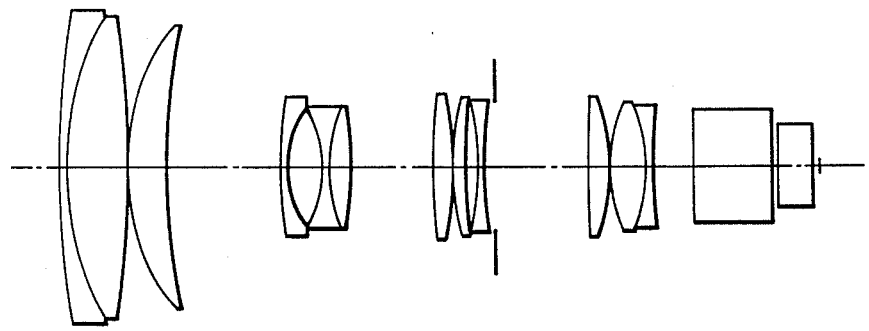
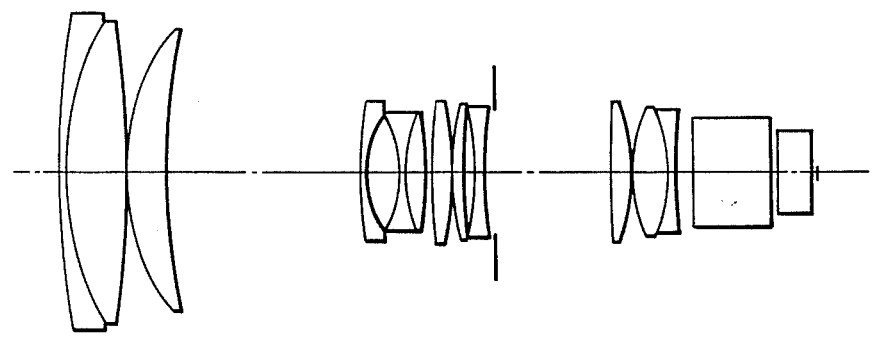

FIG. 10
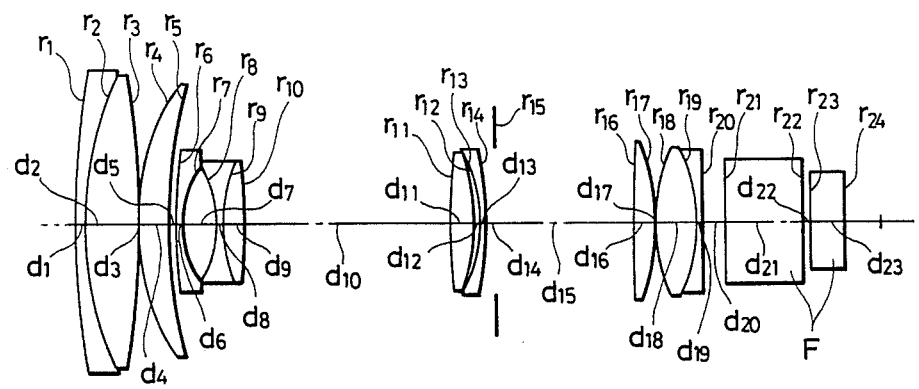
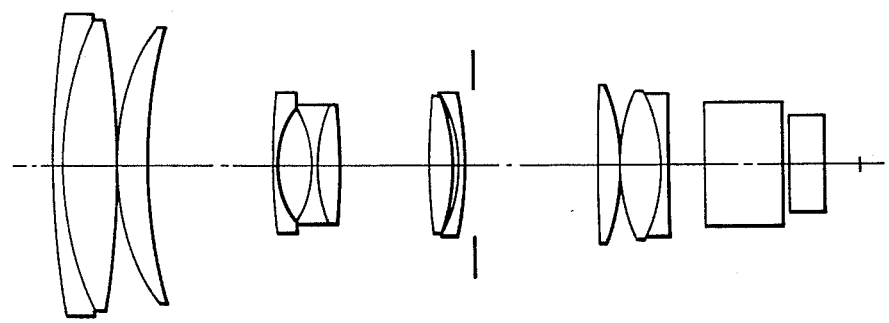
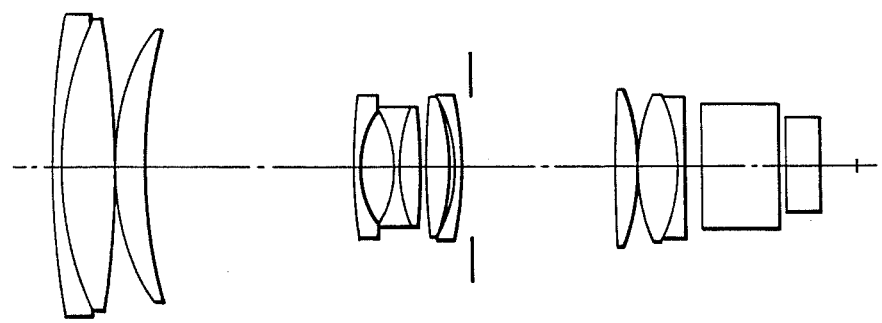

FIG. 11
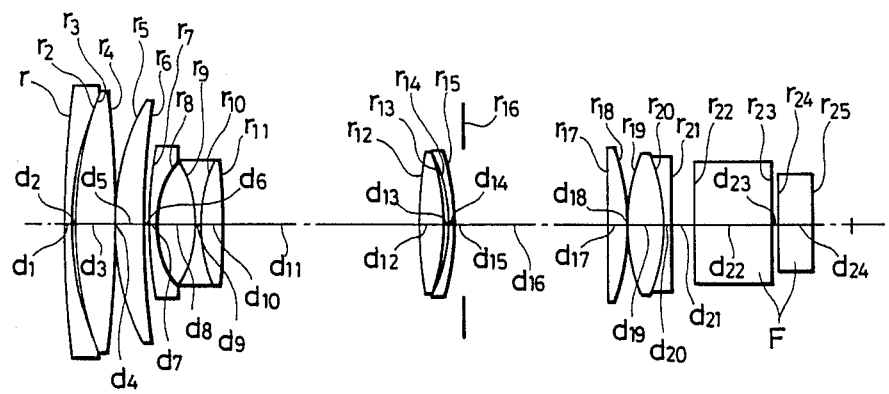
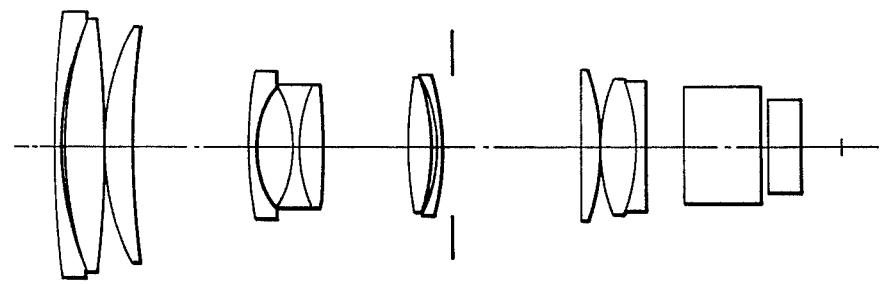
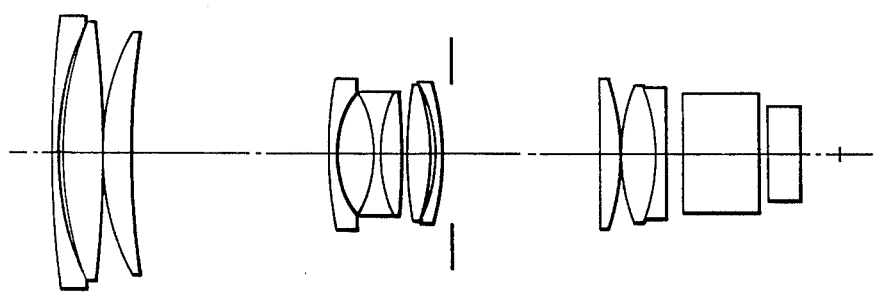

FIG. 12
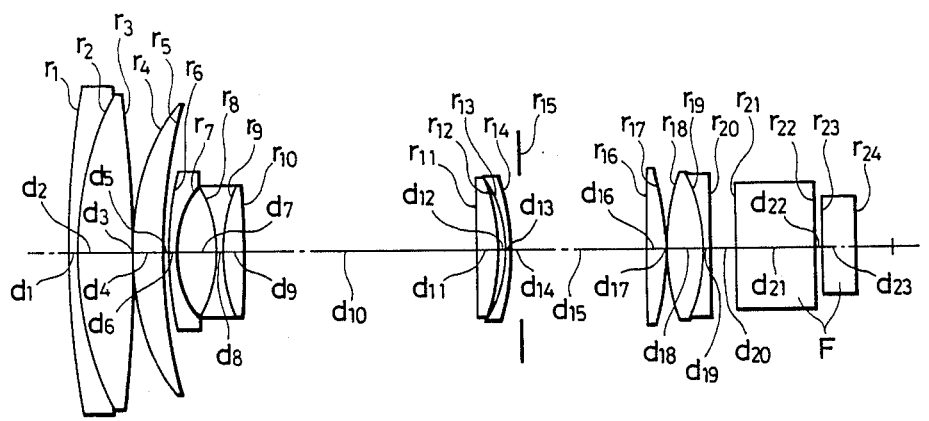
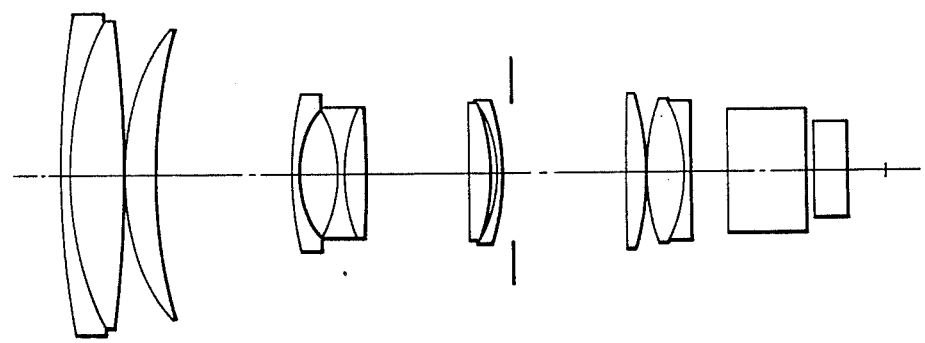
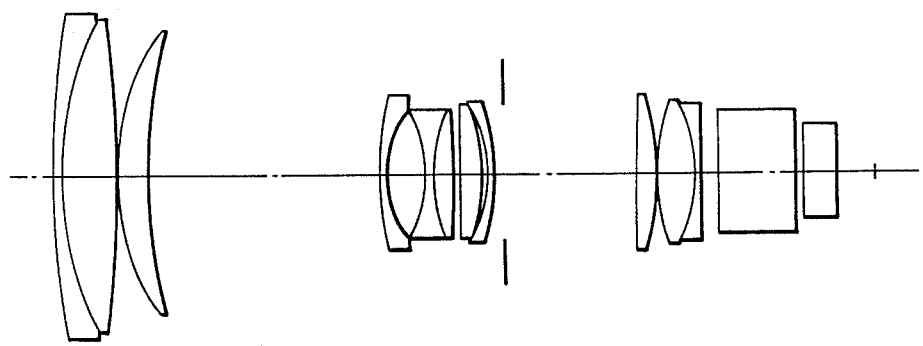

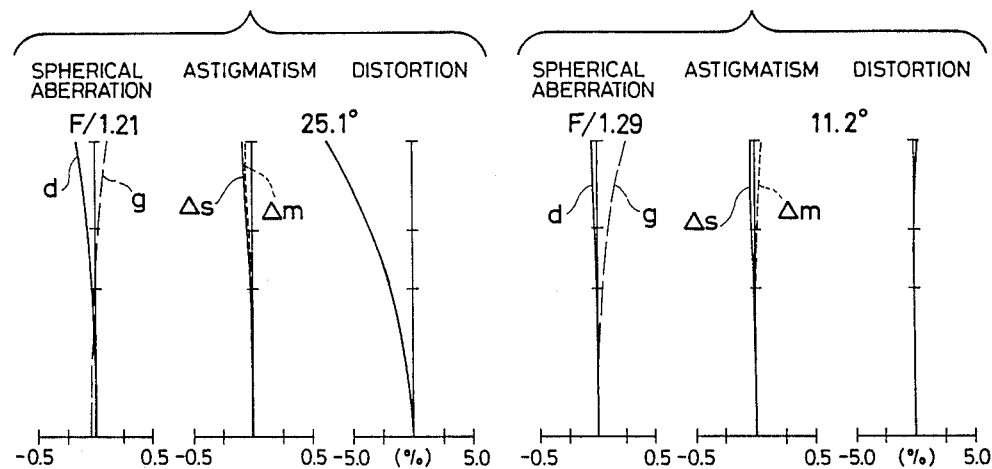
FIG. 21A
FIG. 21B
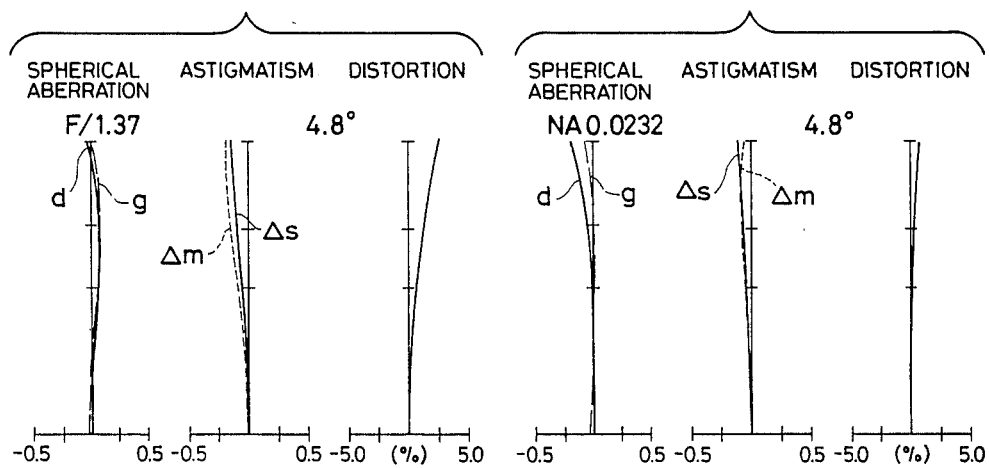
FIG. 21C
FIG. 21D

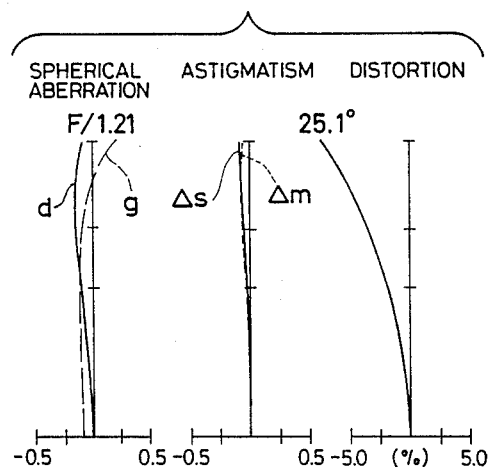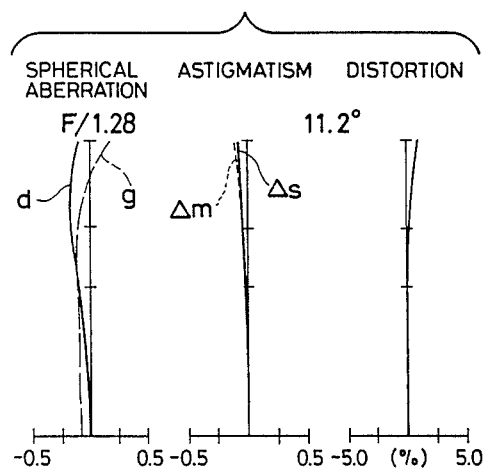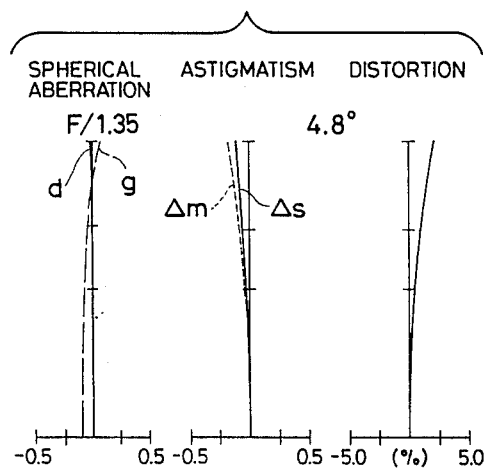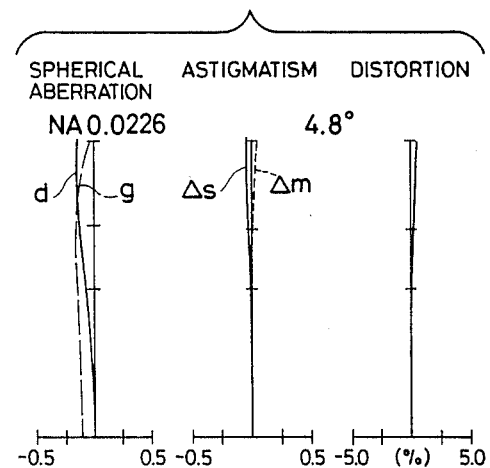

VARI-FOCAL LENS SYSTEM

BACKGROUND OF THE INVENTION

1. Field of the Invention

The present invention relates to a vari-focal lens system and, more particularly, to a vari-focal lens system with a large aperture ratio and high vari-focal ratio.

2. Description of the Prior Art

Recently, still cameras and video cameras provided with automatic focusing systems are drawing attention because they make it possible to omit the focusing operation to be performed by the operator. The largest merit of automatic focusing is a high focusing speed. The focusing speed is decided by the type and circuit of the automatic focusing system, torque of the drive motor, weight of lenses to be moved for focusing, moving distances of those lenses, etc. Therefore, it is preferable to arrange the lens system so that the lens group to be moved for focusing is as light as possible and the amount of movement thereof is as small as possible.

Besides, lately provided known vari-focal lens systems show such tendency that both of the number of lens groups to be moved when varying the focal length of the lens system and number of lens groups to be moved at the time of focusing become larger and, therefore, they have such disadvantages that the lens moving mechanism thereof becomes complicated and the cost of production becomes high.

For example, most of known vari-focal lens systems are arranged that at least three lens groups should be moved for focusing and for varying the focal length. Some of known vari-focal lens systems are arranged that only two lens groups are moved for varying the focal length and for focusing. However, those known vari-focal lens systems have a disadvantage that the front lens group with a comparatively large lens diameter is to be moved.

Here, let us discuss the problems about vari-focal lens systems for cameras wherein an electronic image pick-up tube or solid-state image sensor is used as the image pick-up device. The above-mentioned kind of known vari-focal lens systems provided lately are arranged that the vari-focal ratio is 3 to 8, the focal length in the wide position is approximately equal to the length of the diagonal line of the image surface, the sensitivity of the image sensor is low and, therefore, the F-number is smaller than 2.0, i.e., the lens system is bright. Said known lens systems are generally arranged to comprise four lens groups, i.e., a focusing lens group, a focal length varying lens group, a compensating lens group for compensating the displacement of the focal point (so-called compensator), and a relay lens group to be kept fixed, and arranged that the focusing lens group is moved at the time of focusing while the focal length varying lens group and compensating lens group are moved along the optical axis when varying the focal length. Said vari-focal lens systems have problems described below. That is, as the focusing lens group is heavy, the response at the time of focusing becomes low and the power consumption becomes large. Moreover, the eclipse of offaxial rays becomes larger when the focusing lens group is advanced at the time of focusing of an object at a short distance. Therefore, it is necessary to make the front lens diameter still larger, and this is more disadvantageous.

To solve the above-mentioned problem, some of known vari-focal lens systems are arranged to be focused by moving the lens groups located in the rear part of the lens system whose lens diameters are small. However, in case of the above-mentioned known lens systems, the number of lens groups to be moved for focusing and for varying the focal length is large, i.e., three of more. The lens system disclosed in Japanese published unexamined patent application No. 28119/84 is known as a vari-focal lens system arranged to move only two lens groups. However, said known vari-focal lens system has a disadvantage that the variation of aberrations, especially the variation of astigmatism, is large when focused on an object at a short distance.

As one of problems related to optical systems to be used with an electronic image pick-up device, there is a problem of the back focal length. That is, the size of the image surface is small, i.e., about ¼ to 1/5 of 35 mm format and, moreover, the electronic image pick-up device is being smaller and smaller year after year. Therefore, the focal length of the photographing lens system should be made short. As a result, the back focal length becomes necessarily short. Especially, between the rearmost surface (surface closest to the image surface) of the lens system and image surface, it is indispensable to reserve a space for inserting a thick quartz crystal filter or infrared ray eliminating filter as a low-pass filter. Moreover, when the single-lens reflex type is adopted, a space for inserting a quick return mirror or half mirror should be reserved in order to provide a finder optical system. In addition to the above, it may be necessary to insert a light measuring prism etc. Therefore, it is inconvenient when the back focal length is short. This means that it is especially required to provide a lens system whose back focal length is long compared with the focal length.

SUMMARY OF THE INVENTION

It is, therefore, a primary object of the present invention to provide a vari-focal lens system arranged that a lens group which is small in diameter and light in weight is arranged as a focusing lens group, only two lens groups are to be moved for focusing and for varying the focal length of the lens system as a whole, the variation of aberrations to be caused at the time of focusing is made as small as possible, and the back focal length converted into the air (optical path length from the rearmost surface of the lens system to the image surface is maintained as 0.6 times or more of the geometrical mean between the shortest focal length and the longest focal length, said vari-focal lens system being further arranged to have a large aperture ratio, high vari-focal ratio and high performance.

The vari-focal lens system according to the present invention is arranged to comprise, in the order from the object side, a first lens group having a positive focal length and arranged to be always kept fixed, a second lens group having a negative focal length and arranged to be movable along the optical axis when varying the focal length of the lens system as a whole and to be kept fixed at the time of focusing, a third lens group having a positive focal length and arranged to be always kept fixed, and a fourth lens group having a positive focal length which is located by leaving a comparatively large airspace in respect to the third lens group and which is arranged to be moved so as to compensate the displacement of the focal point caused when varying the focal length of the lens system as a whole and, moreover, arranged that the fourth lens group as a whole is moved for the purpose of focusing.

Furthermore, the vari-focal lens system according to the present invention makes it possible to obtain a lens system having more favourable performance when said vari-focal lens system is arranged that the first lens group comprises a negative lens, a positive lens and a positive lens, the second lens group comprises a negative lens, a negative lens and a positive lens, the third lens group comprises at least one positive lens and a negative lens, and the fourth lens group comprises a negative lens, a positive lens and a positive lens or comprises a positive lens, a positive lens and a negative lens, and that said vari-focal lens system fulfills the conditions (1) through (10) shown below:

$$-0.5 < f_T/f_{AT} < 0.35 \tag{1}$$

$$0.8 < f_4/\sqrt{f_W \cdot f_T} < 1.3 \tag{2}$$

$$0.2 < D_T/\sqrt{f_W \cdot f_T} < 1.4 \tag{3}$$

$$0.4 < t_I/\sqrt{f_W \cdot f_T} < 0.64 \tag{4}$$

$$1.7 < f_I/\sqrt{f_W \cdot f_T} < 0.3 \tag{5}$$

$$0.4 < |f_{II}|/\sqrt{f_W \cdot f_T} < 0.75 \tag{6}$$

$$0.04 < n_6 - n_5 < 0.25 \tag{7}$$

$$15 < \nu_5 - \nu_6 < 45 \tag{8}$$

$$0.04 < n_{IVn} - n_{IVp} < 0.37 \tag{9}$$

$$20 < \nu_{IVp} - \nu_{IVn} \tag{10}$$

where, reference symbol $f_T$ represents the longest focal length of the lens system as a whole, reference symbol $f_{AT}$ represents the total focal length of the first, second and third lens groups in the position of the longest focal length, reference symbol $f_W$ represents the shortest focal length of the lens system as a whole, reference symbol $f_4$ represents the total focal length of the fourth lens group, reference symbol $D_T$ represents the airspace between the third and fourth lens groups when focused on an object at the infinite distance in the position of the longest focal length, reference symbol $t_I$ represents the distance from the foremost surface (surface closest to the object side) to the rearmost surface (surface closest to the image side) of the first lens group, reference symbol $f_I$ represents the total focal length of the first lens group, reference symbol $f_{II}$ represents the total focal length of the second lens group, reference symbol $n_5$ represents the refractive index of the second negative lens in the second lens group, reference symbol $n_6$ represents the refractive index of the positive lens in the second lens group, reference symbol $\nu_5$ represents Abbe's number of the second negative lens in the second lens group, reference symbol $\nu_6$ represents Abbe's number of the positive lens in the second lens group, reference symbol $n_{IVp}$ represents the refractive index of the positive lens constituting the fourth lens group and located just adjacent to the negative lens therein, reference symbol $n_{IVn}$ represents the refractive index of the negative lens in the fourth lens group, reference symbol $\nu_{IVp}$ represents Abbe's number of the positive lens constituting the fourth lens group and located just adjacent to the negative lens therein, and reference symbol $\nu_{IVn}$ represents Abbe's number of the negative lens in the fourth lens group.

The largest characteristic of the vari-focal lens system according to the present invention is that the fourth lens group, which is small in size and light in weight, is arranged as the focusing lens group and, moreover, said fourth lens group is arranged to be movable also when varying the focal length of the lens system as a whole so as to make it also possible to compensate the displacement of the focal point to be caused when varying the focal length, said vari-focal lens system being thereby arranged that only two lens groups are to be moved for varying the focal length and for focusing.

The above-mentioned arrangement makes it possible to attain automatic focusing means wherein the lens group to be moved is light in weight, response is quick, and power comsumption is small. Moreover, as the number of movable lens groups is made small, the mechanism becomes simple, it is advantageous also from the view point of the cost of manufacture, and it is also possible to minimize the decentering of the lens groups. Furthermore, the power consumption required when performing power zooming also becomes small.

Moreover, as the vari-focal lens system according to the present invention is arranged that the rays become approximately afocal in the airspace between the third and fourth lens groups and the value of said airspace is selected in the necessary and sufficient range, it is possible to make the range of object distance available for focusing (range of photographing magnification) wider compared with known vari-focal lens systems, which are arranged to be focused by advancing the first lens group, from all of the mechanical view point, view point to make the variation of aberrations small and, furthermore, view point to prevent decrease in the intensity of light in the marginal portion (especially, the view point to prevent the eclipse of principal rays). Especially, in the position of the short focal length, it is also possible to perform close-up photographing.

Now, the conditions (1) through (10) shown before are described below.

The condition (1) defines the total focal length of the first, second and third lens group in the position of the longest focal length. If the heights of incidence of paraxial rays, which are incident on the fourth lens group which has the focusing function, vary when the fourth lens group is moved at the time of focusing, spherical aberration varies largely at the time of focusing. When the total focal length of the first, second and third lens groups is selected in the range defined by the condition (1), paraxial rays incident on the fourth lens group become approximately parallel and, therefore, the variation of spherical aberration to be caused at the time of focusing becomes small. If the value of $f_T/f_{AT}$ becomes larger that the upper limit of the condition (1), spherical aberration tends to become a negative value with a large absolute value when the object distance for focusing beomces shorter. If the value of $f_T/f_{AT}$ becomes smaller than the lower limit of the condition (1), spherical aberration tends to become a large positive value when the object distance for focusing becomes shorter.

The condition (2) defines the total focal length of the fourth lens group. To make the back focal length of the lens system as a whole long, it is preferable to make the total focal length of the fourth lens group somewhat long because the lens system is arranged that the rays coming out from the third lens group become approximately afocal. When the value defined by the condition (2) becomes larger than the upper limit thereof, it is advantageous for making the back focal length long. However, the advancing amount of the fourth lens group required at the time of focusing becomes large and, moreover, the lens diameters thereof become large. Therefore, at the time of automatic focusing, the power consumption tends to increase and the response speed tends to decrease. If the value defined by the condition (2) becomes smaller than the lower limit thereof, it becomes difficult to ensure a sufficient back focal length. If the back focal length is made long in that case, the value of $f_T/f_{4T}$ tends to become larger than the upper limit of the condition (1), and this is not desirable.

The condition (3) defines the airspace between the third and fourth lens groups when the lens system is focused on an object at the infinite distance in the teleposition, i.e., in the position of the longest focal length. As the airspace between the third and fourth lens groups is to be varied for the purpose of focusing, a sufficient value of airspace should be ensured. However, if said airspace is made large to the degree that the value defined by the condition (3) becomes larger than the upper limit thereof, the exit pupil comes to a position in rear of the image surface, and diameters of lenses constituting the fourth lens group become large. Moreover, the overall length of the lens system becomes long. If the value defined by the condition (3) becomes smaller than the lower limit thereof, the airspace available for focusing becomes insufficient. As a result, the shortest object distance available for focusing becomes long, and this is not desirable.

The condition (4) defines the distance between the foremost surface and rearmost surface of the first lens group. For the lens system according to the present invention, importance is attached also to the fact to arrange that the first lens group, whose lens diameters tend to become large and which tends to become heavy, becomes small in diameter and light in weight. For this purpose, it is preferable to made the total thickness of the first lens group as small as possible. Besides, when the total thickness of the first lens group is made small, it is possible to make the distance between the position of the exit pupil and the foremost surface short. Therefore, it is possible to make the heights of offaxial rays in the first lens group low and, consequently, it is possible to make the first lens group small in diameter and light in weight. If the value defined by the condition (4) becomes larger than the upper limit thereof, the first lens group tends to become large and heavy. If the value defined by the condition (4) becomes smaller than the lower limit thereof, to ensure a certain thickness of the circumferential portion of the positive lens constituting the first lens group, curvature of said positive lens should be made weak and, consequently, spherical aberration and chromatic aberration to be caused by the first lens group tend to be undercorrected.

The condition (5) defines the total focal length of the first lens group. When the value defined by the condition (5) becomes larger than the upper limit thereof, it is advantageous for correction of aberrations and for making the front lens small in diameter. However, the overall length of the lens system tends to become long. If the value defined by the condition (5) becomes smaller than the lower limit thereof, powers of respective lenses constituting the first lens group become large, and this is disadvantageous for correction of aberrations. Moreover, as curvatures of respective lenses become strong, to ensure certain thicknesses of those lenses, it becomes necessary to make the diameter of the first lens group large.

The condition (6) defines the total focal length of the second lens group. If the value defined by the conditon (6) becomes larger than the upper limit thereof, the vari-focal ratio becomes low or the amount of movement of the second lens group when varying the focal length of the lens system becomes large. If the value defined by the condition (6) becomes smaller than the lower limit thereof, the variation of aberrations to be caused when varying the focal length of the lens system becomes large.

The condition (7) defines the difference between the refractive index of the second negative lens in the second lens group and refractive index of the positive lens in the second lens group. If the value defined by the condition (7) becomes smaller than the lower limit thereof, the variation of aberrations to be caused when varying the focal length of the lens system tends to become large. When the value defined by the condition (7) becomes larger than the upper limit thereof, a glass material with a low refractive index should be used for said second negative lens, and this also tends to cause the variation of aberrations when varying the focal length, of the lens system.

The condition (8) defines the difference between Abbe's number of the second negative lens in the second lens group and Abbe's number of the positive lens in the second lens group. If the value defined by the condition (8) becomes larger than the upper limit thereof or smaller than the lower limit thereof, both of the variation of longitudinal chromatic aberration and variation of lateral chromatic aberration tend to become large when varying the focal length of the lens system.

The condition (9) defines the difference between the refractive index of the negative lens in the fourth lens group and refractive index of the positive lens located just adjacent to said negative lens therein. When the difference between refractive indices of said lenses is large, it is advantageous for correction of spherical aberration. However, if the value defined by the condition (9) becomes larger than the upper limit thereof, a glass material with a considerably low refractive index should be selected for said positive lens due to the reason related to the actually existing glass materials which can be used for said negative lens. As a result, spherical aberration occurs, and this is not desirable. If the value defined by the condition (9) becomes smaller than the lower limit thereof, spherical aberration tends to be undercorrected.

The condition (10) defines the difference between Abbe's number of the negative lens in the fourth lens group and Abbe's number of the positive lens located just adjacent to said negative lens therein. When the value defined by the condition (10) becomes smaller than the lower limit thereof, lateral chromatic aberration tends to be undercorrected though it may be possible to correct longitudinal chromatic aberration.

In case that the fourth lens group is arranged to have both of the function to compensate the displacement of the focal point to be caused when varying the focal length of the lens system and the focusing function (rear focusing function) as in case of the vari-focal lens system according to the present invention, the position of the fourth lens group varies with the focal length even when the lens system is focused on an object at the same object distance. In this regard, the lens moving mechanism becomes more complicated compared with the case of known zoom lens systems. At present, however, so-called automatic focusing means are widely used and they serve to electrically detect the amount of movement of the lens group required for focusing and to focus the lens system by feeding the detected amount back to the focusing lens group. Therefore, when an automatic focusing means is used, it is possible to easily perform focusing and compensation of displacement of the focal point caused by zooming. Besides, even when an automatic focusing means is not used, it is possible to arrange that the correlation between the object distance, focal length f of the lens system and position of the fourth lens group (advancing amount s of the fourth lens group for focusing) as shown in FIG. 25 is stored in a memory means and to electrically control the fourth lens group so that the fourth lens group moves according to said correlation stored in the memory means when the photographer zooms the lens system after focusing it on an object in a position of a certain focal length of the lens system. Therefore, when arranged as above, the displacement of the focal point does not occur even when the lens system is zoomed.

BRIEF DESCRIPTION OF THE DRAWINGS

FIGS. 1 through 12 respectively show sectional views of Embodiments 1 through 12 of the vari-focal lens system according to the present invention;

FIGS. 13 through 24 respectively show graphs illustrating aberration curves of Embodiments 1 through 12 of the present invention.

DETAILED DESCRIPTION OF THE PREFERRED EMBODIMENTS

Figure 13A:
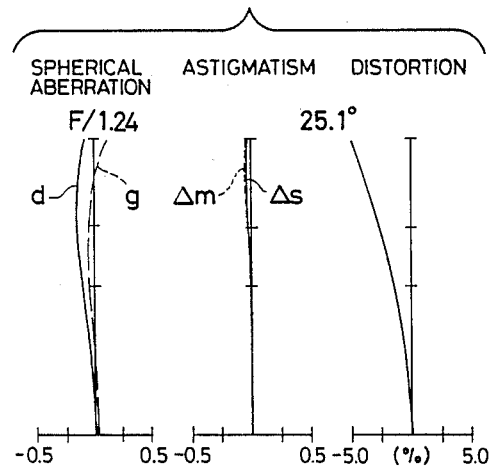

Now, the preferred embodiments of the vari-focal lens system according to the present invention are shown below.

| Embodiment 1 | | | |
|---|---|---|---|
| f = 12~72 | F/1.2~F/1.7 | | |
| $r_1 = 160.1139$ | | | |
| | $d_1 = 1.5000$ | $n_1 = 1.80518$ | $\nu_1 = 25.43$ |
| $r_2 = 56.7068$ | | | |
| | $d_2 = 0.6000$ | | |
| $r_3 = 63.5411$ | | | |
| | $d_3 = 8.7000$ | $n_2 = 1.60311$ | $\nu_2 = 60.70$ |
| $r_4 = -118.9448$ | | | |
| | $d_4 = 0.1500$ | | |
| $r_5 = 34.6640$ | | | |
| | $d_5 = 5.9000$ | $n_3 = 1.60311$ | $\nu_3 = 60.70$ |
| $r_6 = 96.5476$ | | | |
| | $d_6 = D_1$ (variable) | | |
| $r_7 = 56.5891$ | | | |
| | $d_7 = 1.0000$ | $n_4 = 1.83400$ | $\nu_4 = 37.16$ |
| $r_8 = 14.1280$ | | | |
| | $d_8 = 5.8000$ | | |
| $r_9 = -16.8744$ | | | |
| | $d_9 = 1.0000$ | $n_5 = 1.69700$ | $\nu_5 = 48.51$ |
| $r_{10} = 21.7195$ | | | |
| | $d_{10} = 3.8000$ | $n_6 = 1.84666$ | $\nu_6 = 23.78$ |
| $r_{11} = -80.2671$ | | | |
| | $d_{11} = D_2$ (variable) | | |
| $r_{12} = 45.6568$ | | | |
| | $d_{12} = 4.9000$ | $n_7 = 1.77250$ | $\nu_7 = 49.66$ |
| $r_{13} = -60.9922$ | | | |
| | $d_{13} = 1.0000$ | | |
| $r_{14} = \infty$ (stop) | | | |

-continued

| Embodiment 1 | | | |
|---|---|---|---|
| f = 12~72 | F/1.2~F/1.7 | | |
| | $d_{14} = 3.0000$ | | |
| $r_{15} = 27.0781$ | | | |
| | $d_{15} = 3.6000$ | $n_8 = 1.69680$ | $\nu_8 = 55.52$ |
| $r_{16} = 158.3382$ | | | |
| | $d_{16} = 1.8000$ | | |
| $r_{17} = -55.6584$ | | | |
| | $d_{17} = 1.1000$ | $n_9 = 1.84666$ | $\nu_9 = 23.78$ |
| $r_{18} = 67.4790$ | | | |
| | $d_{18} = D_3$ (variable) | | |
| $r_{19} = 441.5308$ | | | |
| | $d_{19} = 1.2000$ | $n_{10} = 1.84666$ | $\nu_{10} = 23.78$ |
| $r_{20} = 29.7156$ | | | |
| | $d_{20} = 1.0000$ | | |
| $r_{21} = 62.2357$ | | | |
| | $d_{21} = 3.8000$ | $n_{11} = 1.69680$ | $\nu_{11} = 55.52$ |
| $r_{22} = -31.9184$ | | | |
| | $d_{22} = 0.1500$ | | |
| $r_{23} = 21.5326$ | | | |
| | $d_{23} = 3.3000$ | $n_{12} = 1.69680$ | $\nu_{12} = 55.52$ |
| $r_{24} = 118.4843$ | | | |
| | $d_{24} = D_4$ (variable) | | |
| $r_{25} = \infty$ | | | |
| | $d_{25} = 14.0000$ | $n_{13} = 1.51633$ | $\nu_{13} = 64.15$ |
| $r_{26} = \infty$ | | | |
| | $d_{26} = 1.0000$ | | |
| $r_{27} = \infty$ | | | |
| | $d_{27} = 6.0000$ | $n_{14} = 1.51633$ | $\nu_{14} = 64.15$ |
| $r_{28} = \infty$ | | | |

| f | 12 | 29 | 72 |
|---|---|---|---|
| $D_1$ | 1.000 | 18.453 | 30.158 |
| $D_2$ | 30.658 | 13.206 | 1.500 |
| $D_3$ | 14.494 | 9.838 | 12.332 |
| $D_4$ | 3.000 | 7.656 | 5.162 |

$f_T/f_{AT} = 0.238$ $t_I/\sqrt{f_W \cdot f_T} = 0.574$ $|f_{II}|/\sqrt{f_W \cdot f_T} = 0.482$ $\nu_5 - \nu_6 = 24.73$ $\nu_{IVp} - \nu_{IVn} = 31.74$ $D_T/\sqrt{f_W \cdot f_T} = 0.420$ $f_4/\sqrt{f_W \cdot f_T} = 0.931$ $f_I/\sqrt{f_W \cdot f_T} = 1.989$ $n_6 - n_5 = 0.14966$ $n_{IVn} - n_{IVp} = 0.14986$ $f_{BW}/\sqrt{f_W \cdot f_T} = 0.613$ $s_T = 4.224$

| Embodiment 2 | | | |
|---|---|---|---|
| f = 12~72 | F/1.2~F/1.7 | | |
| $r_1 = 135.4596$ | | | |
| | $d_1 = 1.5000$ | $n_1 = 1.80518$ | $\nu_1 = 25.43$ |
| $r_2 = 53.4855$ | | | |
| | $d_2 = 0.4000$ | | |
| $r_3 = 57.1682$ | | | |
| | $d_3 = 8.5000$ | $n_2 = 1.60311$ | $\nu_2 = 60.70$ |
| $r_4 = -156.9705$ | | | |
| | $d_4 = 0.1500$ | | |
| $r_5 = 36.1375$ | | | |
| | $d_5 = 5.5000$ | $n_3 = 1.60311$ | $\nu_3 = 60.70$ |
| $r_6 = 113.9903$ | | | |
| | $d_6 = D_1$ (variable) | | |
| $r_7 = 47.6409$ | | | |
| | $d_7 = 1.0000$ | $n_4 = 1.83400$ | $\nu_4 = 37.16$ |
| $r_8 = 13.4748$ | | | |
| | $d_8 = 6.0000$ | | |
| $r_9 = -17.1192$ | | | |
| | $d_9 = 1.0000$ | $n_5 = 1.69700$ | $\nu_5 = 48.51$ |
| $r_{10} = 19.7618$ | | | |
| | $d_{10} = 4.0000$ | $n_6 = 1.84666$ | $\nu_6 = 23.78$ |
| $r_{11} = -82.2933$ | | | |

-continued

Embodiment 2
f = 12~72    F/1.2~F/1.7

| | | | |
|---|---|---|---|
| | $d_{11} = D_2$ (variable) | | |
| $r_{12} = -303.1840$ | | | |
| | $d_{12} = 2.7000$ | $n_7 = 1.77250$ | $\nu_7 = 49.66$ |
| $r_{13} = -50.3064$ | | | |
| | $d_{13} = 1.0000$ | | |
| $r_{14} = \infty$ (stop) | | | |
| | $d_{14} = 3.0000$ | | |
| $r_{15} = 38.9098$ | | | |
| | $d_{15} = 4.0000$ | $n_8 = 1.69680$ | $\nu_8 = 55.52$ |
| $r_{16} = -343.4102$ | | | |
| | $d_{16} = 1.6000$ | | |
| $r_{17} = -56.3115$ | | | |
| | $d_{17} = 1.1000$ | $n_9 = 1.84666$ | $\nu_9 = 23.78$ |
| $r_{18} = -274.6890$ | | | |
| | $d_{18} = D_3$ (variable) | | |
| $r_{19} = -838.5286$ | | | |
| | $d_{19} = 1.2000$ | $n_{10} = 1.84666$ | $\nu_{10} = 23.78$ |
| $r_{20} = 33.5553$ | | | |
| | $d_{20} = 0.3500$ | | |
| $r_{21} = 40.3991$ | | | |
| | $d_{21} = 5.3000$ | $n_{11} = 1.69680$ | $\nu_{11} = 55.52$ |
| $r_{22} = -40.8461$ | | | |
| | $d_{22} = 0.1500$ | | |
| $r_{23} = 26.1082$ | | | |
| | $d_{23} = 4.1000$ | $n_{12} = 1.69680$ | $\nu_{12} = 55.52$ |
| $r_{24} = 200.0303$ | | | |
| | $d_{24} = D_4$ (variable) | | |
| $r_{25} = \infty$ | | | |
| | $d_{25} = 14.0000$ | $n_{13} = 1.51633$ | $\nu_{13} = 64.15$ |
| $r_{26} = \infty$ | | | |
| | $d_{26} = 1.0000$ | | |
| $r_{27} = \infty$ | | | |
| | $d_{27} = 6.0000$ | $n_{14} = 1.51633$ | $\nu_{14} = 64.15$ |
| $r_{28} = \infty$ | | | |

| f | 12 | 29 | 72 |
|---|---|---|---|
| $D_1$ | 1.000 | 18.851 | 30.454 |
| $D_2$ | 30.645 | 12.794 | 1.192 |
| $D_3$ | 25.803 | 21.561 | 24.164 |
| $D_4$ | 3.000 | 7.242 | 4.638 |

$F_T/f_{AT} = 0.099$ $f_4/\sqrt{f_W \cdot f_T} = 1.025$ $t_I/\sqrt{f_W \cdot f_T} = 0.546$ $f_I/\sqrt{f_W \cdot f_T} = 2.004$ $|f_{II}|/\sqrt{f_W \cdot f_T} = 0.490$ $n_6 - n_5 = 0.14966$ $\nu_5 - \nu_6 = 24.73$ $n_{IVn} - n_{IVp} = 0.14986$ $\nu_{IVp} - \nu_{IVn} = 31.74$ $f_{BW}/\sqrt{f_W \cdot f_T} = 0.815$ $s_T = 4.023$ $D_T/\sqrt{f_W \cdot f_T} = 0.823$

Embodiment 3
f = 12~72    F/1.2~F/1.8

| | | | |
|---|---|---|---|
| $r_1 = 123.7332$ | | | |
| | $d_1 = 1.5000$ | $n_1 = 1.80518$ | $\nu_1 = 25.43$ |
| $r_2 = 52.2449$ | | | |
| | $d_2 = 0.3000$ | | |
| $r_3 = 56.2238$ | | | |
| | $d_3 = 7.2000$ | $n_2 = 1.60311$ | $\nu_2 = 60.70$ |
| $r_4 = -161.1663$ | | | |
| | $d_4 = 0.1500$ | | |
| $r_5 = 34.5295$ | | | |
| | $d_5 = 5.7000$ | $n_3 = 1.60311$ | $\nu_3 = 60.70$ |
| $r_6 = 114.2507$ | | | |
| | $d_6 = D_1$ (variable) | | |
| $r_7 = 50.8351$ | | | |
| | $d_7 = 1.0000$ | $n_4 = 1.83400$ | $\nu_4 = 37.16$ |
| $r_8 = 13.7931$ | | | |
| | $d_8 = 6.8000$ | | |
| $r_9 = -16.1577$ | | | |
| | $d_9 = 1.0000$ | $n_5 = 1.67790$ | $\nu_5 = 55.33$ |
| $r_{10} = 22.2461$ | | | |
| | $d_{10} = 3.7000$ | $n_6 = 1.84666$ | $\nu_6 = 23.78$ |
| $r_{11} = -161.9847$ | | | |
| | $d_{11} = D_2$ (variable) | | |
| $r_{12} = -1356.9084$ | | | |
| | $d_{12} = 3.7000$ | $n_7 = 1.83400$ | $\nu_7 = 37.16$ |
| $r_{13} = -44.0824$ | | | |
| | $d_{13} = 1.0000$ | | |
| $r_{14} = \infty$ (stop) | | | |
| | $d_{14} = 3.000$ | | |
| $r_{15} = 41.3545$ | | | |
| | $d_{15} = 4.5000$ | $n_8 = 1.69680$ | $\nu_8 = 55.52$ |
| $r_{16} = -136.6095$ | | | |
| | $d_{16} = 1.3000$ | | |
| $r_{17} = 51.0155$ | | | |
| | $d_{17} = 1.1000$ | $n_9 = 1.84666$ | $\nu_9 = 23.78$ |
| $r_{18} = 351.8015$ | | | |
| | $d_{18} = D_3$ (variable) | | |
| $r_{19} = 71.3423$ | | | |
| | $d_{19} = 1.2000$ | $n_{10} = 1.84666$ | $\nu_{10} = 23.78$ |
| $r_{20} = 32.6618$ | | | |
| | $d_{20} = 1.1000$ | | |
| $r_{21} = 51.4512$ | | | |
| | $d_{21} = 5.9000$ | $n_{11} = 1.48749$ | $\nu_{11} = 70.20$ |
| $r_{22} = -33.9160$ | | | |
| | $d_{22} = 0.1500$ | | |
| $r_{23} = 25.4014$ | | | |
| | $d_{23} = 5.1000$ | $n_{12} = 1.48749$ | $\nu_{12} = 70.20$ |
| $r_{24} = -375.7640$ | | | |
| | $d_{24} = D_4$ (variable) | | |
| $r_{25} = \infty$ | | | |
| | $d_{25} = 14.0000$ | $n_{13} = 1.51633$ | $\nu_{13} = 64.15$ |
| $r_{26} = \infty$ | | | |
| | $d_{26} = 1.0000$ | | |
| $r_{27} = \infty$ | | | |
| | $d_{27} = 6.0000$ | $n_{14} = 1.51633$ | $\nu_{14} = 64.15$ |
| $r_{28} = \infty$ | | | |

| f | 12 | 29 | 72 |
|---|---|---|---|
| $D_1$ | 1.000 | 17.251 | 27.885 |
| $D_2$ | 31.380 | 15.129 | 4.495 |
| $D_3$ | 21.754 | 16.513 | 18.240 |
| $D_4$ | 3.000 | 8.241 | 6.513 |

$f_T/f_{AT} = 0.063$ $f_4/\sqrt{f_W \cdot f_T} = 1.090$ $t_I/\sqrt{f_W \cdot f_T} = 0.506$ $f_I/\sqrt{f_W \cdot f_T} = 1.887$ $|f_{II}|/\sqrt{f_W \cdot f_T} = 0.429$ $n_6 - n_5 = 0.16876$ $\nu_5 - \nu_6 = 31.55$ $n_{IVn} - n_{IVp} = 0.35917$ $\nu_{IVp} - \nu_{IVn} = 46.42$ $f_{BW}/\sqrt{f_W \cdot f_T} = 0.814$ $s_T = 4.104$ $D_T/\sqrt{f_W \cdot f_T} = 0.621$

Embodiment 4
f = 12~72    F/1.2~F/1.8

| | | | |
|---|---|---|---|
| $r_1 = 144.0963$ | | | |
| | $d_1 = 1.5000$ | $n_1 = 1.80518$ | $\nu_1 = 25.43$ |
| $r_2 = 55.0145$ | | | |
| | $d_2 = 0.1600$ | | |

-continued

Embodiment 4
f = 12~72    F/1.2~F/1.8

| | | | |
|---|---|---|---|
| $r_3 = 56.7336$ | | | |
| | $d_3 = 7.2000$ | $n_2 = 1.60311$ | $\nu_2 = 60.70$ |
| $r_4 = -163.8458$ | | | |
| | $d_4 = 0.1500$ | | |
| $r_5 = 39.2075$ | | | |
| | $d_5 = 5.1000$ | $n_3 = 1.60311$ | $\nu_3 = 60.70$ |
| $r_6 = 130.5878$ | | | |
| | $d_6 = D_1$ (variable) | | |
| $r_7 = 65.3930$ | | | |
| | $d_7 = 1.0000$ | $n_4 = 1.77250$ | $\nu_4 = 49.66$ |
| $r_8 = 16.0137$ | | | |
| | $d_8 = 6.5000$ | | |
| $r_9 = -20.5600$ | | | |
| | $d_9 = 1.0000$ | $n_5 = 1.67790$ | $\nu_5 = 55.33$ |
| $r_{10} = 24.3845$ | | | |
| | $d_{10} = 3.4000$ | $n_6 = 1.84666$ | $\nu_6 = 23.78$ |
| $r_{11} = -243.3111$ | | | |
| | $d_{11} = D_2$ (variable) | | |
| $r_{12} = 239.6682$ | | | |
| | $d_{12} = 2.4000$ | $n_7 = 1.77250$ | $\nu_7 = 49.66$ |
| $r_{13} = -104.3267$ | | | |
| | $d_{13} = 1.0000$ | | |
| $r_{14} = \infty$ (stop) | | | |
| | $d_{14} = 3.0000$ | | |
| $r_{15} = 98.7511$ | | | |
| | $d_{15} = 3.2000$ | $n_8 = 1.77250$ | $\nu_8 = 49.66$ |
| $r_{16} = -73.8104$ | | | |
| | $d_{16} = 1.3000$ | | |
| $r_{17} = -34.9115$ | | | |
| | $d_{17} = 1.2000$ | $n_9 = 1.84666$ | $\nu_9 = 23.78$ |
| $r_{18} = -79.1788$ | | | |
| | $d_{18} = D_3$ (variable) | | |
| $r_{19} = 236.7931$ | | | |
| | $d_{19} = 3.7000$ | $n_{10} = 1.77250$ | $\nu_{10} = 49.66$ |
| $r_{20} = -49.2961$ | | | |
| | $d_{20} = 0.1500$ | | |
| $r_{21} = 36.8956$ | | | |
| | $d_{21} = 7.4000$ | $n_{11} = 1.69680$ | $\nu_{11} = 55.52$ |
| $r_{22} = -28.4243$ | | | |
| | $d_{22} = 1.2000$ | $n_{12} = 1.84666$ | $\nu_{12} = 23.78$ |
| $r_{23} = -740.9855$ | | | |
| | $d_{23} = D_4$ (variable) | | |
| $r_{24} = \infty$ | | | |
| | $d_{24} = 14.0000$ | $n_{13} = 1.51633$ | $\nu_{13} = 64.15$ |
| $r_{25} = \infty$ | | | |
| | $d_{25} = 1.0000$ | | |
| $r_{26} = \infty$ | | | |
| | $d_{26} = 6.0000$ | $n_{14} = 1.51633$ | $\nu_{14} = 64.15$ |
| $r_{27} = \infty$ | | | |

| f | 12 | 29 | 72 |
|---|---|---|---|
| $D_1$ | 1.000 | 19.076 | 31.852 |
| $D_2$ | 31.852 | 13.776 | 1.000 |
| $D_3$ | 24.932 | 21.747 | 25.234 |
| $D_4$ | 3.000 | 6.185 | 2.698 |

$f_T/f_{AT} = -0.002$ $f_4/\sqrt{f_W \cdot f_T} = 0.999$ $t_I/\sqrt{f_W \cdot f_T} = 0.480$     $f_I/\sqrt{f_W \cdot f_T} = 2.101$ $|f_{II}|/\sqrt{f_W \cdot f_T} = 0.541$ $\nu_5 - \nu_6 = 31.55$     $n_6 - n_5 = 0.18676$ $\nu_{IVp} - \nu_{IVn} = 31.74$     $n_{IVn} - n_{IVp} = 0.14986$ $f_{BW}/\sqrt{f_W \cdot f_T} = 0.816$ $D_T/\sqrt{f_W \cdot f_T} = 0.859$     $s_T = 4.132$

Embodiment 5
F = 12~72    F/1.2~F/1.8

| | | | |
|---|---|---|---|
| $r_1 = 238.5683$ | | | |
| | $d_1 = 1.5000$ | $n_1 = 1.80518$ | $\nu_1 = 25.43$ |
| $r_2 = 59.6039$ | | | |
| | $d_2 = 0.1300$ | | |
| $r_3 = 61.5281$ | | | |
| | $d_3 = 7.1000$ | $n_2 = 1.60311$ | $\nu_2 = 60.70$ |
| $r_4 = -150.6907$ | | | |
| | $d_4 = 0.1500$ | | |
| $r_5 = 42.2290$ | | | |
| | $d_5 = 4.7000$ | $n_3 = 1.72000$ | $\nu_3 = 50.25$ |
| $r_6 = 119.9301$ | | | |
| | $d_6 = D_1$ (variable) | | |
| $r_7 = 49.8486$ | | | |
| | $d_7 = 1.0000$ | $n_4 = 1.83400$ | $\nu_4 = 37.16$ |
| $r_8 = 16.3739$ | | | |
| | $d_8 = 6.9000$ | | |
| $r_9 = -21.0451$ | | | |
| | $d_9 = 1.0000$ | $n_5 = 1.67790$ | $\nu_5 = 55.33$ |
| $r_{10} = 24.8249$ | | | |
| | $d_{10} = 3.9000$ | $n_6 = 1.84666$ | $\nu_6 = 23.78$ |
| $r_{11} = -148.0327$ | | | |
| | $d_{11} = D_2$ (variable) | | |
| $r_{12} = 199.9856$ | | | |
| | $d_{12} = 2.4000$ | $n_7 = 1.80518$ | $\nu_7 = 25.43$ |
| $r_{13} = -84.5931$ | | | |
| | $d_{13} = 1.0000$ | | |
| $r_{14} = \infty$ (stop) | | | |
| | $d_{14} = 3.0000$ | | |
| $r_{15} = 50.2773$ | | | |
| | $d_{15} = 3.7000$ | $n_8 = 1.77250$ | $\nu_8 = 49.66$ |
| $r_{16} = -107.1752$ | | | |
| | $d_{16} = 1.2000$ | | |
| $r_{17} = -42.6456$ | | | |
| | $d_{17} = 1.2000$ | $n_9 = 1.84666$ | $\nu_9 = 23.78$ |
| $r_{18} = 129.7076$ | | | |
| | $d_{18} = D_3$ (variable) | | |
| $r_{19} = 352.8759$ | | | |
| | $d_{19} = 4.2000$ | $n_{10} = 1.77250$ | $\nu_{10} = 49.66$ |
| $r_{20} = -41.6555$ | | | |
| | $d_{20} = 0.1500$ | | |
| $r_{21} = 33.3832$ | | | |
| | $d_{21} = 7.8000$ | $n_{11} = 1.69680$ | $\nu_{11} = 55.52$ |
| $r_{22} = -29.8010$ | | | |
| | $d_{22} = 1.2000$ | $n_{12} = 1.84666$ | $\nu_{12} = 23.78$ |
| $r_{23} = 540.8846$ | | | |
| | $d_{23} = D_4$ (variable) | | |
| $r_{24} = \infty$ | | | |
| | $d_{24} = 14.0000$ | $n_{13} = 1.51633$ | $\nu_{13} = 64.15$ |
| $r_{25} = \infty$ | | | |
| | $d_{25} = 1.0000$ | | |
| $r_{26} = \infty$ | | | |
| | $d_{26} = 6.0000$ | $n_{14} = 1.51633$ | $\nu_{14} = 64.15$ |
| $r_{27} = \infty$ | | | |

| f | 12 | 29 | 72 |
|---|---|---|---|
| $D_1$ | 1.000 | 20.703 | 35.159 |
| $D_2$ | 35.159 | 15.456 | 1.000 |
| $D_3$ | 22.509 | 19.488 | 23.086 |
| $D_4$ | 3.578 | 6.598 | 3.000 |

$f_T/f_{AT} = -0.088$ $f_4/\sqrt{f_W \cdot f_T} = 1.015$ $t_I/\sqrt{f_W \cdot f_T} = 0.462$     $f_I/\sqrt{f_W \cdot f_T} = 2.259$ $|f_{II}|/\sqrt{f_W \cdot f_T} = 0.602$ $n_6 - n_5 = 0.16876$ $\nu_5 - \nu_6 = 31.55$     $n_{IVn} - n_{IVp} = 0.14986$ $\nu_{IVp} - \nu_{IVn} = 31.74$ $f_{BW}/\sqrt{f_W \cdot f_T} = 0.836$

-continued
Embodiment 5
$F = 12 \sim 72$  $F/1.2 \sim F/1.8$ $D_T/\sqrt{f_W \cdot f_T} = 0.786$  $s_T = 4.282$

Embodiment 6
$f = 12 \sim 72$  $F/1.2 \sim f/1.7$

| | | | |
|---|---|---|---|
| $r_1 = 239.9118$ | | | |
| | $d_1 = 1.5000$ | $n_1 = 1.80518$ | $\nu_1 = 25.43$ |
| $r_2 = 59.3936$ | | | |
| | $d_2 = 0.1000$ | | |
| $r_3 = 60.8202$ | | | |
| | $d_3 = 7.2000$ | $n_2 = 1.60311$ | $\nu_2 = 60.70$ |
| $r_4 = -142.9706$ | | | |
| | $d_4 = 0.1500$ | | |
| $r_5 = 41.7740$ | | | |
| | $d_5 = 4.5000$ | $n_3 = 1.72000$ | $\nu_3 = 50.25$ |
| $r_6 = 109.6368$ | | | |
| | $d_6 = D_1$ (variable) | | |
| $r_7 = 51.6613$ | | | |
| | $d_7 = 1.0000$ | $n_4 = 1.83400$ | $\nu_4 = 37.16$ |
| $r_8 = 16.5840$ | | | |
| | $d_8 = 6.9000$ | | |
| $r_9 = -21.2063$ | | | |
| | $d_9 = 1.0000$ | $n_5 = 1.67790$ | $\nu_5 = 55.33$ |
| $r_{10} = 25.5470$ | | | |
| | $d_{10} = 3.9000$ | $n_6 = 1.84666$ | $\nu_6 = 23.78$ |
| $r_{11} = -148.7898$ | | | |
| | $d_{11} = D_2$ (variable) | | |
| $r_{12} = 134.9300$ | | | |
| | $d_{12} = 2.9000$ | $n_7 = 1.80518$ | $\nu_7 = 25.43$ |
| $r_{13} = -78.1776$ | | | |
| | $d_{13} = 1.0000$ | | |
| $r_{14} = \infty$ (stop) | | | |
| | $d_{14} = 3.0000$ | | |
| $r_{15} = 51.7843$ | | | |
| | $d_{15} = 3.3000$ | $n_8 = 1.77250$ | $\nu_8 = 49.66$ |
| $r_{16} = -156.2525$ | | | |
| | $d_{16} = 1.3000$ | | |
| $r_{17} = -44.4456$ | | | |
| | $d_{17} = 1.2000$ | $n_9 = 1.84666$ | $\nu_9 = 23.78$ |
| $r_{18} = 115.7071$ | | | |
| | $d_{18} = D_3$ (variable) | | |
| $r_{19} = 294.2054$ | | | |
| | $d_{19} = 4.1000$ | $n_{10} = 1.77250$ | $\nu_{10} = 49.66$ |
| $r_{20} = -41.9683$ | | | |
| | $d_{20} = 0.1500$ | | |
| $r_{21} = 33.0844$ | | | |
| | $d_{21} = 7.6000$ | $n_{11} = 1.69680$ | $\nu_{11} = 55.52$ |
| $r_{22} = -30.5175$ | | | |
| | $d_{22} = 1.2000$ | $n_{12} = 1.84666$ | $\nu_{12} = 23.78$ |
| $r_{23} = 425.6829$ | | | |
| | $d_{23} = D_4$ (variable) | | |
| $r_{24} = \infty$ | | | |
| | $d_{24} = 14.0000$ | $n_{13} = 1.51633$ | $\nu_{13} = 64.15$ |
| $r_{25} = \infty$ | | | |
| | $d_{25} = 1.0000$ | | |
| $r_{26} = \infty$ | | | |
| | $d_{26} = 6.0000$ | $n_{14} = 1.51633$ | $\nu_{14} = 64.15$ |
| $r_{27} = \infty$ | | | |

| f | 12 | 29 | 72 |
|---|---|---|---|
| $D_1$ | 1.000 | 20.896 | 35.388 |
| $D_2$ | 35.388 | 15.492 | 1.000 |
| $D_3$ | 23.161 | 20.053 | 23.468 |
| $D_4$ | 3.307 | 6.415 | 3.000 |

$f_T/f_{AT} = -0.091$  $f_4/\sqrt{f_W \cdot f_T} = 1.009$ $t_I/\sqrt{f_W \cdot f_T} = 0.458$  $f_I/\sqrt{f_W \cdot f_T} = 2.274$

-continued
Embodiment 6
$f = 12 \sim 72$  $F/1.2 \sim f/1.7$ $|f_{II}|/\sqrt{f_W \cdot f_T} = 0.603$  $n_6 - n_5 = 0.16876$ $\nu_5 - \nu_6 = 31.55$  $n_{IVn} - n_{IVp} = 0.14986$ $\nu_{Ivp} - \nu_{IVn} = 31.74$ $f_{BW}/\sqrt{f_W \cdot f_T} = 0.827$ $D_T/\sqrt{f_W \cdot f_T} = 0.799$  $s_T = 4.280$

Embodiment 7
$f = 12 \sim 72$  $F/1.2 \sim F/1.7$

| | | | |
|---|---|---|---|
| $r_1 = 165.9365$ | | | |
| | $d_1 = 1.5000$ | $n_1 = 1.80518$ | $\nu_1 = 25.43$ |
| $r_2 = 53.4205$ | | | |
| | $d_2 = 0.3000$ | | |
| $r_3 = 57.0057$ | | | |
| | $d_3 = 7.9000$ | $n_2 = 1.60311$ | $\nu_2 = 60.70$ |
| $r_4 = -170.2011$ | | | |
| | $d_4 = 0.1500$ | | |
| $r_5 = 39.4171$ | | | |
| | $d_5 = 5.5000$ | $n_3 = 1.69680$ | $\nu_3 = 55.52$ |
| $r_6 = 156.9904$ | | | |
| | $d_6 = D_1$ (variable) | | |
| $r_7 = 46.4325$ | | | |
| | $d_7 = 1.0000$ | $n_4 = 1.83400$ | $\nu_4 = 37.16$ |
| $r_8 = 13.9757$ | | | |
| | $d_8 = 6.0000$ | | |
| $r_9 = -18.4154$ | | | |
| | $d_9 = 1.0000$ | $n_5 = 1.67790$ | $\nu_5 = 55.33$ |
| $r_{10} = 21.9302$ | | | |
| | $d_{10} = 3.5000$ | $n_6 = 1.84666$ | $\nu_6 = 23.78$ |
| $r_{11} = -117.8717$ | | | |
| | $d_{11} = D_2$ (variable) | | |
| $r_{12} = 296.3316$ | | | |
| | $d_{12} = 3.5000$ | $n_7 = 1.72000$ | $\nu_7 = 50.25$ |
| $r_{13} = -46.7165$ | | | |
| | $d_{13} = 0.1500$ | | |
| $r_{14} = 34.5044$ | | | |
| | $d_{14} = 2.8000$ | $n_8 = 1.72000$ | $\nu_8 = 50.25$ |
| $r_{15} = 89.5454$ | | | |
| | $d_{15} = 2.9000$ | | |
| $r_{16} = -41.4221$ | | | |
| | $d_{16} = 1.1000$ | $n_9 = 1.84666$ | $\nu_9 = 23.78$ |
| $r_{17} = -99.0301$ | | | |
| | $d_{17} = 1.5000$ | | |
| $r_{18} = \infty$ | | | |
| | $d_{18} = D_3$ (variable) | | |
| $r_{19} = -184.2482$ | | | |
| | $d_{19} = 1.2000$ | $n_{10} = 1.84666$ | $\nu_{10} = 23.78$ |
| $r_{20} = 33.3380$ | | | |
| | $d_{20} = 0.3500$ | | |
| $r_{21} = 39.5753$ | | | |
| | $d_{21} = 5.6000$ | $n_{11} = 1.69680$ | $\nu_{11} = 55.52$ |
| $r_{22} = -33.5001$ | | | |
| | $d_{22} = 0.1500$ | | |
| $r_{23} = 26.6392$ | | | |
| | $d_{23} = 4.0000$ | $n_{12} = 1.69680$ | $\nu_{12} = 55.52$ |
| $r_{24} = 703.8247$ | | | |
| | $d_{24} = D_4$ (variable) | | |
| $r_{24} = \infty$ | | | |
| | $d_{25} = 14.0000$ | $n_{13} = 1.51633$ | $\nu_{13} = 64.15$ |
| $r_{26} = \infty$ | | | |
| | $d_{26} = 1.0000$ | | |
| $r_{27} = \infty$ | | | |
| | $d_{27} = 6.0000$ | $n_{14} = 1.51633$ | $\nu_{14} = 64.15$ |
| $r_{28} = \infty$ | | | |

| f | 12 | 29 | 72 |
|---|---|---|---|
| $D_1$ | 1.000 | 18.238 | 29.856 |
| $D_2$ | 29.856 | 12.618 | 1.000 |

-continued

Embodiment 7
f = 12~72    F/1.2~F/1.7

| | | | |
|---|---|---|---|
| $D_3$ | 20.227 | 17.009 | 20.933 |
| $D_4$ | 3.000 | 6.218 | 2.294 |

$f_T/f_{AT} = 0.120$ $f_4/\sqrt{f_W \cdot f_T} = 0.939$ $t_I/\sqrt{f_W \cdot f_T} = 0.523$ $f_I/\sqrt{f_W \cdot f_T} = 1.952$ $|f_{II}|/\sqrt{f_W \cdot f_T} = 0.512$ $n_6 - n_5 = 0.16876$ $\nu_5 - \nu_6 = 31.55$ $n_{IVn} - n_{IVp} = 0.14986$ $\nu_{IVp} - \nu_{IVn} = 31.74$ $f_{BW}/\sqrt{f_W \cdot f_T} = 0.817$ $D_T/\sqrt{f_W \cdot f_T} = 0.713$ $s_T = 4.048$

Embodiment 8
f = 12~72    F/1.2~F/1.7

| | | | |
|---|---|---|---|
| $r_1 = 151.7233$ | | | |
| | $d_1 = 1.5000$ | $n_1 = 1.80518$ | $\nu_1 = 25.43$ |
| $r_2 = 59.3632$ | | | |
| | $d_2 = 0.0800$ | | |
| $r_3 = 60.4104$ | | | |
| | $d_3 = 7.1000$ | $n_2 = 1.60311$ | $\nu_2 = 60.70$ |
| $r_4 = -195.3134$ | | | |
| | $d_4 = 0.1500$ | | |
| $r_5 = 42.4112$ | | | |
| | $d_5 = 4.9000$ | $n_3 = 1.69680$ | $\nu_3 = 55.52$ |
| $r_6 = 126.8250$ | | | |
| | $d_6 = D_1$ (variable) | | |
| $r_7 = 74.3595$ | | | |
| | $d_7 = 1.0000$ | $n_4 = 1.83400$ | $\nu_4 = 37.16$ |
| $r_8 = 16.6897$ | | | |
| | $d_8 = 6.9000$ | | |
| $r_9 = -21.4114$ | | | |
| | $d_9 = 1.0000$ | $n_5 = 1.67790$ | $\nu_5 = 55.33$ |
| $r_{10} = 26.0921$ | | | |
| | $d_{10} = 3.9000$ | $n_6 = 1.84666$ | $\nu_6 = 23.78$ |
| $r_{11} = -132.3403$ | | | |
| | $d_{11} = D_2$ (variable) | | |
| $r_{12} = 1504.2944$ | | | |
| | $d_{12} = 2.5000$ | $n_7 = 1.83400$ | $\nu_7 = 37.16$ |
| $r_{13} = -64.5680$ | | | |
| | $d_{13} = 0.1500$ | | |
| $r_{14} = 65.3163$ | | | |
| | $d_{14} = 3.0000$ | $n_8 = 1.77250$ | $\nu_8 = 49.66$ |
| $r_{15} = -152.0870$ | | | |
| | $d_{15} = 1.3000$ | | |
| $r_{16} = -44.1309$ | | | |
| | $d_{16} = 1.2000$ | $n_9 = 1.84666$ | $\nu_9 = 23.78$ |
| $r_{17} = -299.7950$ | | | |
| | $d_{17} = 1.7000$ | | |
| $r_{18} = \infty$ (stop) | | | |
| | $d_{18} = D_3$ (variable) | | |
| $r_{19} = 403.8921$ | | | |
| | $d_{19} = 3.3000$ | $n_{10} = 1.77250$ | $\nu_{10} = 49.66$ |
| $r_{20} = -47.6736$ | | | |
| | $d_{20} = 0.1500$ | | |
| $r_{21} = 33.1981$ | | | |
| | $d_{21} = 6.3000$ | $n_{11} = 1.69680$ | $\nu_{11} = 55.52$ |
| $r_{22} = -31.7379$ | | | |
| | $d_{22} = 1.2000$ | $n_{12} = 1.84666$ | $\nu_{12} = 23.78$ |
| $r_{23} = 3541.3418$ | | | |
| | $d_{23} = D_4$ (variable) | | |
| $r_{24} = \infty$ | | | |
| | $d_{24} = 14.0000$ | $n_{13} = 1.51633$ | $\nu_{13} = 64.15$ |
| $r_{25} = \infty$ | | | |
| | $d_{25} = 1.0000$ | | |

-continued

Embodiment 8
f = 12~72    F/1.2~F/1.7

| | | | |
|---|---|---|---|
| $r_{26} = \infty$ | | | |
| | $d_{26} = 6.0000$ | $n_{14} = 1.51633$ | $\nu_{14} = 64.15$ |
| $r_{27} = \infty$ | | | |

| f | 12 | 29 | 72 |
|---|---|---|---|
| $D_1$ | 1.000 | 19.710 | 32.772 |
| $D_2$ | 32.772 | 14.062 | 1.000 |
| $D_3$ | 27.473 | 24.446 | 28.080 |
| $D_4$ | 3.607 | 6.634 | 3.000 |

$f_T/f_{AT} = -0.003$ $f_4/\sqrt{f_W \cdot f_T} = 0.981$ $t_I/\sqrt{f_W \cdot f_T} = 0.467$ $f_I/\sqrt{f_W \cdot f_T} = 2.136$ $|f_{II}|/\sqrt{f_W \cdot f_T} = 0.562$ $n_6 - n_5 = 0.16876$ $\nu_5 - \nu_6 = 31.55$ $\nu_{IVp} - \nu_{IVn} = 31.74$ $n_{IVn} - n_{IVp} = 0.14986$ $f_{BW}/\sqrt{f_W \cdot f_T} = 0.835$ $D_T/\sqrt{f_W \cdot f_T} = 1.014$ $s_T = 4.096$

Embodiment 9
f = 12~72    F/1.2~F/1.4

| | | | |
|---|---|---|---|
| $r_1 = 172.1071$ | | | |
| | $d_1 = 1.5000$ | $n_1 = 1.80518$ | $\nu_1 = 25.43$ |
| $r_2 = 58.7963$ | | | |
| | $d_2 = 10.3000$ | $n_2 = 1.60311$ | $\nu_2 = 60.70$ |
| $r_3 = -182.7541$ | | | |
| | $d_3 = 0.1500$ | | |
| $r_4 = 42.7525$ | | | |
| | $d_4 = 6.7000$ | $n_3 = 1.69680$ | $\nu_3 = 55.52$ |
| $r_5 = 116.4808$ | | | |
| | $d_5 = D_1$ (variable) | | |
| $r_6 = 79.8595$ | | | |
| | $d_6 = 1.0000$ | $n_4 = 1.83400$ | $\nu_4 = 37.16$ |
| $r_7 = 16.8977$ | | | |
| | $d_7 = 6.5000$ | | |
| $r_8 = -21.0692$ | | | |
| | $d_8 = 1.0000$ | $n_5 = 1.67790$ | $\nu_5 = 55.33$ |
| $r_9 = 27.9713$ | | | |
| | $d_9 = 3.8000$ | $n_6 = 1.84666$ | $\nu_6 = 23.78$ |
| $r_{10} = -85.4768$ | | | |
| | $d_{10} = D_2$ (variable) | | |
| $r_{11} = 93.5629$ | | | |
| | $d_{11} = 3.4000$ | $n_7 = 1.83400$ | $\nu_7 = 37.16$ |
| $r_{12} = -58.2455$ | | | |
| | $d_{12} = 0.1500$ | | |
| $r_{13} = 42.6717$ | | | |
| | $d_{13} = 2.5000$ | $n_8 = 1.83400$ | $\nu_8 = 37.16$ |
| $r_{14} = 263.3215$ | | | |
| | $d_{14} = 2.0000$ | | |
| $r_{15} = -47.0980$ | | | |
| | $d_{15} = 1.2000$ | $n_9 = 1.84666$ | $\nu_9 = 23.78$ |
| $r_{16} = 89.1812$ | | | |
| | $d_{16} = 1.8000$ | | |
| $r_{17} = \infty$ (stop) | | | |
| | $d_{17} = D_3$ (variable) | | |
| $r_{18} = 218.8046$ | | | |
| | $d_{18} = 3.8000$ | $n_{10} = 1.77250$ | $\nu_{10} = 49.66$ |
| $r_{19} = -37.4666$ | | | |
| | $d_{19} = 0.1500$ | | |
| $r_{20} = 28.8015$ | | | |
| | $d_{20} = 6.6000$ | $n_{11} = 1.69680$ | $\nu_{11} = 55.52$ |
| $r_{21} = -27.3008$ | | | |
| | $d_{21} = 1.2000$ | $n_{12} = 1.84666$ | $\nu_{12} = 223.78$ |
| $r_{22} = 144.0063$ | | | |
| | $d_{22} = D_4$ (variable) | | |
| $r_{23} = \infty$ | | | |
| | $d_{23} = 14.0000$ | $n_{13} = 1.51633$ | $\nu_{13} = 64.15$ |
| $r_{24} = \infty$ | | | |

-continued

Embodiment 9
f = 12~72    F/1.2~F/1.4

|  |  |  |  |
|---|---|---|---|
| | $d_{24} = 1.0000$ | | |
| $r_{25} = \infty$ | | | |
| | $d_{25} = 6.0000$ | $n_{14} = 1.51633$ | $\nu_{14} = 64.15$ |
| $r_{26} = \infty$ | | | |

| f | 12 | 29 | 72 |
|---|---|---|---|
| $D_1$ | 1.000 | 20.175 | 34.097 |
| $D_2$ | 34.097 | 14.922 | 1.000 |
| $D_3$ | 18.710 | 16.296 | 20.330 |
| $D_4$ | 4.620 | 7.034 | 3.000 |

$f_T/f_{AT} = 0.063$     $f_4/\sqrt{f_W \cdot f_T} = 0.874$ $t_I/\sqrt{f_W \cdot f_T} = 0.635$     $f_I/\sqrt{f_W \cdot f_T} = 2.242$ $|f_{II}|/\sqrt{f_W \cdot f_T} = 0.601$     $n_6 - n_5 = 0.16876$ $\nu_5 - \nu_6 = 31.55$     $n_{IVn} - n_{IVp} = 0.14986$ $\nu_{IVp} - \nu_{IVn} = 31.74$     $f_{BW}/\sqrt{f_W \cdot f_T} = 0.677$ $D_T/\sqrt{f_W \cdot f_T} = 0.753$     $s_T = 4.076$

Embodiment 10
f = 12~72    F/1.2~F/1.4

| $r_1 = 146.6769$ | | | |
|---|---|---|---|
| | $d_1 = 1.5000$ | $n_1 = 1.80518$ | $\nu_1 = 25.43$ |
| $r_2 = 59.8399$ | | | |
| | $d_2 = 9.9000$ | $n_2 = 1.60311$ | $\nu_2 = 60.70$ |
| $r_3 = -158.8523$ | | | |
| | $d_3 = 0.1500$ | | |
| $r_4 = 44.0533$ | | | |
| | $d_4 = 5.2000$ | $n_3 = 1.69680$ | $\nu_3 = 55.52$ |
| $r_5 = 89.2553$ | | | |
| | $d_5 = D_1$ (variable) | | |
| $r_6 = 74.9300$ | | | |
| | $d_6 = 1.0000$ | $n_4 = 1.83400$ | $\nu_4 = 37.16$ |
| $r_7 = 18.2563$ | | | |
| | $d_7 = 6.3000$ | | |
| $r_8 = -22.3794$ | | | |
| | $d_8 = 1.0000$ | $n_5 = 1.67790$ | $\nu_5 = 55.33$ |
| $r_9 = 28.2140$ | | | |
| | $d_9 = 4.0000$ | $n_6 = 1.84666$ | $\nu_6 = 23.78$ |
| $r_{10} = -121.1135$ | | | |
| | $d_{10} = D_2$ (variable) | | |
| $r_{11} = 151.6487$ | | | |
| | $d_{11} = 4.2000$ | $n_7 = 1.83400$ | $\nu_7 = 37.16$ |
| $r_{12} = -36.0357$ | | | |
| | $d_{12} = 1.0000$ | | |
| $r_{13} = -25.4309$ | | | |
| | $d_{13} = 1.2000$ | $n_8 = 1.84666$ | $\nu_8 = 23.78$ |
| $r_{14} = -50.7361$ | | | |
| | $d_{14} = 1.6000$ | | |
| $r_{15} = \infty$ (stop) | | | |
| | $d_{15} = D_3$ (variable) | | |
| $r_{16} = 265.2715$ | | | |
| | $d_{16} = 3.9000$ | $n_9 = 1.77250$ | $\nu_9 = 49.66$ |
| $r_{17} = -43.6405$ | | | |
| | $d_{17} = 0.1500$ | | |
| $r_{18} = 37.6550$ | | | |
| | $d_{18} = 7.2000$ | $n_{10} = 1.69680$ | $\nu_{10} = 55.52$ |
| $r_{19} = -29.0405$ | | | |
| | $d_{19} = 1.2000$ | $n_{11} = 1.84666$ | $\nu_{11} = 23.78$ |
| $r_{20} = -4474.8116$ | | | |
| | $d_{20} = D_4$ (variable) | | |
| $r_{21} = \infty$ | | | |
| | $d_{21} = 14.0000$ | $n_{12} = 1.51633$ | $\nu_{12} = 64.15$ |

Embodiment 10
f = 12~72    F/1.2~F/1.4

| $r_{22} = \infty$ | | | |
|---|---|---|---|
| | $d_{22} = 1.0000$ | | |
| $r_{23} = \infty$ | | | |
| | $d_{23} = 6.0000$ | $n_{13} = 1.51633$ | $\nu_{13} = 64.15$ |
| $r_{24} = \infty$ | | | |

| f | 12 | 29 | 72 |
|---|---|---|---|
| $D_1$ | 1.000 | 21.561 | 36.591 |
| $D_2$ | 36.591 | 16.030 | 1.000 |
| $D_3$ | 24.419 | 21.834 | 25.333 |
| $D_4$ | 3.915 | 6.499 | 3.000 |

$f_T/f_{AT} = -0.012$     $f_4/\sqrt{f_W \cdot f_T} = 0.981$ $t_I/\sqrt{f_W \cdot f_T} = 0.570$     $f_I/\sqrt{f_W \cdot f_T} = 2.392$ $|f_{II}|/\sqrt{f_W \cdot f_T} = 0.634$     $n_6 - n_5 = 0.16876$ $\nu_5 - \nu_6 = 31.55$     $n_{IVn} - n_{IVp} = 0.14986$ $\nu_{IVp} - \nu_{IVn} = 31.74$     $f_{BW}/\sqrt{f_W \cdot f_T} = 0.831$ $D_T/\sqrt{f_W \cdot f_T} = 0.917$     $s_T = 4.128$

Embodiment 11
f = 12~72    F/1.2~F/1.7

| $r_1 = 194.2138$ | | | |
|---|---|---|---|
| | $d_1 = 1.5000$ | $n_1 = 1.80518$ | $\nu_1 = 25.43$ |
| $r_2 = 59.5678$ | | | |
| | $d_2 = 0.1000$ | | |
| $r_3 = 61.2093$ | | | |
| | $d_3 = 7.3000$ | $n_2 = 1.60311$ | $\nu_2 = 60.70$ |
| $r_4 = -184.1545$ | | | |
| | $d_4 = 0.1500$ | | |
| $r_5 = 44.0378$ | | | |
| | $d_5 = 5.1000$ | $n_3 = 1.69680$ | $\nu_3 = 55.52$ |
| $r_6 = 151.5499$ | | | |
| | $d_6 = D_1$ (variable) | | |
| $r_7 = 74.2547$ | | | |
| | $d_7 = 1.0000$ | $n_4 = 1.77250$ | $\nu_4 = 49.66$ |
| $r_8 = 17.1596$ | | | |
| | $d_8 = 6.9000$ | | |
| $r_9 = -22.7122$ | | | |
| | $d_9 = 1.0000$ | $n_5 = 1.67790$ | $\nu_5 = 55.33$ |
| $r_{10} = 26.8421$ | | | |
| | $d_{10} = 3.9000$ | $n_6 = 1.84666$ | $\nu_6 = 23.78$ |
| $r_{11} = -196.2969$ | | | |
| | $d_{11} = D_2$ (variable) | | |
| $r_{12} = 88.2234$ | | | |
| | $d_{12} = 3.8000$ | $n_7 = 1.77250$ | $\nu_7 = 49.66$ |
| $r_{13} = -48.8973$ | | | |
| | $d_{13} = 1.3000$ | | |
| $r_{14} = -27.5304$ | | | |
| | $d_{14} = 1.2000$ | $n_8 = 1.84666$ | $\nu_8 = 23.78$ |
| $r_{15} = -42.9386$ | | | |
| | $d_{15} = 1.5000$ | | |
| $r_{16} = $ (stop) | | | |
| | $d_{16} = D_3$ (variable) | | |
| $r_{17} = 454.7542$ | | | |
| | $d_{17} = 3.7000$ | $n_9 = 1.69680$ | $\nu_9 = 55.52$ |
| $r_{18} = -42.3595$ | | | |
| | $d_{18} = 0.1500$ | | |
| $r_{19} = 31.6599$ | | | |
| | $d_{19} = 6.6000$ | $n_{10} = 1.69680$ | $\nu_{10} = 55.52$ |
| $r_{20} = -31.5807$ | | | |
| | $d_{20} = 1.2000$ | $n_{11} = 1.84666$ | $\nu_{11} = 23.78$ |
| $r_{21} = 401.9241$ | | | |
| | $d_{21} = D_4$ | | |

-continued

| Embodiment 11 | | | |
|---|---|---|---|
| f = 12~72 | | F/1.2~F/1.7 | |
| $r_{22} = \infty$ | (variable) | | |
| | $d_{22} = 14.0000$ | $n_{12} = 1.51633$ | $\nu_{12} = 64.15$ |
| $r_{23} = \infty$ | | | |
| | $d_{23} = 1.0000$ | | |
| $r_{24} = \infty$ | | | |
| | $d_{24} = 6.0000$ | $n_{13} = 1.51633$ | $\nu_{13} = 64.15$ |
| $r_{25} = \infty$ | | | |

| f | 12 | 29 | 72 |
|---|---|---|---|
| $D_1$ | 1.000 | 20.518 | 34.647 |
| $D_2$ | 34.647 | 15.129 | 1.000 |
| $D_3$ | 25.673 | 22.821 | 26.471 |
| $D_4$ | 3.797 | 6.650 | 3.000 |

$f_T/f_{AT} = 0.000$     $f_4/\sqrt{f_W \cdot f_T} = 0.998$ $t_I/\sqrt{f_W \cdot f_T} = 0.482$     $f_I/\sqrt{f_W \cdot f_T} = 2.240$ $|f_{II}|/\sqrt{f_W \cdot f_T} = 0.597$     $n_6 - n_5 = 0.16876$ $\nu_5 - \nu_6 = 31.55$     $n_{IVn} - n_{IVp} = 0.14986$ $\nu_{IVp} - \nu_{IVn} = 31.74$     $f_{BW}/\sqrt{f_W \cdot f_T} = 0.842$ $D_T/\sqrt{f_W \cdot f_T} = 0.952$     $s_T = 4.147$

| Embodiment 12 | | | |
|---|---|---|---|
| f = 12~72 | | F/1.2~F/1.4 | |
| $r_1 = 164.7468$ | | | |
| | $d_1 = 1.5000$ | $n_1 = 1.80518$ | $\nu_1 = 25.43$ |
| $r_2 = 65.8749$ | | | |
| | $d_2 = 9.9000$ | $n_2 = 1.60311$ | $\nu_2 = 64.15$ |
| $r_3 = -184.0637$ | | | |
| | $d_3 = 0.1500$ | | |
| $r_4 = 48.6323$ | | | |
| | $d_4 = 5.2000$ | $n_3 = 1.69680$ | $\nu_3 = 55.52$ |
| $r_5 = 101.2168$ | | | |
| | $d_5 = D_1$ (variable) | | |
| $r_6 = 57.6084$ | | | |
| | $d_6 = 1.0000$ | $n_4 = 1.77250$ | $\nu_4 = 49.66$ |
| f= 18.9625 | $d_7 = 7.3000$ | | |
| $r_8 = -24.9630$ | | | |
| | $d_8 = 1.0000$ | $n_5 = 1.67790$ | $\nu_5 = 55.33$ |
| $r_9 = 28.1850$ | | | |
| | $d_9 = 4.0000$ | $n_6 = 1.84666$ | $\nu_6 = 23.78$ |
| $r_{10} = -260.2746$ | | | |
| | $d_{10} = D_2$ (variable) | | |
| $r_{11} = 1399.3348$ | | | |
| | $d_{11} = 4.2000$ | $n_7 = 1.77250$ | $\nu_7 = 49.66$ |
| $r_{12} = -29.8010$ | | | |
| | $d_{12} = 1.1000$ | | |
| $r_{13} = -22.4006$ | | | |
| | $d_{13} = 1.2000$ | $n_8 = 1.84666$ | $\nu_8 = 23.78$ |
| $r_{14} = -39.0155$ | | | |
| | $d_{14} = 1.5000$ | | |
| $r_{15} = \infty$ (stop) | | | |
| | $d_{15} = D_3$ (variable) | | |
| $r_{16} = 355.6424$ | | | |
| | $d_{16} = 3.8000$ | $n_9 = 1.77250$ | $\nu_9 = 49.66$ |
| $r_{17} = -43.8189$ | | | |
| | $d_{17} = 0.1500$ | | |
| $r_{18} = 41.1951$ | | | |
| | $d_{18} = 6.8000$ | $n_{10} = 1.69680$ | $\nu_{10} = 55.52$ |
| $r_{19} = -29.4069$ | | | |
| | $d_{19} = 1.2000$ | $n_{11} = 1.84666$ | $\nu_{11} = 23.78$ |

-continued

| Embodiment 12 | | | |
|---|---|---|---|
| f = 12~72 | | F/1.2~F/1.4 | |
| $r_{20} = -238.5031$ | | | |
| | $d_{20} = D_4$ (variable) | | |
| $r_{21} = \infty$ | | | |
| | $d_{21} = 14.0000$ | $n_{12} = 1.51633$ | $\nu_{12} = 64.15$ |
| $r_{22} = \infty$ | | | |
| | $d_{22} = 1.0000$ | | |
| $r_{23} = \infty$ | | | |
| | $d_{23} = 6.0000$ | $n_{13} = 1.51633$ | $\nu_{13} = 64.15$ |
| $r_{24} = \infty$ | | | |

| f | 12 | 29 | 72 |
|---|---|---|---|
| $D_1$ | 1.000 | 23.870 | 40.808 |
| $D_2$ | 40.808 | 17.938 | 1.000 |
| $D_3$ | 22.376 | 20.186 | 23.556 |
| $D_4$ | 4.181 | 6.371 | 3.000 |

$f_T/f_{AT} = -0.001$     $f_4/\sqrt{f_W \cdot f_T} = 0.969$ $t_I/\sqrt{f_W \cdot f_T} = 0.570$     $f_I/\sqrt{f_W \cdot f_T} = 2.663$ $|f_{II}|/\sqrt{f_W \cdot f_T} = 0.715$     $n_6 - n_5 = 0.16876$ $\nu_5 - \nu_6 = 31.55$     $n_{IVn} - n_{IVp} = 0.14986$ $\nu_{IVp} - \nu_{IVn} = 31.74$     $f_{BW}/\sqrt{f_W \cdot f_T} = 0.841$ $D_T/\sqrt{f_W \cdot f_T} = 0.853$     $s_T = 4.080$ In respective embodiments shown in the above, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the focal length of the lens system as a whole, reference symbol $f_{BW}$ represents the back focal length in the wide position (position of the shortest focal length), and reference symbol $S_T$ represents the advancing amount of the fourth lens group when the lens system is to be focused on an object at the object distance of 1 m in the teleposition (position of the longest focal length).

Embodiments 1 through 12 shown in the above respectively have the lens configurations as shown in FIGS. 1 through 12. In said figures, reference symbol F represents optical members such as filters etc.

Figure 13B:
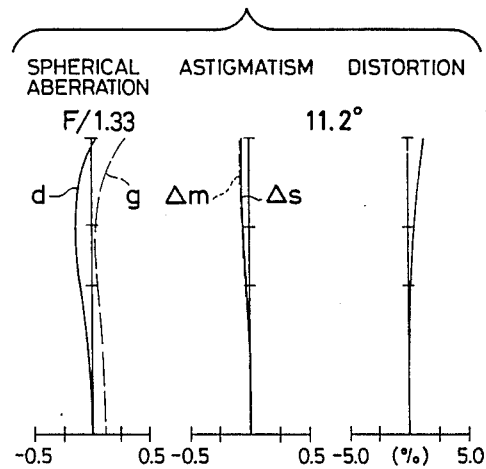
Figure 13C:
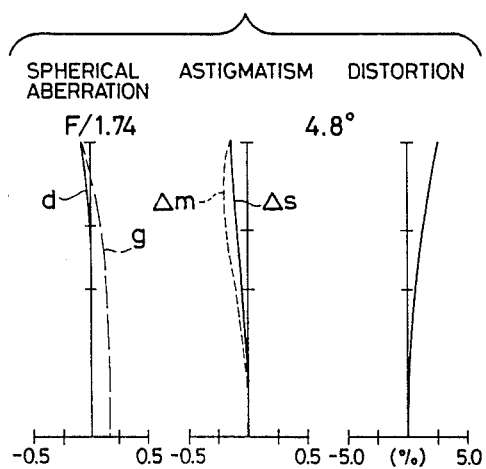
Figure 13D:
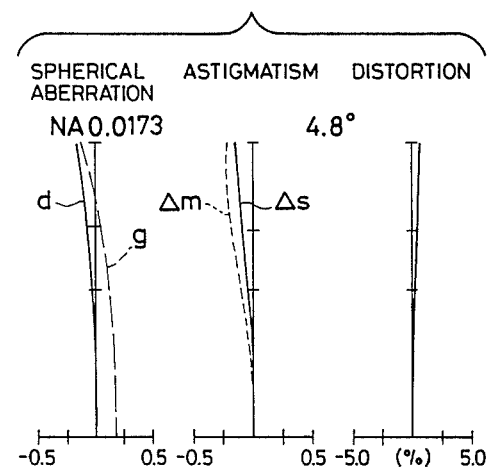
Figure 14A:
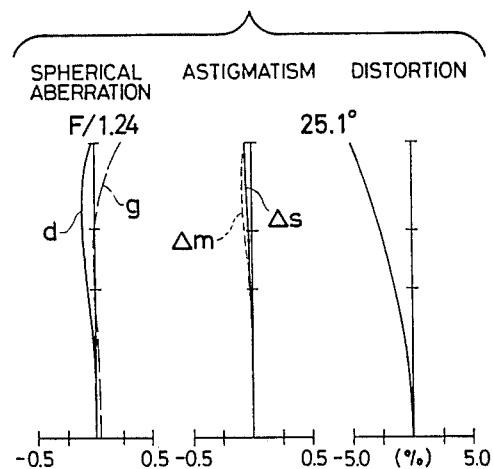
Figure 14B:
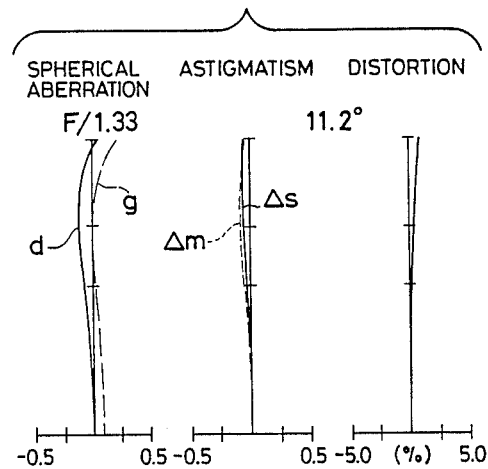
Figure 14C:
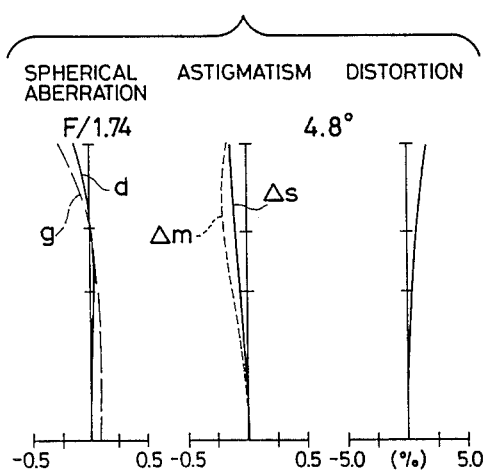
Figure 14D:
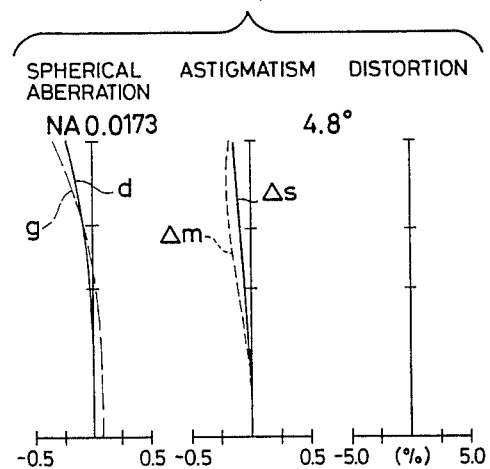
Figure 15A:
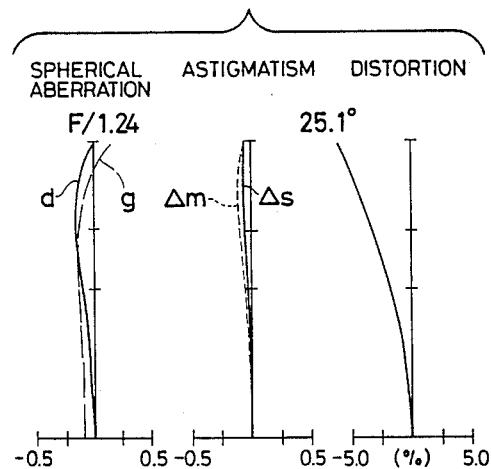
Figure 15B:
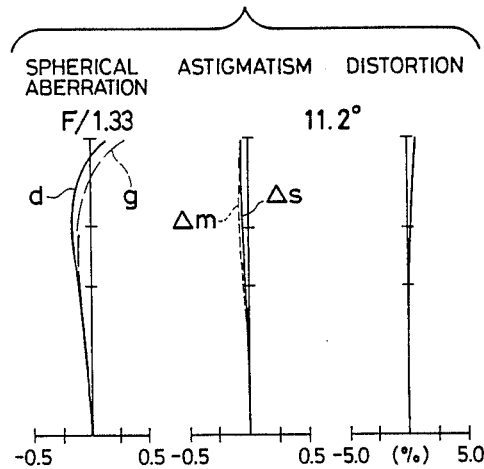
Figure 15C:
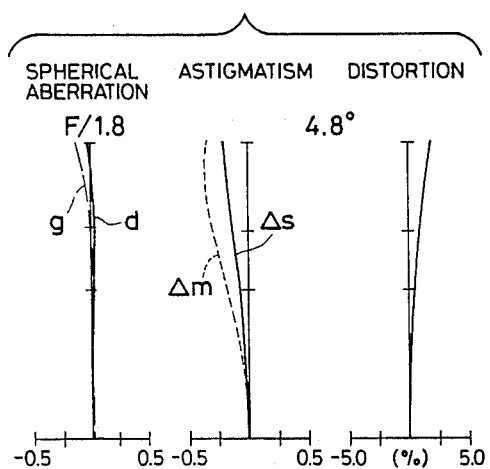
Figure 15D:
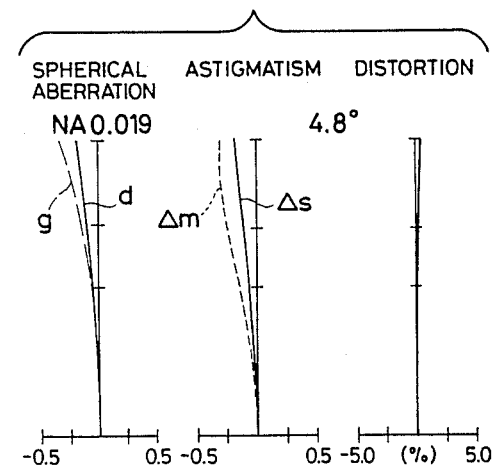
Figure 16A:
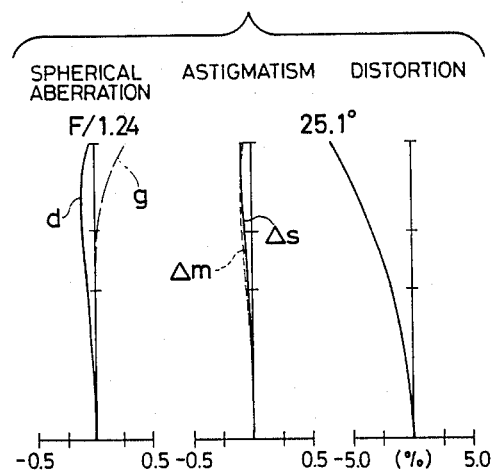
Figure 16B:
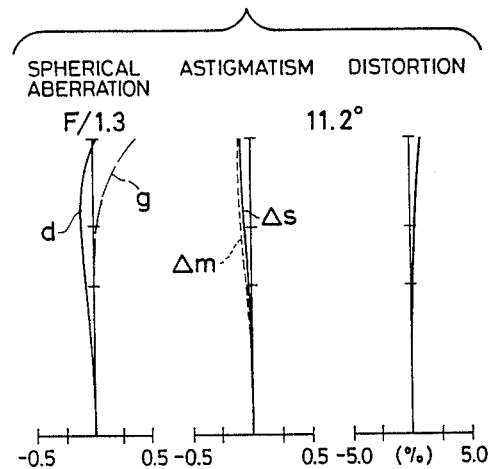
Figure 16C:
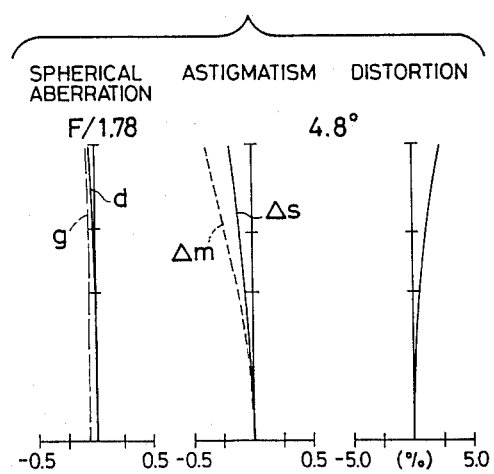
Figure 16D:
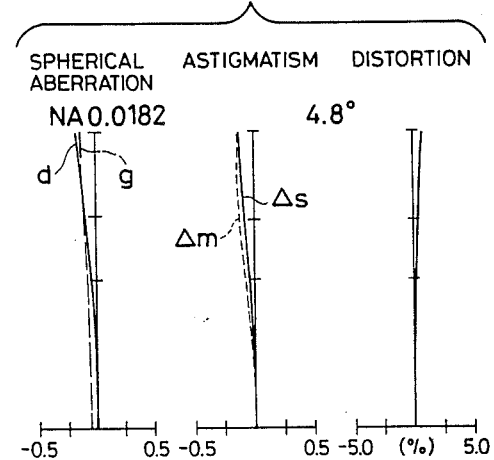
Figure 17A:
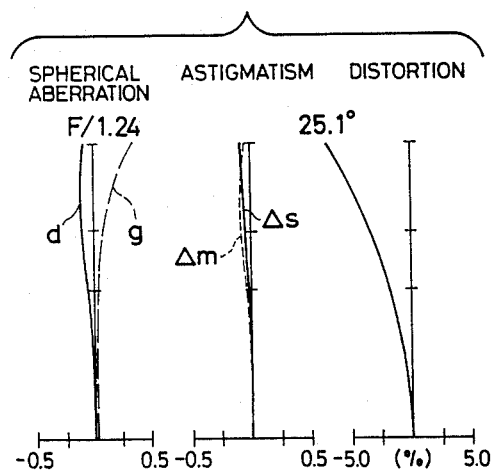
Figure 17B:
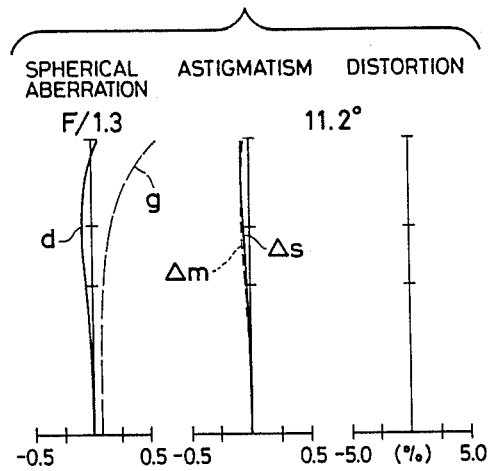
Figure 17C:
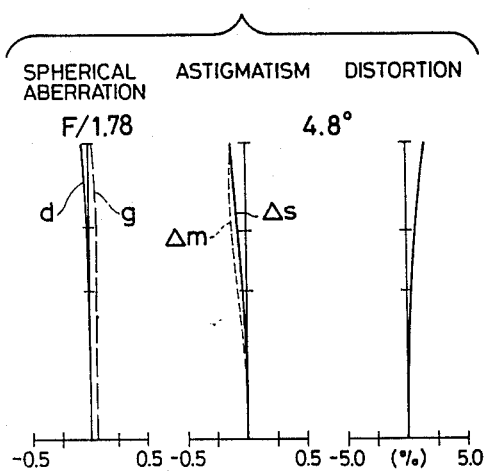
Figure 17D:
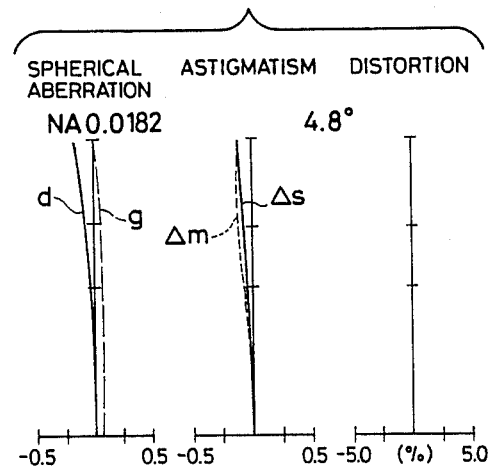
Figure 18A:
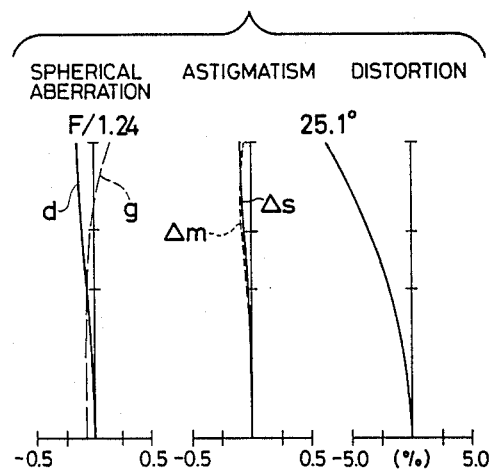
Figure 18B:
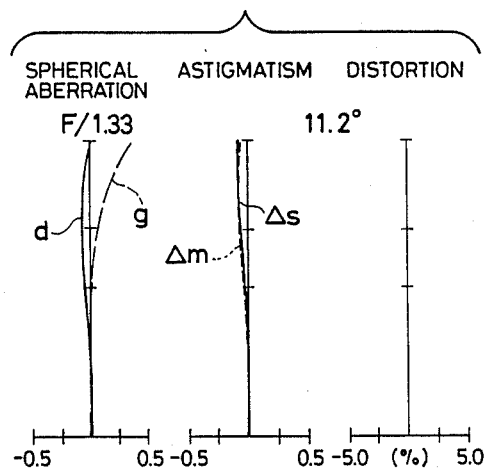
Figure 18C:
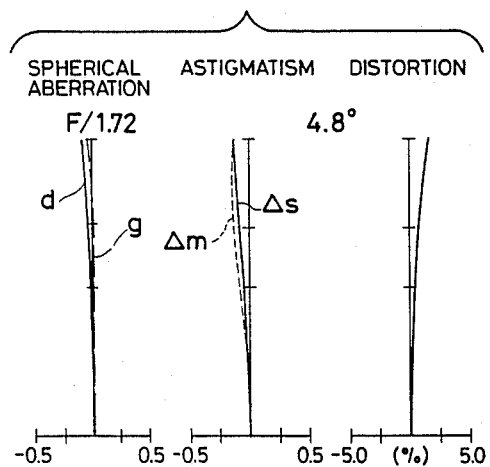
Figure 18D:
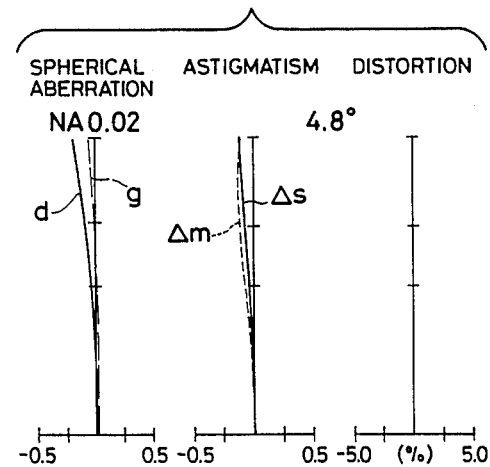
Figure 19A:
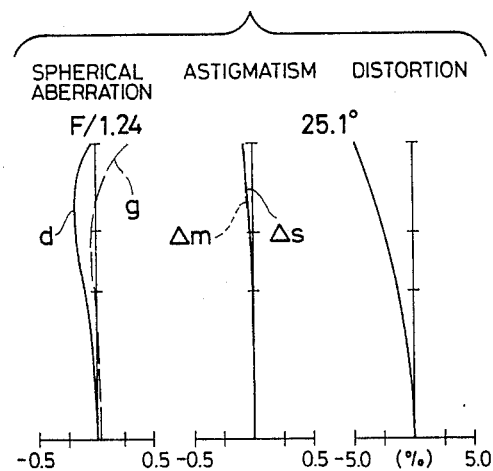
Figure 19B:
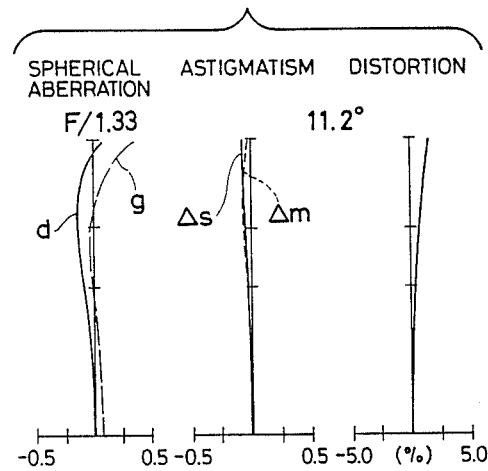
Figure 19C:
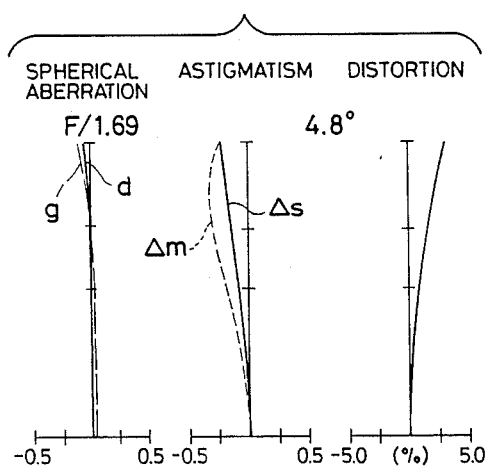
Figure 19D:
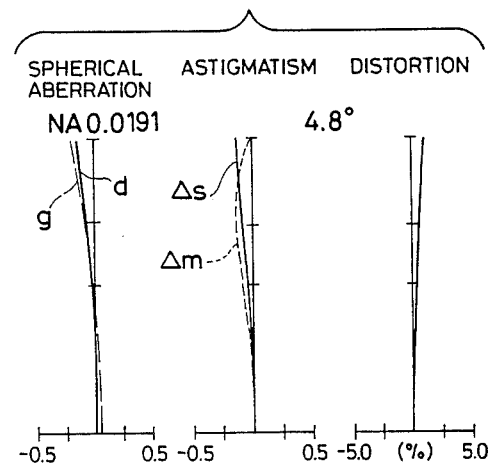
Figure 20A:
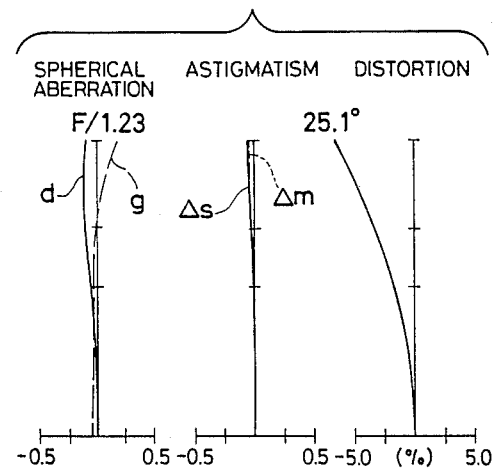
Figure 20B:
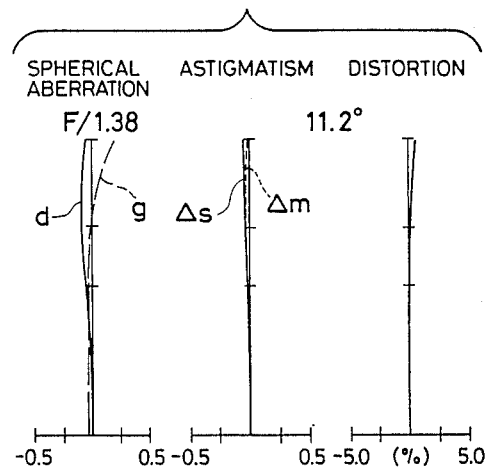
Figure 20C:
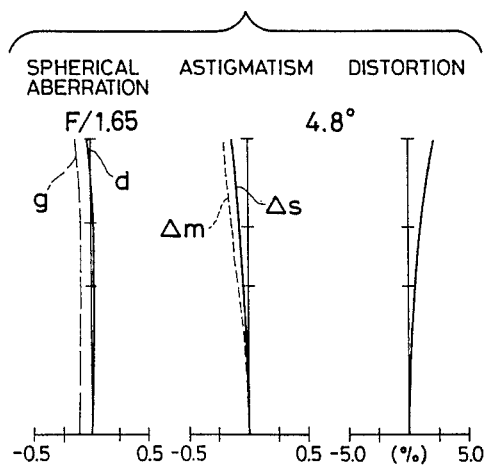
Figure 20D:
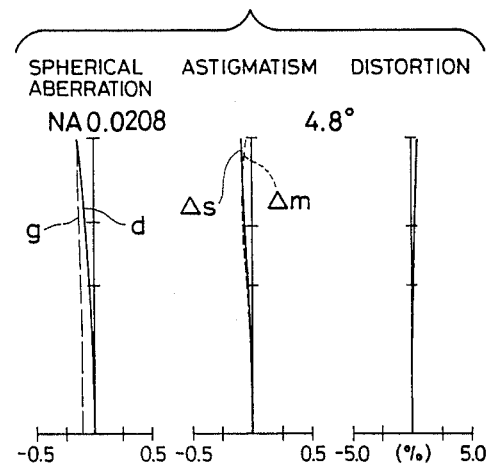
Figure 23A:
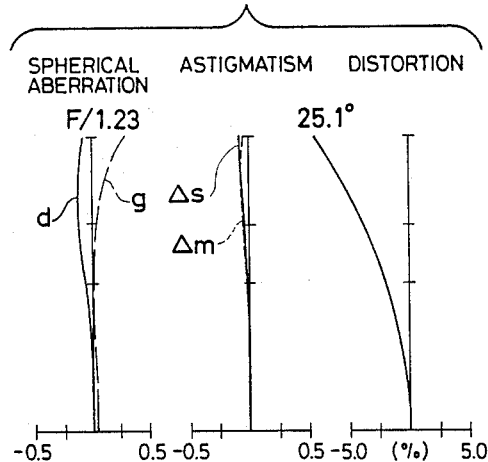
Figure 23B:
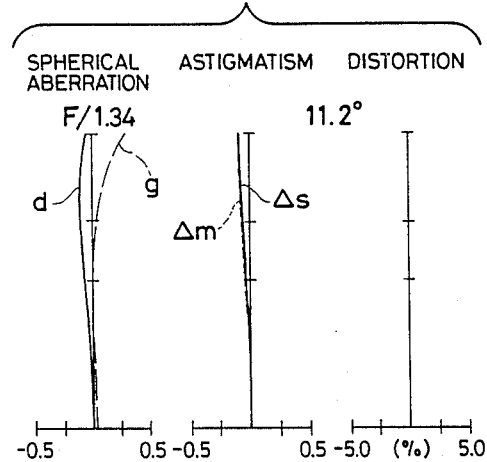
Figure 23C:
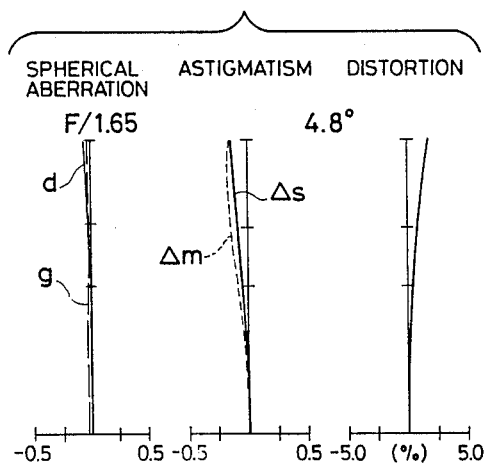
Figure 23D:
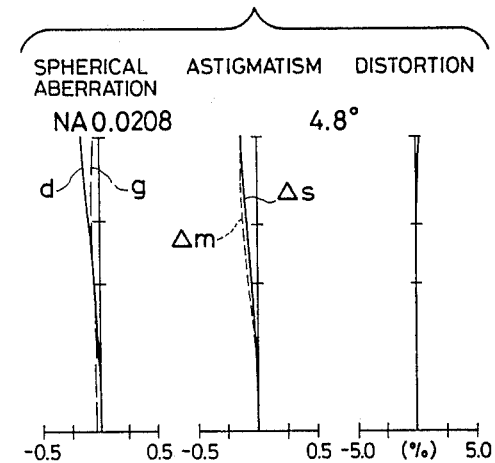
Figure 24A:
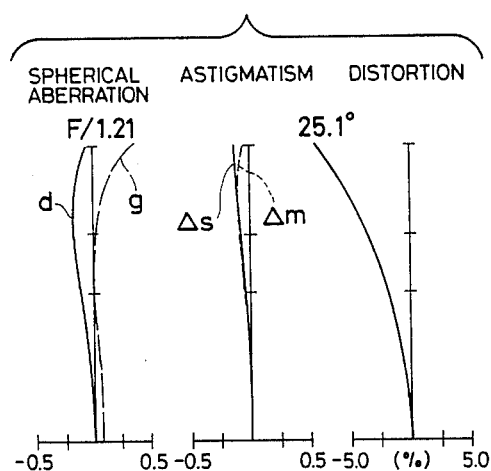
Figure 24B:
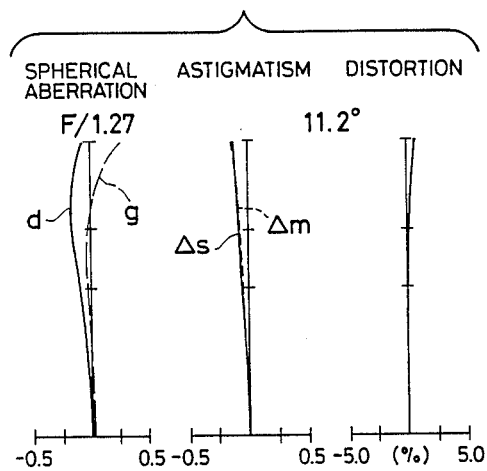
Figure 24C:
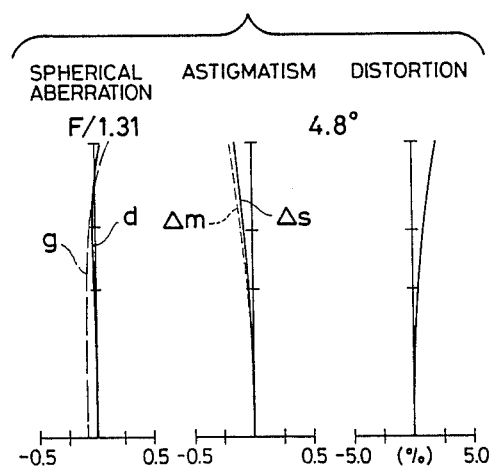
Figure 24D:
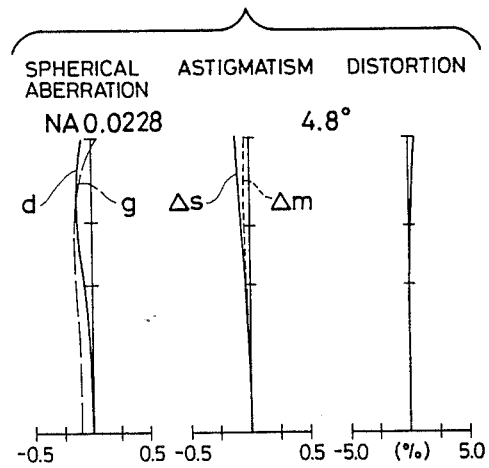
Figure 25:
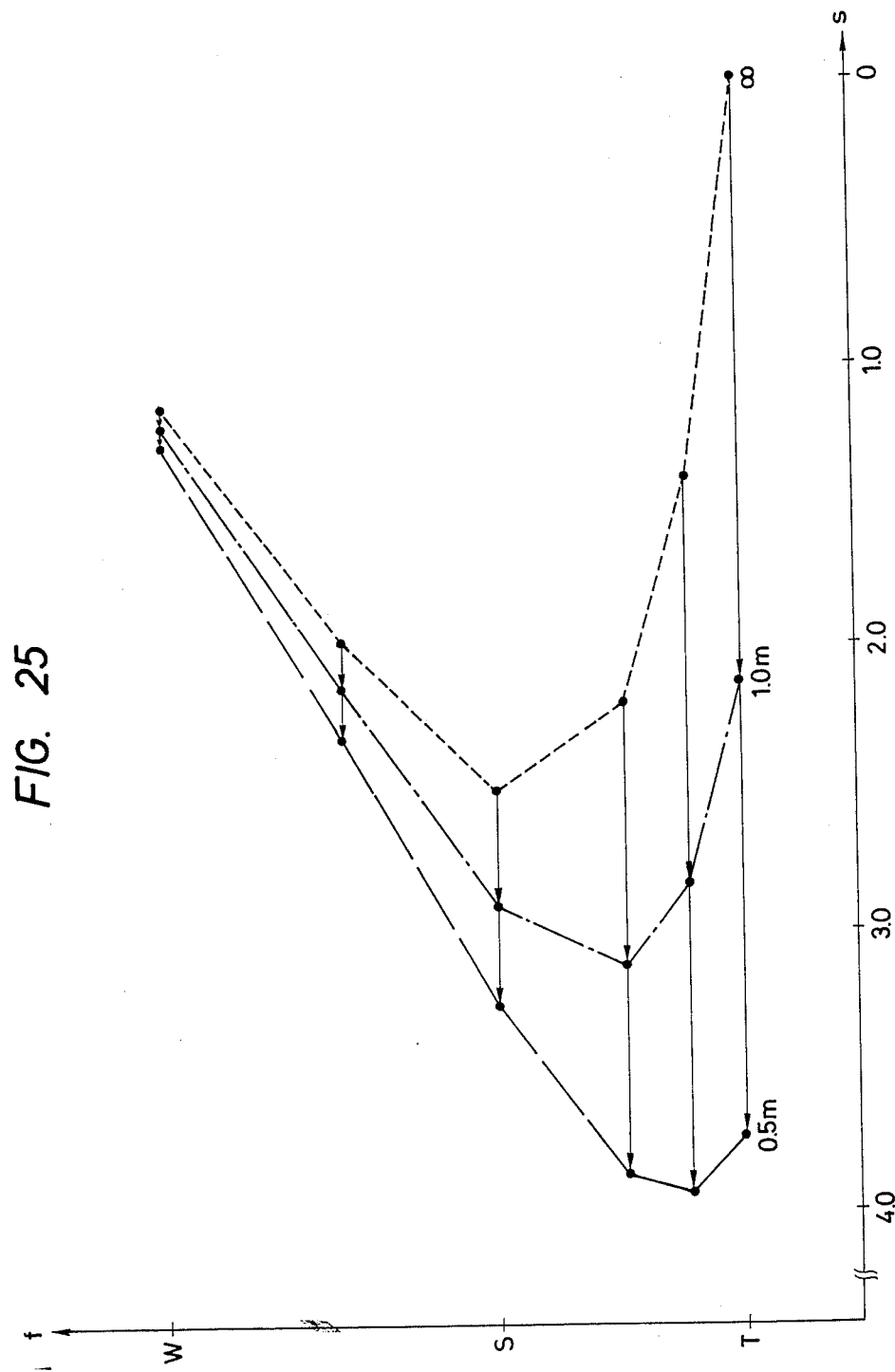
FIG. 25 shows a graph illustrating the correlation between the object distance, focal length, and position of the fourth lens group in case of the vari-focal lens system according to the present invention.

Aberration curves of Embodiment 1 in the wide position, standard position and teleposition and in the state that Embodiment 1 is focused on an object at the object distance of 1 m in the teleposition are shown in FIGS. 13A, 13B, 13C and 13D respectively. In the same way as above, aberration curves of Embodiment 2 in each of the above-mentioned states are shown in FIGS. 14A, 14B, 14C and 14D respectively, aberration curves of Embodiment 3 in each of the above-mentioned states are shown in FIGS. 15A, 15B, 15C and 15D respectively, aberration curves of Embodiment 4 in each of the above-mentioned states are shown in FIGS. 16A, 16B, 16C and 16D respectively, aberration curves of Embodiment 5 in each of the above-mentioned states are shown in FIGS. 17A, 17B, 17C and 17D respectively, aberration curves of Embodiment 6 in each of the above-mentioned states are shown in FIGS. 18A, 18B, 18C and 18D respectively, aberration curves of Embodiment 7 in each of the above-mentioned states are shown in FIGS. 19A, 19B, 19C and 19D respectively, aberration curves of Embodiment 8 in each of the above-mentioned states are shown in FIGS. 20A, 20B, 20C and 20D respectively, aberration curves of Embodiment 9 in each of the above-mentioned states are shown in FIGS. 21A, 21B, 21C and 21D respectively, aberration curves of Embodiment 10 in each of the above-mentioned states are shown in FIGS. 22A, 22B, 22C and 22D respectively, aberration curves of Embodiment 11 in each of the above-mentioned states are shown in FIGS. 23A, 23B, 23C and 23D respectively, and aberration curves of Embodiment 12 in each of the above-mentioned states are shown in FIGS. 24A, 24B, 24C and 24D respectively.

By adopting the lens composition and lens configuration described so far, the vari-focal lens system according to the present invention is arranged to make it possible to attain automatic focusing wherein the lens group to be moved is light in weight, response is very quick and power consumption is small and, at the same time, arranged that the variation of aberrations, decrease in the intensity of light in the marginal portion and, especially, eclipse of principal rays which occurs at the time of focusing are all made small and that it is possible to ensure a back focal length sufficient for inserting a filter, mirror, etc. to the space in rear of the lens system, said vari-focal lens system being further arranged to have a large aperture ratio, high vari-focal ratio and high performance.

I claim:

1. A vari-focal lens system comprising, in the order from the object side, a first lens group having a positive focal length and arranged to be always kept fixed, a second lens group having a negative focal length and arranged to be movable along the optical axis when varying the focal length of the lens system as a whole and to be kept fixed at the time of focusing, a third lens group having a positive focal length and arranged to be always kept fixed, and a fourth lens group with a positive focal length located by leaving a comparatively large airspace in respect to said third lens group and arranged to be movable for the purpose of compensation so as to eliminate the displacement of the focal point caused when varying the focal length of the lens system as a whole and, moreover, to integrally move said fourth lens group as a whole for the purpose of focusing, said vari-focal lens system being arranged that rays coming out from said third lens group become approximately afocal.

2. A vari-focal lens system according to claim 1 wherein said first lens group comprises a negative lens, a positive lens and a positive lens, said second lens group comprises a first negative lens, a second negative lens and a positive lens, said third lens group comprises at least one positive lens and a negative lens, and said fourth lens group comprises a negative lens, a first positive lens and a second positive lens, said vari-focal lens system being arranged to fulfill the conditions (1) through (10) shown below:

$$-0.5 < f_T/f_{AT} < 0.35 \quad (1)$$

$$0.8 < f_4/\sqrt{f_W \cdot f_T} < 1.3 \quad (2)$$

$$0.2 < D_T/\sqrt{f_W \cdot f_T} < 1.4 \quad (3)$$

$$0.4 < t_I/\sqrt{f_W \cdot f_T} < 0.64 \quad (4)$$

$$1.7 < f_I/\sqrt{f_W \cdot f_T} < 0.3 \quad (5)$$

$$0.4 < |f_{II}|/\sqrt{f_W \cdot f_T} < 0.75 \quad (6)$$

$$0.04 < n_6 - n_5 < 0.25 \quad (7)$$

$$15 < \nu_5 - \nu_6 < 45 \quad (8)$$

$$0.04 < n_{IVn} - n_{IVp} < 0.37 \quad (9)$$

$$20 < \nu_{IVp} - \nu_{IVn} \quad (10)$$

where, reference symbol $f_T$ represents the longest focal length of the lens system as a whole, reference symbol $f_{AT}$ represents the total focal length of the first, second and third lens groups in the position of the longest focal length, reference symbol $f_W$ represents the shortest focal length of the lens system as a whole, reference symbol $f_4$ represents the total focal length of the fourth lens group, reference symbol $D_T$ represents the airspace between the third and fourth lens groups when the lens system is focused on an object at the infinite distance in the position of the longest focal length, reference symbol $t_I$ represents the distance from the foremost surface to the rearmost surface of the first lens group, reference symbol $f_I$ represents the total focal length of the first lens group, reference symbol $f_{II}$ represents the total focal length of the second lens group, reference symbol $n_5$ represents the refractive index of the second negative lens in the second lens group, reference symbol $n_6$ represents the refractive index of the positive lens in the second lens group, reference symbol $\nu_5$ represents Abbe's number of the second negative lens in the second lens group, reference symbol $\nu_6$ represents Abbe's number of the positive lens in the second lens group, reference symbol $n_{IVp}$ represents the refractive index of the first positive lens in the fourth lens group, reference symbol $n_{IVn}$ represents the refractive index of the negative lens in the fourth lens group, reference symbol $\nu_{IVp}$ represents Abbe's number of the first positive lens in the fourth lens group, and reference symbol $\nu_{IVn}$ represents Abbe's number of the negative lens in the fourth lens group.

3. A vari-focal lens system according to claim 2 having the following numerical data:

| f = 12~72 | F/1.2~F/1.7 | |
|---|---|---|
| $r_1 = 160.1139$ | | |
| | $d_1 = 1.5000$ | $n_1 = 1.80518 \quad \nu_1 = 25.43$ |
| $r_2 = 56.7068$ | | |
| | $d_2 = 0.6000$ | |
| $r_3 = 63.5411$ | | |
| | $d_3 = 8.7000$ | $n_2 = 1.60311 \quad \nu_2 = 60.70$ |
| $r_4 = -118.9448$ | | |
| | $d_4 = 0.1500$ | |
| $r_5 = 34.6640$ | | |
| | $d_5 = 5.9000$ | $n_3 = 1.60311 \quad \nu_3 = 60.70$ |
| $r_6 = 96.5475$ | | |
| | $d_6 = D_1$ (variable) | |
| $r_7 = 56.5891$ | | |
| | $d_7 = 1.0000$ | $n_4 = 1.83400 \quad \nu_4 = 37.16$ |
| $r_8 = 14.1280$ | | |
| | $d_8 = 5.8000$ | |
| $r_9 = -16.8744$ | | |

-continued

| | $f = 12 \sim 72$ | | $F/1.2 \sim F/1.7$ | |
|---|---|---|---|---|
| $r_{10} = 21.7195$ | $d_9 = 1.0000$ | | $n_5 = 1.69700$ | $\nu_5 = 48.51$ |
| $r_{11} = -80.2671$ | $d_{10} = 3.8000$ | | $n_6 = 1.84666$ | $\nu_6 = 23.78$ |
| $r_{12} = 45.6568$ | $d_{11} = D_2$ (variable) | | | |
| $r_{13} = -60.9922$ | $d_{12} = 4.9000$ | | $n_7 = 1.77250$ | $\nu_7 = 49.66$ |
| $r_{14} = \infty$ (stop) | $d_{13} = 1.0000$ | | | |
| $r_{15} = 27.0781$ | $d_{14} = 3.000$ | | | |
| $r_{16} = 158.3382$ | $d_{15} = 3.6000$ | | $n_8 = 1.69680$ | $\nu_8 = 55.52$ |
| $r_{17} = -55.6584$ | $d_{16} = 1.8000$ | | | |
| $r_{18} = 67.4790$ | $d_{17} = 1.1000$ | | $n_9 = 1.84666$ | $\nu_9 = 23.78$ |
| $r_{19} = 441.5308$ | $d_{18} = D_3$ (variable) | | | |
| $r_{20} = 29.7156$ | $d_{19} = 1.2000$ | | $n_{10} = 1.84666$ | $\nu_{10} = 23.78$ |
| $r_{21} = 62.2357$ | $d_{20} = 1.0000$ | | | |
| $r_{22} = -31.9184$ | $d_{21} = 3.8000$ | | $n_{11} = 1.69680$ | $\nu_{11} = 55.52$ |
| $r_{23} = 21.5326$ | $d_{22} = 0.1500$ | | | |
| $r_{24} = 118.4843$ | $d_{23} = 3.3000$ | | $n_{12} = 1.69680$ | $\nu_{12} = 55.52$ |
| $r_{25} = \infty$ | $d_{24} = D_4$ (variable) | | | |
| $r_{26} = \infty$ | $d_{25} = 14.0000$ | | $n_{13} = 1.51633$ | $\nu_{13} = 64.15$ |
| $r_{27} = \infty$ | $d_{26} = 1.0000$ | | | |
| $r_{28} = \infty$ | $d_{27} = 6.0000$ | | $n_{14} = 1.51633$ | $\nu_{14} = 64.15$ |

| f | 12 | 29 | 72 |
|---|---|---|---|
| $D_1$ | 1.000 | 18.453 | 30.158 |
| $D_2$ | 30.658 | 13.206 | 1.500 |
| $D_3$ | 14.494 | 9.838 | 12.332 |
| $D_4$ | 3.000 | 7.656 | 5.162 |

$f_T/f_{AT} = 0.238$ $\quad$ $f_4/\sqrt{f_W \cdot f_T} = 0.931$ $t_I/\sqrt{f_W \cdot f_T} = 0.574$ $\quad$ $f_I/\sqrt{f_W \cdot f_T} = 1.989$ $|f_{II}|/\sqrt{f_W \cdot f_T} = 0.482$ $\quad$ $n_6 - n_5 = 0.14966$ $\nu_5 - \nu_6 = 24.73$ $\quad$ $n_{IVn} - n_{IVp} = 0.14986$ $\nu_{IVp} - \nu_{IVn} = 31.74$ $\quad$ $f_{BW}/\sqrt{f_W \cdot f_T} = 0.613$ $D_T/\sqrt{f_W \cdot f_T} = 0.420$ $\quad$ $s_T = 4.224$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the focal length of the lens system as a whole, reference symbol $f_{BW}$ represents the back focal length in the wide position (position of the shortest focal length), and reference symbol $S_T$ represents the advancing amount of the fourth lens group when the lens system is to be focused on an object at the object distance of 1 m in the teleposition (position of the longest focal length).

4. A vari-focal lens system according to claim 2 having the following numerical data:

| | $f = 12 \sim 72$ | | $F/1.2 \sim F/1.7$ | |
|---|---|---|---|---|
| $r_1 = 135.4596$ | $d_1 = 1.5000$ | | $n_1 = 1.80518$ | $\nu_1 = 25.43$ |
| $r_2 = 53.4855$ | $d_2 = 0.4000$ | | | |
| $r_3 = 57.1682$ | $d_3 = 8.5000$ | | $n_2 = 1.60311$ | $\nu_2 = 60.70$ |
| $r_4 = -156.9705$ | $d_4 = 0.1500$ | | | |
| $r_5 = 36.1375$ | $d_5 = 5.5000$ | | $n_3 = 1.60311$ | $\nu_3 = 60.70$ |
| $r_6 = 113.9903$ | $d_6 = D_1$ (variable) | | | |
| $r_7 = 47.6409$ | $d_7 = 1.0000$ | | $n_4 = 1.83400$ | $\nu_4 = 37.16$ |
| $r_8 = 13.4748$ | $d_8 = 6.0000$ | | | |
| $r_9 = -17.1192$ | $d_9 = 1.0000$ | | $n_5 = 1.69700$ | $\nu_5 = 48.51$ |
| $r_{10} = 19.7618$ | $d_{10} = 4.0000$ | | $n_6 = 1.84666$ | $\nu_6 = 23.78$ |
| $r_{11} = -82.2933$ | $d_{11} = D_2$ (variable) | | | |
| $r_{12} = -303.1840$ | $d_{12} = 2.7000$ | | $n_7 = 1.77250$ | $\nu_7 = 49.66$ |
| $r_{13} = -50.3064$ | $d_{13} = 1.0000$ | | | |
| $r_{14} = \infty$ (stop) | $d_{14} = 3.0000$ | | | |
| $r_{15} = 38.9098$ | $d_{15} = 4.0000$ | | $n_8 = 1.69680$ | $\nu_8 = 55.52$ |
| $r_{16} = -343.4102$ | $d_{16} = 1.6000$ | | | |
| $r_{17} = -56.3115$ | $d_{17} = 1.1000$ | | $n_9 = 1.84666$ | $\nu_9 = 23.78$ |
| $r_{18} = -274.6890$ | $d_{18} = D_3$ (variable) | | | |
| $r_{19} = -838.5286$ | $d_{19} = 1.2000$ | | $n_{10} = 1.84666$ | $\nu_{10} = 23.78$ |
| $r_{20} = 33.5553$ | $d_{20} = 0.3500$ | | | |
| $r_{21} = 40.3991$ | $d_{21} = 5.3000$ | | $n_{11} = 1.69680$ | $\nu_{11} = 55.52$ |
| $r_{22} = -40.8461$ | $d_{22} = 0.1500$ | | | |
| $r_{23} = 26.1080$ | $d_{23} = 4.1000$ | | $n_{12} = 1.69680$ | $\nu_{12} = 55.52$ |
| $r_{24} = 200.0303$ | $d_{24} = D_4$ (variable) | | | |
| $r_{25} = \infty$ | $d_{25} = 14.0000$ | | $n_{13} = 1.51633$ | $\nu_{13} = 64.15$ |
| $r_{26} = \infty$ | $d_{26} = 1.0000$ | | | |
| $r_{27} = \infty$ | $d_{27} = 6.0000$ | | $n_{14} = 1.51633$ | $\nu_{14} = 64.15$ |
| $r_{28} = \infty$ | | | | |

| f | 12 | 29 | 72 |
|---|---|---|---|
| $D_1$ | 1.000 | 18.851 | 30.454 |
| $D_2$ | 30.645 | 12.794 | 1.192 |
| $D_3$ | 25.803 | 21.561 | 24.164 |
| $D_4$ | 3.000 | 7.242 | 4.638 |

$f_T/f_{AT} = 0.099$ $\quad$ $f_4/\sqrt{f_W \cdot f_T} = 1.025$ $t_I/\sqrt{f_W \cdot f_T} = 0.546$ $\quad$ $f_I/\sqrt{f_W \cdot f_T} = 2.004$ $|f_{II}|/\sqrt{f_W \cdot f_T} = 0.490$ $\quad$ $n_6 - n_5 = 0.14966$ $\nu_5 - \nu_6 = 24.73$ $\quad$ $n_{IVn} - n_{IVp} = 0.14986$ $\nu_{IVp} - \nu_{IVn} = 31.74$ $\quad$ $f_{BW}/\sqrt{f_W \cdot f_T} = 0.815$ -continued

| | f = 12~72 | F/1.2~F/1.7 |
|---|---|---|
| $D_T/\sqrt{f_W \cdot f_T} = 0.823$ | | $s_T = 4.023$ | where, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, reference symbols $\nu_1$, $\nu_2$, ... respectively represent Abbe's numbers of respective lenses, reference symbol f represents the focal length of the lens system as a whole, reference symbol $f_{BW}$ represents the back focal length in the wide position (position of the shortest focal length), and reference symbol $S_T$ represents the advancing amount of the fourth lens group when the lens system is to be focused on an object at the object distance of 1 m in the teleposition (position of the longest focal length).

5. A vari-focal lens system according to claim 2 having the following numerical data:

| | f = 12~72 | F/1.2~F/1.8 | |
|---|---|---|---|
| $r_1 = 123.7332$ | | | |
| | $d_1 = 1.5000$ | $n_1 = 1.80518$ | $\nu_1 = 25.43$ |
| $r_2 = 52.2449$ | | | |
| | $d_2 = 0.3000$ | | |
| $r_3 = 56.2238$ | | | |
| | $d_3 = 7.2000$ | $n_2 = 1.60311$ | $\nu_2 = 60.70$ |
| $r_4 = -161.1663$ | | | |
| | $d_4 = 0.1500$ | | |
| $r_5 = 34.5295$ | | | |
| | $d_5 = 5.7000$ | $n_3 = 1.60311$ | $\nu_3 = 60.70$ |
| $r_6 = 114.2507$ | | | |
| | $d_6 = D_1$ (variable) | | |
| $r_7 = 50.8351$ | | | |
| | $d_7 = 1.0000$ | $n_4 = 1.83400$ | $\nu_4 = 37.16$ |
| $r_8 = 13.7931$ | | | |
| | $d_8 = 6.8000$ | | |
| $r_9 = -16.1577$ | | | |
| | $d_9 = 1.0000$ | $n_5 = 1.67790$ | $\nu_5 = 55.33$ |
| $r_{10} = 22.2461$ | | | |
| | $d_{10} = 3.7000$ | $n_6 = 1.84666$ | $\nu_6 = 23.78$ |
| $r_{11} = -161.9847$ | | | |
| | $d_{11} = D_2$ (variable) | | |
| $r_{12} = -1356.9084$ | | | |
| | $d_{12} = 3.7000$ | $n_7 = 1.83400$ | $\nu_7 = 37.16$ |
| $r_{13} = -44.0824$ | | | |
| | $d_{13} = 1.0000$ | | |
| $r_{14} = \infty$ (stop) | | | |
| | $d_{14} = 3.0000$ | | |
| $r_{15} = 41.3545$ | | | |
| | $d_{15} = 4.5000$ | $n_8 = 1.69680$ | $\nu_8 = 55.52$ |
| $r_{16} = -136.6095$ | | | |
| | $d_{16} = 1.3000$ | | |
| $r_{17} = -51.0155$ | | | |
| | $d_{17} = 1.1000$ | $n_9 = 1.84666$ | $\nu_9 = 23.78$ |
| $r_{18} = 351.8015$ | | | |
| | $d_{18} = D_3$ (variable) | | |
| $r_{19} = 71.3423$ | | | |
| | $d_{19} = 1.2000$ | $n_{10} = 1.84666$ | $\nu_{10} = 23.78$ |
| $r_{20} = 32.6618$ | | | |
| | $d_{20} = 1.1000$ | | |
| $r_{21} = 51.4512$ | | | |
| | $d_{21} = 5.9000$ | $n_{11} = 1.48749$ | $\nu_{11} = 70.20$ |
| $r_{22} = -33.9160$ | | | |
| | $d_{22} = 0.1500$ | | |
| $r_{23} = 25.4014$ | | | |
| | $d_{23} = 5.1000$ | $n_{12} = 1.48749$ | $\nu_{12} = 70.20$ |
| $r_{24} = -375.7640$ | | | |
| | $d_{24} = D_4$ (variable) | | |

-continued

| | f = 12~72 | F/1.2~F/1.8 | |
|---|---|---|---|
| $r_{25} = \infty$ | | | |
| | $d_{25} = 14.0000$ | $n_{13} = 1.51633$ | $\nu_{13} = 64.15$ |
| $r_{26} = \infty$ | | | |
| | $d_{26} = 1.0000$ | | |
| $r_{27} = \infty$ | | | |
| | $d_{27} = 6.0000$ | $n_{14} = 1.51633$ | $\nu_{14} = 64.15$ |
| $r_{28} = \infty$ | | | |

| f | 12 | 29 | 72 |
|---|---|---|---|
| $D_1$ | 1.000 | 17.251 | 27.885 |
| $D_2$ | 31.380 | 15.129 | 4.495 |
| $D_3$ | 21.754 | 16.513 | 18.240 |
| $D_4$ | 3.000 | 8.241 | 6.513 |

$f_T/f_{AT} = 0.063$     $f_4/\sqrt{f_W \cdot f_T} = 1.090$ $t_I/\sqrt{f_W \cdot f_T} = 0.506$     $f_I/\sqrt{f_W \cdot f_T} = 1.887$ $|f_{II}|/\sqrt{f_W \cdot f_T} = 0.429$     $n_6 - n_5 = 0.16876$ $\nu_5 - \nu_6 = 31.55$     $n_{IVn} - n_{IVp} = 0.35917$ $\nu_{IVp} - \nu_{IVn} = 46.42$     $f_{BW}/\sqrt{f_W \cdot f_T} = 0.814$ $D_T/\sqrt{f_W \cdot f_T} = 0.621$     $s_T = 4.104$ where, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, reference symbols $\nu_1$, $\nu_2$, ... respectively represent Abbe's numbers of respective lenses, reference symbol f represents the focal length of the lens system as a whole, reference symbol $f_{BW}$ represents the back focal length in the wide position (position of the shortest focal length), and reference symbol $S_T$ represents the advancing amount of the fourth lens group when the lens system is to be focused on an object at the object distance of 1 m in the teleposition (position of the longest focal length).

6. A vari-focal lens system according to claim 2 having the following numerical data:

| | f = 12~72 | F/1.2~F/1.7 | |
|---|---|---|---|
| $r_1 = 165.9365$ | | | |
| | $d_1 = 1.5000$ | $n_1 = 1.80518$ | $\nu_1 = 25.43$ |
| $r_2 = 53.4205$ | | | |
| | $d_2 = 0.3000$ | | |
| $r_3 = 57.0057$ | | | |
| | $d_3 = 7.9000$ | $n_2 = 1.60311$ | $\nu_2 = 60.70$ |
| $r_4 = -170.2011$ | | | |
| | $d_4 = 0.1500$ | | |
| $r_5 = 39.4171$ | | | |
| | $d_5 = 5.5000$ | $n_3 = 1.69680$ | $\nu_3 = 55.52$ |
| $r_6 = 156.9904$ | | | |
| | $d_6 = D_1$ (variable) | | |
| $r_7 = 46.4325$ | | | |
| | $d_7 = 1.0000$ | $n_4 = 1.83400$ | $\nu_4 = 37.16$ |
| $r_8 = 13.9757$ | | | |
| | $d_8 = 6.0000$ | | |
| $r_9 = -18.4154$ | | | |
| | $d_9 = 1.0000$ | $n_5 = 1.67790$ | $\nu_5 = 55.33$ |
| $r_{10} = 21.9302$ | | | |
| | $d_{10} = 3.5000$ | $n_6 = 1.84666$ | $\nu_6 = 23.78$ |
| $r_{11} = -117.8717$ | | | |
| | $d_{11} = D_2$ (variable) | | |
| $r_{12} = 296.3316$ | | | |
| | $d_{12} = 3.5000$ | $n_7 = 1.72000$ | $\nu_7 = 50.25$ |

-continued

| | f = 12~72 | F/1.2~F/1.7 | |
|---|---|---|---|
| $r_{13} = -46.7165$ | | | |
| | $d_{13} = 0.1500$ | | |
| $r_{14} = 34.5044$ | | | |
| | $d_{14} = 2.8000$ | $n_8 = 1.72000$ | $\nu_8 = 50.25$ |
| $r_{15} = 89.5454$ | | | |
| | $d_{15} = 2.9000$ | | |
| $r_{16} = -41.4221$ | | | |
| | $d_{16} = 1.1000$ | $n_9 = 1.84666$ | $\nu_9 = 23.78$ |
| $r_{17} = -99.0301$ | | | |
| | $d_{17} = 1.1500$ | | |
| $r_{18} = \infty$ (stop) | | | |
| | $d_{18} = D_3$ (variable) | | |
| $r_{19} = -184.2482$ | | | |
| | $d_{19} = 1.2000$ | $n_{10} = 1.84666$ | $\nu_{10} = 23.78$ |
| $r_{20} = 33.3380$ | | | |
| | $d_{20} = 0.3500$ | | |
| $r_{21} = 39.5733$ | | | |
| | $d_{21} = 5.6000$ | $n_{11} = 1.69680$ | $\nu_{11} = 55.52$ |
| $r_{22} = -33.5001$ | | | |
| | $d_{22} = 0.1500$ | | |
| $r_{23} = 26.6392$ | | | |
| | $d_{23} = 4.0000$ | $n_{12} = 1.69680$ | $\nu_{12} = 55.52$ |
| $r_{24} = 703.8247$ | | | |
| | $d_{24} = D_4$ (variable) | | |
| $r_{25} = \infty$ | | | |
| | $d_{25} = 14.0000$ | $n_{13} = 1.51633$ | $\nu_{13} = 64.15$ |
| $r_{26} = \infty$ | | | |
| | $d_{26} = 1.0000$ | | |
| $r_{27} = \infty$ | | | |
| $d_{27} = 6.0000$ | $n_{14} = 1.51633$ | $\nu_{14} = 64.15$ | |
| $r_{28} = \infty$ | | | |

| f | 12 | 29 | 72 |
|---|---|---|---|
| $D_1$ | 1.000 | 18.238 | 29.856 |
| $D_2$ | 29.856 | 12.618 | 1.000 |
| $D_3$ | 20.227 | 17.009 | 20.933 |
| $D_4$ | 3.000 | 6.218 | 2.294 |

$f_T/f_{AT} = 0.120$   $f_4/\sqrt{f_W \cdot f_T} = 0.939$ $t_I/\sqrt{f_W \cdot f_T} = 0.523$   $f_I/\sqrt{f_W \cdot f_T} = 1.952$ $|f_{II}|/\sqrt{f_W \cdot f_T} = 0.512$   $n_6 - n_5 = 0.16876$ $\nu_5 - \nu_6 = 31.55$   $n_{IVn} - n_{IVp} = 0.14986$ $\nu_{IVp} - \nu_{IVn} = 31.74$   $f_{BW}/\sqrt{f_W \cdot f_T} = 0.817$ $D_T/\sqrt{f_W \cdot f_T} = 0.713$   $s_T = 4.048$ where, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, reference symbols $\nu_1$, $\nu_2$, ... respectively represent Abbe's numbers of respective lenses, reference symbol f represents the focal length of the lens system as a whole, reference symbol $f_{BW}$ represents the back focal length in the wide position (position of the shortest focal length), and reference symbol $S_T$ represents the advancing amount of the fourth lens group when the lens system is to be focused on an object at the object distance of 1 m in the teleposition (position of the longest focal length).

7. A vari-focal lens system according to claim 1 wherein said first lens group comprises a negative lens, a positive lens and a positive lens, said second lens group comprises a first negative lens, a second negative lens and a positive lens, said third lens group comprises at least one positive lens and a negative lens, and said fourth lens group comprises a first positive lens, a second positive lens and a negative lens, said vari-focal lens system being arranged to fulfill the conditions (1) through (10) shown below:

$$-0.5 < f_T/f_{AT} < 0.35 \quad (1)$$

$$0.8 < f_4/\sqrt{f_W \cdot f_T} < 1.3 \quad (2)$$

$$0.2 < D_T/\sqrt{f_W \cdot f_T} < 1.4 \quad (3)$$

$$0.4 < t_I/\sqrt{f_W \cdot f_T} < 0.64 \quad (4)$$

$$1.7 < f_I/\sqrt{f_W \cdot f_T} < 0.3 \quad (5)$$

$$0.4 < |f_{II}|/\sqrt{f_W \cdot f_T} < 0.75 \quad (6)$$

$$0.04 < n_6 - n_5 < 0.25 \quad (7)$$

$$15 < \nu_5 - \nu_6 < 45 \quad (8)$$

$$0.04 < n_{IVn} - n_{IVp} < 0.37 \quad (9)$$

$$20 < \nu_{IVp} - \nu_{IVn} \quad (10)$$

where, reference symbol $f_T$ represents the longest focal length of the lens system as a whole, reference symbol $f_{AT}$ represents the total focal length of the first, second and third lens groups in the position of the longest focal length, reference symbol $f_W$ represents the shortest focal length of the lens system as a whole, reference symbol $f_4$ represents the total focal length of the fourth lens group, reference symbol $D_T$ represents the airspace between the third and fourth lens groups when the lens system is focused on an object at the infinite distance in the position of the longest focal length, reference symbol $t_I$ represents the distance from the foremost surface to the rearmost surface of the first lens group, reference symbol $f_I$ represents the total focal length of the first lens group, reference symbol $f_{II}$ represents the total focal length of the second lens group, reference symbol $n_5$ represents the refractive index of the second negative lens in the second lens group, reference symbol $n_6$ represents the refractive index of the positive lens in the second lens group, reference symbol $\nu_5$ represents Abbe's number of the second negative lens in the second lens group, reference symbol $\nu_6$ represents Abbe's number of the positive lens in the second lens group, reference symbol $n_{IVp}$ represents the refractive index of the second positive lens in the fourth lens group, reference symbol $n_{IVn}$ represents the refractive index of the negative lens in the fourth lens group, reference symbol $\nu_{IVp}$ represents Abbe's number of the second positive lens in the fourth lens group, and reference symbol $\nu_{IVn}$ represents Abbe's number of the negative lens in the fourth lens group.

8. A vari-focal lens system according to claim 7 having the following numerical data:

| | f = 12~72 F/1.2~F/1.8 | | |
|---|---|---|---|
| $r_1 = 144.0963$ | | | |
| | $d_1 = 1.5000$ | $n_1 = 1.80518$ | $\nu_1 = 25.43$ |
| $r_2 = 55.0145$ | | | |
| | $d_2 = 0.1600$ | | |
| $r_3 = 56.7336$ | | | |
| | $d_3 = 7.2000$ | $n_2 = 1.60311$ | $\nu_2 = 60.70$ |

-continued

| $f = 12 \sim 72\ F/1.2 \sim F/1.8$ | | | |
|---|---|---|---|
| $r_4 = -163.8458$ | | | |
| | $d_4 = 0.1500$ | | |
| $r_5 = 39.2075$ | | | |
| | $d_5 = 5.1000$ | $n_3 = 1.60311$ | $\nu_3 = 60.70$ |
| $r_6 = 130.5878$ | | | |
| | $d_6 = D_1$ (variable) | | |
| $r_7 = 65.3930$ | | | |
| | $d_7 = 1.0000$ | $n_4 = 1.77250$ | $\nu_4 = 49.66$ |
| $r_8 = 16.0137$ | | | |
| | $d_8 = 6.5000$ | | |
| $r_9 = -20.5600$ | | | |
| | $d_9 = 1.0000$ | $n_5 = 1.67790$ | $\nu_5 = 55.33$ |
| $r_{10} = 24.3845$ | | | |
| | $d_{10} = 3.4000$ | $n_6 = 1.84666$ | $\nu_6 = 23.78$ |
| $r_{11} = -243.3111$ | | | |
| | $d_{11} = D_2$ (variable) | | |
| $r_{12} = 239.6682$ | | | |
| | $d_{12} = 2.4000$ | $n_7 = 1.77250$ | $\nu_7 = 49.66$ |
| $r_{13} = -104.3267$ | | | |
| | $d_{13} = 1.0000$ | | |
| $r_{14} = \infty$ (stop) | | | |
| | $d_{14} = 3.0000$ | | |
| $r_{15} = 98.7511$ | | | |
| | $d_{15} = 3.2000$ | $n_8 = 1.77250$ | $\nu_8 = 49.66$ |
| $r_{16} = -73.8104$ | | | |
| | $d_{16} = 1.3000$ | | |
| $r_{17} = -34.9115$ | | | |
| | $d_{17} = 1.2000$ | $n_9 = 1.84666$ | $\nu_9 = 23.78$ |
| $r_{18} = -79.1788$ | | | |
| | $d_{18} = D_3$ (variable) | | |
| $r_{19} = 236.7931$ | | | |
| | $d_{19} = 3.7000$ | $n_{10} = 1.77250$ | $\nu_{10} = 49.66$ |
| $r_{20} = -49.2961$ | | | |
| | $d_{20} = 0.1500$ | | |
| $r_{21} = 36.8956$ | | | |
| | $d_{21} = 7.4000$ | $n_{11} = 1.69680$ | $\nu_{11} = 55.52$ |
| $r_{22} = -28.4243$ | | | |
| | $d_{22} = 1.2000$ | $n_{12} = 1.84666$ | $\nu_{12} = 23.78$ |
| $r_{23} = -740.9855$ | | | |
| | $d_{23} = D_4$ (variable) | | |
| $r_{24} = \infty$ | | | |
| | $d_{24} = 14.0000$ | $n_{13} = 1.51633$ | $\nu_{13} = 64.15$ |
| $r_{25} = \infty$ | | | |
| | $d_{25} = 1.0000$ | | |
| $r_{26} = \infty$ | | | |
| | $d_{26} = 6.0000$ | $n_{14} = 1.51633$ | $\nu_{14} = 64.15$ |
| $r_{27} = \infty$ | | | |

| f | 12 | 29 | 72 |
|---|---|---|---|
| $D_1$ | 1.000 | 19.076 | 31.852 |
| $D_2$ | 31.852 | 13.776 | 1.000 |
| $D_3$ | 24.932 | 21.747 | 25.234 |
| $D_4$ | 3.000 | 6.185 | 2.698 |

$f_T/f_{AT} = -0.002$ $f_4/\sqrt{f_W \cdot f_T} = 0.999$ $t_I/\sqrt{f_W \cdot f_T} = 0.480$ $f_I/\sqrt{f_W \cdot f_T} = 2.101$ $|f_{II}|/\sqrt{f_W \cdot f_T} = 0.541$ $n_6 - n_5 = 0.16876$ $\nu_5 - \nu_6 = 31.55$ $n_{IVn} - n_{IVp} = 0.14986$ $\nu_{IVp} - \nu_{IVn} = 31.74$ $f_{BW}/\sqrt{f_W \cdot f_T} = 0.816$ $s_T = 4.132$ $D_T/\sqrt{f_W \cdot f_T} = 0.859$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the focal length of the lens system as a whole, reference symbol $f_{BW}$ represents the back focal length in the wide position (position of the shortest focal length), and reference symbol $S_T$ represents the advancing amount of the fourth lens group when the lens system is to be focused on an object at the object distance of 1 m in the teleposition (position of the longest focal length).

9. A vari-focal lens system according to claim 7 having the following numerical data:

| $f = 12 \sim 72\ F/1.2 \sim F/1.8$ | | | |
|---|---|---|---|
| $r_1 = 238.5683$ | | | |
| | $d_1 = 1.5000$ | $n_1 = 1.80518$ | $\nu_1 = 25.43$ |
| $r_2 = 59.6039$ | | | |
| | $d_2 = 0.1300$ | | |
| $r_3 = 61.5281$ | | | |
| | $d_3 = 7.1000$ | $n_2 = 1.60311$ | $\nu_2 = 60.70$ |
| $r_4 = -150.6907$ | | | |
| | $d_4 = 0.1500$ | | |
| $r_5 = 42.2290$ | | | |
| | $d_5 = 4.7000$ | $n_3 = 1.72000$ | $\nu_3 = 50.25$ |
| $r_6 = 119.9301$ | | | |
| | $d_6 = D_1$ (variable) | | |
| $r_7 = 49.8486$ | | | |
| | $d_7 = 1.0000$ | $n_4 = 1.83400$ | $\nu_4 = 37.16$ |
| $r_8 = 16.3739$ | | | |
| | $d_8 = 6.9000$ | | |
| $r_9 = -21.0451$ | | | |
| | $d_9 = 1.0000$ | $n_5 = 1.67790$ | $\nu_5 = 55.33$ |
| $r_{10} = 24.8249$ | | | |
| | $d_{10} = 3.9000$ | $n_6 = 1.84666$ | $\nu_6 = 23.78$ |
| $r_{11} = -148.0327$ | | | |
| | $d_{11} = D_2$ (variable) | | |
| $r_{12} = 199.9856$ | | | |
| | $d_{12} = 2.4000$ | $n_7 = 1.80518$ | $\nu_7 = 25.43$ |
| $r_{13} = -84.5931$ | | | |
| | $d_{13} = 1.0000$ | | |
| $r_{14} = \infty$ (stop) | | | |
| | $d_{14} = 3.0000$ | | |
| $r_{15} = 50.2773$ | | | |
| | $d_{15} = 3.7000$ | $n_8 = 1.77250$ | $\nu_8 = 49.66$ |
| $r_{16} = -107.1752$ | | | |
| | $d_{16} = 1.2000$ | | |
| $r_{17} = -42.6456$ | | | |
| | $d_{17} = 1.2000$ | $n_9 = 1.84666$ | $\nu_9 = 23.78$ |
| $r_{18} = 129.7076$ | | | |
| | $d_{18} = D_3$ (variable) | | |
| $r_{19} = 352.8759$ | | | |
| | $d_{19} = 4.2000$ | $n_{10} = 1.77250$ | $\nu_{10} = 49.66$ |
| $r_{20} = -41.6555$ | | | |
| | $d_{20} = 0.1500$ | | |
| $r_{21} = 33.3832$ | | | |
| | $d_{21} = 7.8000$ | $n_{11} = 1.69680$ | $\nu_{11} = 55.52$ |
| $r_{22} = -29.8010$ | | | |
| | $d_{22} = 1.2000$ | $n_{12} = 1.84666$ | $\nu_{12} = 23.78$ |
| $r_{23} = 540.8846$ | | | |
| | $d_{23} = D_4$ (variable) | | |
| $r_{24} = \infty$ | | | |
| | $d_{24} = 14.0000$ | $n_{13} = 1.51633$ | $\nu_{13} = 64.15$ |
| $r_{25} = \infty$ | | | |
| | $d_{25} = 1.0000$ | | |
| $r_{26} = \infty$ | | | |
| | $d_{26} = 6.0000$ | $n_{14} = 1.51633$ | $\nu_{14} = 64.15$ |
| $r_{27} = \infty$ | | | |

| f | 12 | 29 | 72 |
|---|---|---|---|
| $D_1$ | 1.000 | 20.703 | 35.159 |
| $D_2$ | 35.159 | 15.456 | 1.000 |
| $D_3$ | 22.509 | 19.488 | 23.086 |
| $D_4$ | 3.578 | 6.598 | 3.000 |

$f_T/f_{AT} = -0.088$ $f_4/\sqrt{f_W \cdot f_T} = 1.015$ $t_I/\sqrt{f_W \cdot f_T} = 0.462$ $f_I/\sqrt{f_W \cdot f_T} = 2.259$ $|f_{II}|/\sqrt{f_W \cdot f_T} = 0.602$ $n_6 - n_4 = 0.16876$ $\nu_5 - \nu_6 = 31.55$ $n_{IVn} - n_{IVp} = 0.14986$ -continued $$f = 12 \sim 72 \ F/1.2 \sim F/1.8$$

$\nu_{IVp} - \nu_{IVn} = 31.74$ $f_{BW}/\sqrt{f_W \cdot f_T} = 0.836$ $D_T/\sqrt{f_W \cdot f_T} = 0.786$ $s_T = 4.282$ where, reference symbols $r_1, r_2, \ldots$ respectively represent radii of curvature of respective lens surfaces, reference symbols $d_1, d_2, \ldots$ respectively represent thickness of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the focal length of the lens system as a whole, reference symbol $f_{BW}$ represents the back focal length in the wide position (position of the shortest focal length), and reference symbol $S_T$ represents the advancing amount of the fourth lens group when the lens system is to be focused on an object at the object distance of 1 m in the teleposition (position of the longest focal length).

10. A vari-focal lens system according to claim 7 having the following numerical data:

$$f = 12 \sim 72 \ F/1.2 \sim F/1.7$$

| | | |
|---|---|---|
| $r_1 = 239.9118$ | | |
| | $d_1 = 1.5000$ | $n_1 = 1.80518 \quad \nu_1 = 25.43$ |
| $r_2 = 59.3936$ | | |
| | $d_2 = 0.1000$ | |
| $r_3 = 60.8202$ | | |
| | $d_3 = 7.2000$ | $n_2 = 1.60311 \quad \nu_2 = 60.70$ |
| $r_4 = -142.9706$ | | |
| | $d_4 = 0.1500$ | |
| $r_5 = 41.7740$ | | |
| | $d_5 = 4.5000$ | $n_3 = 1.72000 \quad \nu_3 = 50.25$ |
| $r_6 = 109.6368$ | | |
| | $d_6 = D_1$ (variable) | |
| $r_7 = 51.6613$ | | |
| | $d_7 = 1.0000$ | $n_4 = 1.83400 \quad \nu_4 = 37.16$ |
| $r_8 = 16.5840$ | | |
| | $d_8 = 6.9000$ | |
| $r_9 = -21.2063$ | | |
| | $d_9 = 1.0000$ | $n_5 = 1.67790 \quad \nu_5 = 55.33$ |
| $r_{10} = 25.5470$ | | |
| | $d_{10} = 3.9000$ | $n_6 = 1.84666 \quad \nu_6 = 23.78$ |
| $r_{11} = -148.7898$ | | |
| | $d_{11} = D_2$ (variable) | |
| $r_{12} = 134.9300$ | | |
| | $d_{12} = 2.9000$ | $n_7 = 1.80518 \quad \nu_7 = 25.43$ |
| $r_{13} = -78.1776$ | | |
| | $d_{13} = 1.0000$ | |
| $r_{14} = \infty$ (stop) | | |
| | $d_{14} = 3.0000$ | |
| $r_{15} = 51.7843$ | | |
| | $d_{15} = 3.3000$ | $n_8 = 1.77250 \quad \nu_8 = 49.66$ |
| $r_{16} = -156.2525$ | | |
| | $d_{16} = 1.3000$ | |
| $r_{17} = -44.4456$ | | |
| | $d_{17} = 1.2000$ | $n_9 = 1.84666 \quad \nu_9 = 23.78$ |
| $r_{18} = 115.7071$ | | |
| | $d_{18} = D_3$ (variable) | |
| $r_{19} = 294.2054$ | | |
| | $d_{19} = 4.1000$ | $n_{10} = 1.77250 \quad \nu_{10} = 49.66$ |
| $r_{20} = -41.9683$ | | |
| | $d_{20} = 0.1500$ | |
| $r_{21} = 33.0844$ | | |
| | $d_{21} = 7.6000$ | $n_{11} = 1.69680 \quad \nu_{11} = 55.52$ |
| $r_{22} = -30.5175$ | | |
| | $d_{22} = 1.2000$ | $n_{12} = 1.84666 \quad \nu_{12} = 23.78$ |
| $r_{23} = 425.6829$ | | |
| | $d_{23} = D$ (variable) | |
| $r_{24} = \infty$ | | |
| | $d_{24} = 14.0000$ | $n_{13} = 1.51633 \quad \nu_{13} = 64.15$ |

-continued $$f = 12 \sim 72 \ F/1.2 \sim F/1.7$$

| | | |
|---|---|---|
| $r_{25} = \infty$ | | |
| | $d_{25} = 1.0000$ | |
| $r_{26} = \infty$ | | |
| | $d_{26} = 6.0000$ | $n_{14} = 1.51633 \quad \nu_{14} = 64.15$ |
| $r_{27} = \infty$ | | |

| f | 12 | 29 | 72 |
|---|---|---|---|
| $D_1$ | 1.000 | 20.896 | 35.388 |
| $D_2$ | 35.388 | 15.492 | 1.000 |
| $D_3$ | 23.161 | 20.053 | 23.468 |
| $D_4$ | 3.307 | 6.415 | 3.000 |

$f_T/f_{AT} = -0.091$ $f_4/\sqrt{f_W \cdot f_T} = 1.009$ $t_I/\sqrt{f_W \cdot f_T} = 0.458$ $f_I/\sqrt{f_W \cdot f_T} = 2.274$ $|f_{II}|/\sqrt{f_W \cdot f_T} = 0.603$ $n_6 - n_5 = 0.16876$ $\nu_5 - \nu_6 = 31.55$ $n_{Ivn} - n_{IVp} = 0.14986$ $\nu_{IVp} - \nu_{IVn} = 31.74$ $f_{BW}/\sqrt{f_W \cdot f_T} = 0.827$ $D_T/\sqrt{f_W \cdot f_T} = 0.799$ $s_T = 4.280$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the focal length of the lens system as a whole, reference symbol $f_{BW}$ represents the back focal length in the wide position (position of the shortest focal length), and reference symbol $S_T$ represents the advancing amount of the fourth lens group when the lens system is to be focused on an object at the object distance of 1 m in the teleposition (position of the longest focal length).

11. A vari-focal lens system according to claim 7 having the following numerical data:

$$f = 12 \sim 72 \ F/1.2 \sim F/1.7$$

| | | |
|---|---|---|
| $r_1 = 151.7233$ | | |
| | $d_1 = 1.5000$ | $n_1 = 1.80518 \quad \nu_1 = 25.43$ |
| $r_2 = 59.3632$ | | |
| | $d_2 = 0.0800$ | |
| $r_3 = 60.4104$ | | |
| | $d_3 = 7.1000$ | $n_2 = 1.60311 \quad \nu_2 = 60.70$ |
| $r_4 = -195.3134$ | | |
| | $d_4 = 0.1500$ | |
| $r_5 = 42.4112$ | | |
| | $d_5 = 4.9000$ | $n_3 = 1.69680 \quad \nu_3 = 55.52$ |
| $r_6 = 126.8250$ | | |
| | $d_6 = D_1$ (variable) | |
| $r_7 = 74.3595$ | | |
| | $d_7 = 1.0000$ | $n_4 = 1.83400 \quad \nu_4 = 37.16$ |
| $r_8 = 16.6897$ | | |
| | $d_8 = 6.9000$ | |
| $r_9 = -21.4114$ | | |
| | $d_9 = 1.0000$ | $n_5 = 1.67790 \quad \nu_5 = 55.33$ |
| $r_{10} = 26.0921$ | | |
| | $d_{10} = 3.9000$ | $n_6 = 1.84666 \quad \nu_6 = 23.78$ |
| $r_{11} = -132.3403$ | | |
| | $d_{11} = D_2$ (variable) | |
| $r_{12} = 1504.2944$ | | |
| | $d_{12} = 2.5000$ | $n_7 = 1.83400 \quad \nu_7 = 37.16$ |
| $r_{13} = -64.5680$ | | |
| | $d_{13} = 0.1500$ | |

-continued

| f = 12~72 F/1.2~F/1.7 | | | |
|---|---|---|---|
| $r_{14} = 65.3163$ | | | |
| | $d_{14} = 3.0000$ | $n_8 = 1.77250$ | $\nu_8 = 49.66$ |
| $r_{15} = -152.0870$ | | | |
| | $d_{15} = 1.3000$ | | |
| $r_{16} = -44.1309$ | | | |
| | $d_{16} = 1.2000$ | $n_9 = 1.84666$ | $\nu_9 = 23.78$ |
| $r_{17} = -299.7950$ | | | |
| | $d_{17} = 1.7000$ | | |
| $r_{18} = \infty$ (stop) | | | |
| | $d_{18} = D_3$ (variable) | | |
| $r_{19} = 403.8921$ | | | |
| | $d_{19} = 3.3000$ | $n_{10} = 1.77250$ | $\nu_{10} = 49.66$ |
| $r_{20} = -47.6736$ | | | |
| | $d_{20} = 0.1500$ | | |
| $r_{21} = 33.1981$ | | | |
| | $d_{21} = 6.3000$ | $n_{11} = 1.69680$ | $\nu_{11} = 55.52$ |
| $r_{22} = -31.7379$ | | | |
| | $d_{22} = 1.2000$ | $n_{12} = 1.84666$ | $\nu_{12} = 23.78$ |
| $r_{23} = 3541.3418$ | | | |
| | $d_{23} = D_4$ (variable) | | |
| $r_{24} = \infty$ | | | |
| | $d_{24} = 14.0000$ | $n_{13} = 1.51633$ | $\nu_{13} = 64.15$ |
| $r_{25} = \infty$ | | | |
| $d_{25} = 1.0000$ | | | |
| $r_{26} = \infty$ | | | |
| | $d_{26} = 6.0000$ | $n_{14} = 1.51633$ | $\nu_{14} = 64.15$ |
| $r_{27} = \infty$ | | | |

| f | 12 | 29 | 72 |
|---|---|---|---|
| $D_1$ | 1.000 | 19.710 | 32.772 |
| $D_2$ | 32.772 | 14.062 | 1.000 |
| $D_3$ | 27.473 | 24.446 | 28.080 |
| $D_4$ | 3.607 | 6.634 | 3.000 |

$f_T/f_{AT} = -0.003$ $f_4/\sqrt{f_W \cdot f_T} = 0.981$ $t_I/\sqrt{f_W \cdot f_T} = 0.467$ $f_I/\sqrt{f_W \cdot f_T} = 2.136$ $|f_{II}|/\sqrt{f_W \cdot f_t} = 0.562$ $n_6 - n_5 = 0.16876$ $\nu_5 - \nu_6 = 31.55$ $n_{IVn} - n_{IVp} = 0.14986$ $\nu_{IVp} - \nu_{IVn} = 31.74$ $f_{BW}/\sqrt{f_W \cdot f_T} = 0.835$ $s_T = 4.096$ $D_T/\sqrt{f_W \cdot f_T} = 1.014$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the focal length of the lens system as a whole, reference symbol $f_{BW}$ represents the back focal length in the wide position (position of the shortest focal length), and reference symbol $S_T$ represents the advancing amount of the fourth lens group when the lens system is to be focused on an object at the object distance of 1 m in the teleposition (position of the longest focal length).

12. A vari-focal lens system according to claim 7 having the following numerical data:

| f = 12~72 F/1.2~F/1.4 | | | |
|---|---|---|---|
| $r_1 = 172.1071$ | | | |
| | $d_1 = 1.5000$ | $n_1 = 1.80518$ | $\nu_1 = 25.43$ |
| $r_2 = 58.7963$ | | | |
| | $d_2 = 10.3000$ | $n_2 = 1.60311$ | $\nu_2 = 60.70$ |

-continued

| f = 12~72 F/1.2~F/1.4 | | | |
|---|---|---|---|
| $r_3 = -182.7541$ | | | |
| | $d_3 = 0.1500$ | | |
| $r_4 = 42.7525$ | | | |
| | $d_4 = 6.7000$ | $n_3 = 1.69680$ | $\nu_3 = 55.52$ |
| $r_5 = 116.4808$ | | | |
| | $d_5 = D_1$ (variable) | | |
| $r_6 = 79.8595$ | | | |
| | $d_6 = 1.0000$ | $n_4 = 1.83400$ | $\nu_4 = 37.16$ |
| $r_7 = 16.8977$ | | | |
| | $d_7 = 6.5000$ | | |
| $r_8 = -21.0692$ | | | |
| | $d_8 = 1.0000$ | $n_5 = 1.67790$ | $\nu_5 = 55.33$ |
| $r_9 = 27.9713$ | | | |
| | $d_9 = 3.8000$ | $n_6 = 1.84666$ | $\nu_6 = 23.78$ |
| $r_{10} = -85.4768$ | | | |
| | $d_{10} = D_2$ (variable) | | |
| $r_{11} = 93.5629$ | | | |
| | $d_{11} = 3.4000$ | $n_7 = 1.83400$ | $\nu_7 = 37.16$ |
| $r_{12} = -58.2455$ | | | |
| | $d_{12} = 0.1500$ | | |
| $r_{13} = 42.6717$ | | | |
| | $d_{13} = 2.5000$ | $n_8 = 1.83400$ | $\nu_8 = 37.16$ |
| $r_{14} = 263.3215$ | | | |
| | $d_{14} = 2.0000$ | | |
| $r_{15} = -47.0980$ | | | |
| | $d_{15} = 1.2000$ | $n_9 = 1.84666$ | $\nu_9 = 23.78$ |
| $r_{16} = 89.1812$ | | | |
| | $d_{16} = 1.8000$ | | |
| $r_{17} = \infty$ (stop) | | | |
| | $d_{17} = D_3$ (variable) | | |
| $r_{18} = 218.8046$ | | | |
| | $d_{18} = 3.8000$ | $n_{10} = 1.77250$ | $\nu_{10} = 49.66$ |
| $r_{19} = -37.4666$ | | | |
| | $d_{19} = 0.1500$ | | |
| $r_{20} = 28.8015$ | | | |
| | $d_{20} = 6.6000$ | $n_{11} = 1.69680$ | $\nu_{11} = 55.52$ |
| $r_{21} = -27.3008$ | | | |
| | $d_{21} = 1.2000$ | $n_{12} = 1.84666$ | $\nu_{12} = 23.78$ |
| $r_{22} = 144.0063$ | | | |
| | $d_{22} = D_4$ (variable) | | |
| $r_{23} = \infty$ | | | |
| | $d_{23} = 14.00000$ | $n_{13} = 1.51633$ | $\nu_{13} = 64.15$ |
| $r_{24} = \infty$ | | | |
| | $d_{24} = 1.0000$ | | |
| $r_{25} = 28$ | | | |
| $d_{25} = 6.0000$ | $n_{14} = 1.51633$ | $\nu_{14} = 64.15$ | |
| $r_{26} = \infty$ | | | |

| f | 12 | 29 | 72 |
|---|---|---|---|
| $D_1$ | 1.000 | 20.175 | 34.097 |
| $D_2$ | 34.097 | 14.922 | 1.000 |
| $D_3$ | 18.710 | 16.296 | 20.330 |
| $D_4$ | 4.620 | 7.034 | 3.000 |

$f_T/f_{AT} = 0.063$ $f_4/\sqrt{f_W \cdot f_T} = 0.874$ $t_I/\sqrt{f_W \cdot f_T} = 0.635$ $f_I/\sqrt{f_W \cdot f_T} = 2.242$ $|f_{II}|/\sqrt{f_W \cdot f_T} = 0.601$ $n_6 - n_5 = 0.16876$ $\nu_5 - \nu_6 = 31.55$ $n_{IVn} - n_{IVp} = 0.14986$ $\nu_{IVp} - \nu_{IVn} = 31.74$ $f_{BW}\sqrt{f_W \cdot f_T} = 0.677$ $s_T = 4.076$ $D_T/\sqrt{f_W \cdot f_T} = 0.753$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the focal length of the lens system as a whole, reference symbol $f_{BW}$ represents the back focal length in the wide position (position of the shortest focal length), and reference symbol $S_T$ represents the advancing amount of the fourth lens group when the lens system is to be focused on an object at the object distance of 1 m in the teleposition (position of the longest focal length).

13. A vari-focal lens system according to claim 7 having the following numerical data:

| $f = 12 \sim 72 \; F/1.2 \sim F/1.4$ | | | |
|---|---|---|---|
| $r_1 = 146.6769$ | | | |
| | $d_1 = 1.5000$ | $n_1 = 1.80518$ | $\nu_1 = 25.43$ |
| $r_2 = 59.8399$ | | | |
| | $d_2 = 9.9000$ | $n_2 = 1.60311$ | $\nu_2 = 60.70$ |
| $r_3 = -158.8523$ | | | |
| | $d_3 = 0.1500$ | | |
| $r_4 = 44.0533$ | | | |
| | $d_4 = 5.2000$ | $n_3 = 1.69680$ | $\nu_3 = 55.52$ |
| $r_5 = 89.2553$ | | | |
| | $d_5 = D_1$ (vari-able) | | |
| $r_6 = 74.9300$ | | | |
| | $d_6 = 1.0000$ | $n_4 = 1.83400$ | $\nu_4 = 37.16$ |
| $r_7 = 18.2563$ | | | |
| | $d_7 = 6.3000$ | | |
| $r_8 = -22.3794$ | | | |
| | $d_8 = 1.0000$ | $n_5 = 1.67790$ | $\nu_5 = 55.33$ |
| $r_9 = 28.2140$ | | | |
| | $d_9 = 4.0000$ | $n_6 = 1.84666$ | $\nu_6 = 23.78$ |
| $r_{10} = -121.1135$ | | | |
| | $d_{10} = D_2$ (vari-able) | | |
| $r_{11} = 151.6487$ | | | |
| | $d_{11} = 4.2000$ | $n_7 = 1.83400$ | $\nu_7 = 37.16$ |
| $r_{12} = -36.0357$ | | | |
| | $d_{12} = 1.0000$ | | |
| $r_{13} = -25.4309$ | | | |
| | $d_{13} = 1.2000$ | $n_8 = 1.84666$ | $\nu_8 = 23.78$ |
| $r_{14} = -50.7361$ | | | |
| | $d_{14} = 1.6000$ | | |
| $r_{15} = \infty$ (stop) | | | |
| | $d_{15} = D_3$ (vari-able) | | |
| $r_{16} = 265.2715$ | | | |
| | $d_{16} = 3.9000$ | $n_9 = 1.77250$ | $\nu_9 = 49.66$ |
| $r_{17} = -43.6405$ | | | |
| | $d_{17} = 0.1500$ | | |
| $r_{18} = 37.6550$ | | | |
| | $d_{18} = 7.2000$ | $n_{10} = 1.69680$ | $\nu_{10} = 55.52$ |
| $r_{19} = -29.0405$ | | | |
| | $d_{19} = 1.2000$ | $n_{11} = 1.84666$ | $\nu_{11} = 23.78$ |
| $r_{20} = -4474.8116$ | | | |
| | $d_{20} = D_4$ variable | | |
| $r_{21} = \infty$ | | | |
| | $d_{21} = 14.0000$ | $n_{12} = 1.51633$ | $\nu_{12} = 64.15$ |
| $r_{22} = \infty$ | | | |
| | $d_{22} = 1.0000$ | | |
| $r_{23} = \infty$ | | | |
| | $d_{23} = 6.0000$ | $n_{13} = 1.51633$ | $\nu_{13} = 64.15$ |
| $r_{24} = \infty$ | | | |

| f | 12 | 29 | 72 |
|---|---|---|---|
| $D_1$ | 1.000 | 21.561 | 36.591 |
| $D_2$ | 36.591 | 16.030 | 1.000 |
| $D_3$ | 24.419 | 21.834 | 25.333 |
| $D_4$ | 3.915 | 6.499 | 3.000 |

$f_T/f_{AT} = -0.012$ $f_4/\sqrt{f_W \cdot f_T} = 0.981$ $t_I/\sqrt{f_W \cdot f_T} = 0.570$ $f_I/\sqrt{f_W \cdot f_T} = 2.392$ $|f_{II}|/\sqrt{f_W \cdot f_T} = 0.634$ $n_6 - n_5 = 0.16876$ $\nu_5 - \nu_6 = 31.55$ $n_{IVn} - n_{Mp\;IVp} = 0.14986$ -continued

| $f = 12 \sim 72 \; F/1.2 \sim F/1.4$ | |
|---|---|
| $\nu_{IVp} - \nu_{IVn} = 31.74$ | $f_{BW}/\sqrt{f_W \cdot f_T} = 0.831$ |
| $D_T/\sqrt{f_W \cdot f_T} = 0.917$ | $s_T = 4.128$ | where, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, reference symbols $\nu_1$, $\nu_2$, respectively represent Abbe's numbers of respective lenses, reference symbol f represents the focal length of the lens system as a whole, reference symbol $f_{BW}$ represents the back focal length in the wide position (position of the shortest focal length), and reference symbol $S_T$ represents the advancing amount of the fourth lens group when the lens system is to be focused on an object at the object distance of 1 m in the teleposition (position of the longest focal length).

14. A vari-focal lens system according to claim 7 having the following numerical data:

| $f = 12 \sim 72 \; F/1.2 \sim F/1.7$ | | | |
|---|---|---|---|
| $r_1 = 194.2138$ | | | |
| | $d_1 = 1.5000$ | $n_1 = 1.80518$ | $\nu_1 = 25.43$ |
| $r_2 = 59.5678$ | | | |
| | $d_2 = 0.1000$ | | |
| $r_3 = 61.2093$ | | | |
| | $d_3 = 7.3000$ | $n_2 = 1.60311$ | $\nu_2 = 60.70$ |
| $r_4 = -184.1545$ | | | |
| | $d_4 = 0.1500$ | | |
| $r_5 = 44.0378$ | | | |
| | $d_5 = 5.000$ | $n_3 = 1.69680$ | $\nu_3 = 55.52$ |
| $r_6 = 151.5499$ | | | |
| | $d_6 = D_1$ (variable) | | |
| $r_7 = 74.2547$ | | | |
| | $d_7 = 1.0000$ | $n_4 = 1.77250$ | $\nu_4 = 49.66$ |
| $r_8 = 17.1596$ | | | |
| | $d_8 = 6.9000$ | | |
| $r_9 = -22.7122$ | | | |
| | $d_9 = 1.0000$ | $n_5 = 1.67790$ | $\nu_5 = 55.33$ |
| $r_{10} = 26.8421$ | | | |
| | $d_{10} = 3.9000$ | $n_6 = 1.84666$ | $\nu_6 = 23.78$ |
| $r_{11} = -196.2969$ | | | |
| | $d_{11} = D_2$ (variable) | | |
| $r_{12} = 88.2234$ | | | |
| | $d_{12} = 3.8000$ | $n_7 = 1.77250$ | $\nu_7 = 49.66$ |
| $r_{13} = -48.8973$ | | | |
| | $d_{13} = 1.3000$ | | |
| $r_{14} = -27.5304$ | | | |
| | $d_{14} = 1.2000$ | $n_8 = 1.84666$ | $\nu_8 = 23.78$ |
| $r_{15} = -42.9386$ | | | |
| | $d_{15} = 1.5000$ | | |
| $r_{16} = \infty$ (stop) | | | |
| | $d_{16} = D_3$ (variable) | | |
| $r_{17} = 454.7542$ | | | |
| | $d_{17} = 3.7000$ | $n_9 = 1.69680$ | $\nu_9 = 55.52$ |
| $r_{18} = -42.3595$ | | | |
| | $d_{18} = 0.1500$ | | |
| $r_{19} = 31.6599$ | | | |
| | $d_{19} = 6.6000$ | $n_{10} = 1.69680$ | $\nu_{10} = 55.52$ |
| $r_{20} = -31.5807$ | | | |
| | $d_{20} = 1.2000$ | $n_{11} = 1.84666$ | $\nu_{11} = 23.78$ |
| $r_{21} = 401.9241$ | | | |
| | $d_{21} = D_4$ (variable) | | |
| $r_{22} = \infty$ | | | |
| | $d_{22} = 14.0000$ | $n_{12} = 1.51633$ | $\nu_{12} = 64.15$ |
| $r_{23} = \infty$ | | | |
| | $d_{23} = 1.0000$ | | |
| $r_{24} = \infty$ | | | |
| | $d_{24} = 6.0000$ | $n_{13} = 1.51633$ | $\nu_{13} = 64.15$ |

-continued

| f = 12~72 F/1.2~F/1.7 | | | |
|---|---|---|---|
| $r_{25} = \infty$ | | | |
| f | 12 | 29 | 72 |
| $D_1$ | 1.000 | 20.518 | 34.647 |
| $D_2$ | 34.647 | 15.129 | 1.000 |
| $D_3$ | 25.673 | 22.821 | 26.471 |
| $D_4$ | 3.797 | 6.650 | 3.000 |

$f_T/f_{AT} = 0.000$ $f_4/\sqrt{f_W \cdot f_T} = 0.998$ $t_I/\sqrt{f_W \cdot f_T}\ 0.482$ $f_I/\sqrt{f_W \cdot f_T} = 2.240$ $|f_{II}|/\sqrt{f_W \cdot f_T} = 0.597$ $n_6 - n_5 = 0.16876$ $\nu_5 - \nu_6 = 31.55$ $n_{IVn} - n_{IVp} = 0.14986$ $\nu_{IVp} - \nu_{IVn} = 31.74$ $f_{BW}/\sqrt{f_W \cdot f_T} = 0.842$ $s_T = 4.147$ $D_T/\sqrt{f_W \cdot f_T} = 0.952$ where, reference symbols $r_1, r_2, \ldots$ respectively represent radii of curvature of respective lens surfaces, reference symbols $d_1, d_2, \ldots$ respectively represent thickness of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the focal length of the lens system as a whole, reference symbol $f_{BW}$ represents the back focal length in the wide position (position of the shortest focal length), and reference symbol $S_T$ represents the advancing amount of the fourth lens group when the lens system is to be focused on an object at the object distance of 1 m in the teleposition (position of the longest focal length).

15. A vari-focal lens system according to claim 7 having the following numerical data:

| f = 12~72 F/1.2~F/1.4 | | | |
|---|---|---|---|
| $r_1 = 164.7468$ | | | |
| | $d_1 = 1.5000$ | $n_1 = 1.80518$ | $\nu_1 = 25.43$ |
| $r_2 = 65.8749$ | | | |
| | $d_2 = 9.9000$ | $n_2 = 1.60311$ | $\nu_2 = 60.70$ |
| $r_3 = -184.0637$ | | | |
| | $d_3 = 0.1500$ | | |
| $r_4 = 48.6323$ | | | |
| | $d_4 = 5.2000$ | $n_3 = 1.69680$ | $\nu_3 = 55.52$ |
| $r_5 = 101.2168$ | | | |
| | $d_5 = D_1$ (variable) | | |
| $r_6 = 57.6084$ | | | |
| | $d_6 = 1.0000$ | $n_4 = 1.77250$ | $\nu_4 = 49.66$ |
| $r_7 = 18.9625$ | | | |
| | $d_7 = 7.3000$ | | |
| $r_8 = -24.9630$ | | | |
| | $d_8 = 1.0000$ | $n_5 = 1.67790$ | $\nu_5 = 55.33$ |
| $r_9 = 28.1850$ | | | |
| | $d_9 = 4.000$ | $n_6 = 1.84666$ | $\nu_6 = 23.78$ |
| $r_{10} = -260.2746$ | | | |

-continued

| f = 12~72 F/1.2~F/1.4 | | | |
|---|---|---|---|
| | $d_{10} = D_2$ (variable) | | |
| $r_{11} = 1399.3348$ | | | |
| | $d_{11} = 4.2000$ | $n_7 = 1.77250$ | $\nu_7 = 49.66$ |
| $r_{12} = -29.8010$ | | | |
| | $d_{12} = 1.1000$ | | |
| $r_{13} = -22.4006$ | | | |
| | $d_{13} = 1.2000$ | $n_8 = 1.85666$ | $\nu_8 = 23.78$ |
| $r_{14} = -39.0155$ | | | |
| | $d_{14} = 1.5000$ | | |
| $r_{15} = \infty$ (stop) | | | |
| | $d_{15} = D_3$ (variable) | | |
| $r_{16} = 355.6424$ | | | |
| | $d_{16} = 3.8000$ | $n_9 = 1.77250$ | $\nu_9 = 49.66$ |
| $r_{17} = -43.8189$ | | | |
| | $d_{17} = 0.1500$ | | |
| $r_{18} = 41.1951$ | | | |
| | $d_{18} = 6.8000$ | $n_{10} = 1.69680$ | $\nu_{10} = 55.52$ |
| $r_{19} = -29.4069$ | | | |
| | $d_{19} = 1.2000$ | $n_{11} = 1.84666$ | $\nu_{11} = 23.78$ |
| $r_{20} = -238.5031$ | | | |
| | $d_{20} = D_4$ (variable) | | |
| $r_{21} = \infty$ | | | |
| | $d_{21} = 14.0000$ | $n_{12} = 1.51633$ | $\nu_{12} = 64.15$ |
| $r_{22} = \infty$ | | | |
| | $d_{22} = 1.0000$ | | |
| $r_{23} = \infty$ | | | |
| | $d_{23} = 6.000$ | $n_{13} = 1.51633$ | $\nu_{13} = 64.15$ |
| $r_{24} = \infty$ | | | |
| f | 12 | 29 | 72 |
| $D_1$ | 1.000 | 23.870 | 40.808 |
| $D_2$ | 40.808 | 17.938 | 1.000 |
| $D_3$ | 22.376 | 20.186 | 23.556 |
| $D_4$ | 4.181 | 6.371 | 3.000 |

$f_T/f_{AT} = -0.001$ $f_4/\sqrt{f_W \cdot f_T} = 0.969$ $t_I/\sqrt{f_W \cdot f_T} = 0.570$ $f_I/\sqrt{f_W \cdot f_T} = 2.663$ $|f_{II}|/\sqrt{f_W \cdot f_T} = 0.715$ $n_6 - n_5 = 0.16876$ $\nu_5 - \nu_6 = 31.55$ $n_{IVn} - n_{IVp} = 0.14986$ $\nu_{IVp} - \nu_{IVn} = 31.74$ $f_{BW}/\sqrt{f_W \cdot f_T} = 0.841$ $s_T = 4.080$ $D_T/\sqrt{f_W \cdot f_T} = 0.853$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively epresent Abbe's numbers of respective lenses, reference symbol f resrepresents the focal length of the lens system as a whole, reference symbol $f_{BW}$ represents the back focal length in the wide position (position of the shortest focal length), and reference symbol $S_T$ represents the advancing amount of the fourth lens group when the lens system is to be focused on an object at the object distance 1 m in the teleposition (position of the longest focal length).

* * * * *